US008736638B2

(12) United States Patent
Shirouzu

(10) Patent No.: US 8,736,638 B2
(45) Date of Patent: May 27, 2014

(54) ORGANIC LIGHT EMITTING DISPLAY DEVICE AND METHOD FOR ADJUSTING LUMINANCE DURING A DETERIORATION DETECTION PROCESS

(75) Inventor: Hiroshi Shirouzu, Shiga (JP)

(73) Assignee: Panasonic Corporation, Osaka (JP)

(*) Notice: Subject to any disclaimer, the term of this patent is extended or adjusted under 35 U.S.C. 154(b) by 524 days.

(21) Appl. No.: 12/724,901

(22) Filed: Mar. 16, 2010

(65) Prior Publication Data

US 2010/0253706 A1 Oct. 7, 2010

(30) Foreign Application Priority Data

Mar. 18, 2009 (JP) ................................ 2009-066338
Feb. 26, 2010 (JP) ................................ 2010-041714

(51) Int. Cl.

| | |
|---|---|
| *G09G 5/10* | (2006.01) |
| *G09G 5/00* | (2006.01) |
| *G06F 3/038* | (2013.01) |
| *H04N 9/64* | (2006.01) |

(52) U.S. Cl.
USPC ............................ 345/690; 345/204; 348/246

(58) Field of Classification Search
USPC ..................... 345/36, 39, 45–46, 76, 82, 690; 348/246, 247
See application file for complete search history.

(56) References Cited

U.S. PATENT DOCUMENTS

| | | | | |
|---|---|---|---|---|
| 5,504,504 | A * | 4/1996 | Markandey et al. | 345/214 |
| 7,683,537 | B2 | 3/2010 | Yoshida et al. | |
| 2005/0162361 | A1* | 7/2005 | Chuang et al. | 345/89 |
| 2006/0164407 | A1* | 7/2006 | Cok | 345/204 |
| 2006/0238943 | A1 | 10/2006 | Awakura et al. | |
| 2007/0091042 | A1* | 4/2007 | Chung et al. | 345/88 |
| 2007/0109327 | A1* | 5/2007 | Cok et al. | 345/690 |
| 2008/0111773 | A1* | 5/2008 | Tsuge | 345/76 |
| 2008/0238936 | A1* | 10/2008 | Kim | 345/618 |
| 2009/0051782 | A1* | 2/2009 | Ono et al. | 348/241 |
| 2009/0284135 | A1 | 11/2009 | Yoshida et al. | |

FOREIGN PATENT DOCUMENTS

| | | |
|---|---|---|
| JP | 2003-173869 | 6/2003 |
| JP | 2006-301220 | 11/2006 |

* cited by examiner

*Primary Examiner* — Ryan A Lubit
(74) *Attorney, Agent, or Firm* — Greenblum & Bernstein, P.L.C.

(57) ABSTRACT

The present invention provides an organic light emitting display device in which light emitted by an OLED whose luminance is adjusted for detection of deterioration does not stand out as compared to light emitted by other OLEDs, thereby not producing an unpleasant sensation for users. A calculation unit in a display control unit 104 sets, for a target pixel 302, a driving signal Out(C)=V. For a peripheral pixel 301 horizontally located immediately before the target pixel 302, the calculation unit calculates a driving signal Out(C−1)=In(C−1)−V(In(C))/2. For a peripheral pixel 303 horizontally located immediately after the target pixel 302, the calculation unit calculates a driving signal Out(C+1)=In(C+1)−V(In(C))/2.

19 Claims, 38 Drawing Sheets

711

Deterioration characteristics table

| Measured voltage (V) | Deterioration rate (%) |
|---|---|
| 4.8 | 0 |
| 5.0 | 10 |
| 5.2 | 20 |

ORGANIC LIGHT EMITTING DISPLAY DEVICE AND METHOD FOR ADJUSTING LUMINANCE DURING A DETERIORATION DETECTION PROCESS

This application is based on applications No. 2009-066338 and 2010-41714 filed in Japan, the contents of which are hereby incorporated by reference.

BACKGROUND OF THE INVENTION (1) Field of the Invention

The present invention relates to technology for driving an image display device that uses an organic light emitting diode and in particular to technology for (i) detecting, for an organic light emitting diode or the like whose luminescence properties have deteriorated through extended use, the degree of deterioration of the luminescence properties and (ii) adjusting the luminance.

(2) Description of the Related Art

As a type of image display device that uses a current driven light emitting element, an image display device that uses an organic light emitting diode (OLED), i.e. an organic light emitting display, is well known. Since organic light emitting displays have the advantages of excellent viewing angle characteristics and little power consumption, they are attracting attention as a candidate for the next generation of flat panel displays (FPD).

However, in a display device that uses self-luminous elements such as OLEDs, luminescence properties of the light emitting elements deteriorate through extended use, and thus the display luminance decreases. In particular, in a display device in which such light emitting elements are arrayed, the deterioration of light emitting elements differs according to each element's history of light emission. Therefore, not only does display luminance decrease, but also the display screen becomes uneven (Patent Document 1).

In order to solve this sort of problem, it has been proposed to detect the voltage of an OLED to discern the degree of deterioration, and in accordance with the degree of deterioration of the OLED, adjust the luminance.

Patent Document 1

Japanese Patent Application Publication No. 2003-173869

SUMMARY OF THE INVENTION

Problems to be Solved by the Invention

In order to detect the degree of deterioration of an OLED, however, an OLED is caused to emit light at a detection luminance predetermined for deterioration detection instead of at a luminance based on an image that should be displayed. This causes a problem in that the light emission of the OLED stands out compared to the light emission of other peripheral OLEDs, which creates an unpleasant sensation for users.

It is an object of the present invention to solve this sort of problem by providing an organic light emitting display device and control method thereof whereby, even when an OLED is caused to emit light at a detection luminance for detecting deterioration and not at a luminance based on an image that should be displayed, the light emitted by the OLED does not stand out compared to light emitted by peripheral OLEDs, lessening an unpleasant sensation for users.

Means for Solving the Problems

In order to fulfill the above-described object, an organic light emitting display device, one embodiment of the present invention, comprises a display unit including a plurality of pixels, each pixel being provided with a light emitting element; a driving circuit operable to provide each pixel with a luminance signal corresponding to a video signal; and a display control unit operable to (i) control provision of the luminance signal to each pixel by providing the driving circuit with the luminance signal and (ii) provide the driving circuit with a detection luminance signal for detecting deterioration of the light emitting element included in a target pixel, wherein the display control unit divides a luminance that offsets a difference in luminance between a video signal corresponding to the target pixel and the detection luminance signal into a plurality of offset luminances corresponding to peripheral pixels surrounding the target pixel, performs one of an addition and subtraction operation on the offset luminances and luminances indicated by video signals corresponding to the peripheral pixels, and provides the driving circuit with luminance signals corresponding to results of the operation.

Advantageous Effect of the Invention

This embodiment has the advantageous effects of causing the light emitted by a target pixel not to stand out compared to light emitted by peripheral pixels, since a luminance that offsets the difference in luminance between a video signal corresponding to the target pixel and the detection luminance signal is distributed to peripheral unit pixels surrounding the target pixel.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

Figure 1:
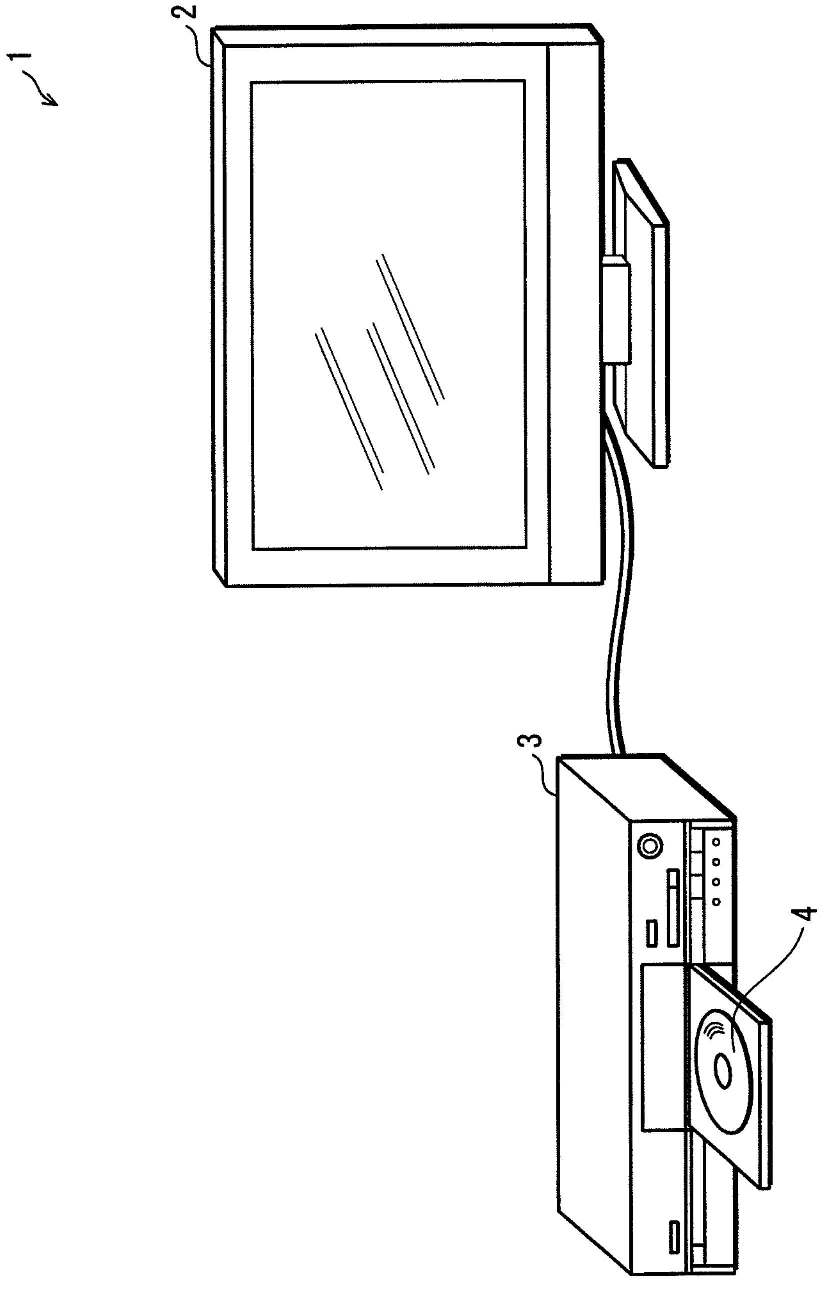
FIG. 1 is a perspective view showing an image display system 1 composed of an organic light emitting display device 2 and a video playback device 3.

The organic light emitting display device in claim 1 comprises: a display unit including a plurality of pixels, each pixel being provided with a light emitting element; a driving circuit operable to provide each pixel with a luminance signal corresponding to a video signal; and a display control unit operable to (i) control provision of the luminance signal to each pixel by providing the driving circuit with the luminance signal and (ii) provide the driving circuit with a detection luminance signal for detecting deterioration of the light emitting element included in a target pixel, wherein the display control unit divides a luminance that offsets a difference in luminance between a video signal corresponding to the target pixel and the detection luminance signal into a plurality of offset luminances corresponding to peripheral pixels surrounding the target pixel, performs one of an addition and subtraction operation on the offset luminances and luminances indicated by video signals corresponding to the peripheral pixels, and provides the driving circuit with luminance signals corresponding to results of the operation.

In the organic light emitting display device, the display control unit may divide the luminance that offsets the difference in luminance between the video signal corresponding to the target pixel and the detection luminance signal into the plurality of offset luminances corresponding to the peripheral pixels surrounding the target pixel so that a total of luminances indicated by the video signals corresponding to the target pixel and to the peripheral pixels is approximately equivalent to a total of luminances indicated by the detection luminance signal and by luminance signals corresponding to peripheral pixels on which the operation with the offset luminances is performed.

With this structure, the sum of luminances before and after distribution does not change, and thus the light emitted by a target pixel does not stand out compared to light emitted by peripheral pixels.

In the organic light emitting display device, the peripheral pixels may be arranged, with respect to the target pixel, in one of a horizontal direction, a vertical direction, and both horizontal and vertical directions.

In the organic light emitting display device, the display control unit may divide the difference in luminance between the luminance indicated by the video signal corresponding to the target pixel and the luminance indicated by the detection luminance signal by a total number of the peripheral pixels to which offset luminances correspond, perform the operation on a value resulting from the division and the luminances indicated by the video signals corresponding to the peripheral pixels, and provide luminance signals corresponding to the peripheral pixels.

With this structure, it is possible to distribute the luminance that offsets the difference in luminance evenly to peripheral pixels, and thus the light emitted by a target pixel does not stand out compared to light emitted by peripheral pixels.

In the organic light emitting display device, the display control unit may provide the detection luminance signal to a target pixel included in the display unit upon detecting that power has been turned on.

In the organic light emitting display device, the display control unit may provide the detection luminance signal to a target pixel included in the display unit each time a predetermined period of time passes.

In the organic light emitting display device, the display control unit may provide the detection luminance signal to a target pixel included in the display unit upon receiving a deterioration detection instruction to detect deterioration of a pixel included in the display unit.

In the organic light emitting display device, the display control unit may provide the detection luminance signal to a target pixel included in the display unit upon detecting a specific video signal among video signals.

The organic light emitting display device in claim 9 comprises: a display unit including a plurality of pixels, each pixel being provided with a light emitting element; a driving circuit operable to provide each pixel with a luminance signal corresponding to a video signal; and a display control unit operable to (i) control provision of the luminance signal to each pixel by providing the driving circuit with the luminance signal and (ii) provide the driving circuit with a detection luminance signal for detecting deterioration of the light emitting element included in a target pixel, wherein the display control unit divides a luminance that offsets a difference in luminance between a video signal corresponding to the target pixel and the detection luminance signal into a plurality of offset luminances corresponding to video signals that are provided subsequently on a playback time axis to the target pixel, performs one of an addition and subtraction operation on the offset luminances and luminances indicated by the video signals that are provided subsequently on a playback time axis to the target pixel, and provides the driving circuit with luminance signals corresponding to results of the operation.

This embodiment has the advantage of causing the light emitted by a target pixel not to stand out along the playback time axis, since a luminance that offsets the difference in luminance between a video signal corresponding to the target pixel and the detection luminance signal is distributed to video signals provided subsequently on a playback time axis to the predetermined pixel subunit.

In the organic light emitting display device, the display control unit may further divide the luminance that offsets the difference in luminance between the video signal corresponding to the target pixel and the detection luminance signal into a plurality of offset luminances corresponding to video signals that are provided to peripheral pixels surrounding the target pixel and are provided subsequently on a playback time axis, perform the operation on the offset luminances and luminances indicated by the video signals that are provided to the peripheral pixels subsequently on a playback time axis, and provide luminance signals corresponding to results of the operation to the peripheral pixels.

This structure has the advantage of causing, along the playback time axis, the light emitted by a target pixel not to stand out compared to light emitted by peripheral pixels, since the offset luminance is distributed to video signals that are provided to peripheral pixel subunits surrounding the predetermined pixel subunit and are provided subsequently on a playback time axis.

In the organic light emitting display device, the display control unit may divide the luminance that offsets the difference in luminance between the video signal corresponding to the target pixel and the detection luminance signal into the plurality of offset luminances corresponding to the video signals that are provided to the target pixel, and to the peripheral pixels, subsequently on a playback time axis so that a total of luminances indicated by the video signals corresponding to the target pixel and to the peripheral pixels is approximately equivalent to a total of (a) the luminance indicated by the detection luminance signal and (b) luminances indicated by the video signals on which the operation with the offset luminances is performed and which are provided to the target pixel, and to the peripheral pixels, subsequently on a playback time axis.

With this structure, the sum of luminances before and after distribution does not change, and thus the light emitted by a target pixel does not stand out compared to light emitted by peripheral pixels.

In the organic light emitting display device, the peripheral pixels may be arranged, with respect to the target pixel, in one of a horizontal direction, a vertical direction, and both horizontal and vertical directions.

In the organic light emitting display device, the display control unit may divide the difference in luminance between the luminance indicated by the video signal corresponding to the target pixel and the luminance indicated by the detection luminance signal by a total number of the target pixel and the peripheral pixels, perform the operation on a value resulting from the division and the luminances indicated by the video signals that are provided to the target pixel, and to the peripheral pixels, subsequently on a playback time axis, and provide luminance signals corresponding to results of the operation.

With this structure, it is possible to distribute the luminance that offsets the difference in luminance evenly to peripheral pixels, and thus the light emitted by a target pixel does not stand out compared to light emitted by peripheral pixels.

In the organic light emitting display device, the display control unit may provide the detection luminance signal to a target pixel included in the display unit upon detecting that power has been turned on.

In the organic light emitting display device, the display control unit may provide the detection luminance signal to a target pixel included in the display unit each time a predetermined period of time passes.

In the organic light emitting display device, the display control unit may provide the detection luminance signal to a target pixel included in the display unit upon receiving a deterioration detection instruction to detect deterioration of a pixel included in the display unit.

In the organic light emitting display device, the display control unit may provide the detection luminance signal to a target pixel included in the display unit upon detecting a specific video signal among video signals.

The control method in claim 18 is a method to control an organic light emitting display device provided with: a display unit including a plurality of pixels, each pixel being provided with a light emitting element; a driving circuit operable to provide each pixel with a luminance signal corresponding to a video signal; and a display control unit operable to (i) control provision of the luminance signal to each pixel by providing the driving circuit with the luminance signal and (ii) provide the driving circuit with a detection luminance signal for detecting deterioration of the light emitting element included in a target pixel, the method comprising: seeking a luminance that offsets a difference in luminance between a video signal corresponding to the target pixel and the detection luminance signal; and dividing the sought luminance into a plurality of offset luminances corresponding to peripheral pixels surrounding the target pixel, performing one of an addition and subtraction operation on the offset luminances and luminances indicated by video signals corresponding to the peripheral pixels, and providing the driving circuit with luminance signals corresponding to results of the operation.

This embodiment has the advantage of causing the light emitted by a target pixel not to stand out compared to light emitted by peripheral pixels, since a luminance that offsets the difference in luminance between a video signal corresponding to the target pixel and the detection luminance signal is distributed to peripheral pixels surrounding the target pixel.

The control method in claim 19 is a method to control an organic light emitting display device provided with: a display unit including a plurality of pixels, each pixel being provided with a light emitting element; a driving circuit operable to provide each pixel with a luminance signal corresponding to a video signal; and a display control unit operable to (i) control provision of the luminance signal to each pixel by providing the driving circuit with the luminance signal and (ii) provide the driving circuit with a detection luminance signal for detecting deterioration of the light emitting element included in a target pixel, the method comprising: seeking a luminance that offsets a difference in luminance between a video signal corresponding to the target pixel and the detection luminance signal; and dividing the sought luminance into a plurality of offset luminances corresponding to video signals that are provided subsequently on a playback time axis to the target pixel, performing one of an addition and subtraction operation on the offset luminances and luminances indicated by the video signals that are provided subsequently on a playback time axis to the target pixel, and providing the driving circuit with luminance signals corresponding to results of the operation.

This embodiment has the advantage of causing the light emitted by a target pixel not to stand out along the playback time axis, since a luminance that offsets the difference in luminance between a video signal corresponding to the target pixel and the detection luminance signal is distributed to video signals provided subsequently on a playback time axis to the predetermined pixel subunit.

1. Embodiment 1

1.1 Image Display System 1

The following is a description of an image display system 1 as Embodiment 1 of the present invention.

(1) Structure of Image Display System 1

As shown in FIG. 1, the image display system 1 is composed of an organic light emitting display device 2 and a video playback device 3. The video playback device 3 decodes compressed video data and audio data recorded on a DVD 4 and generates a video signal and audio signal, outputting the generated video signal and audio signal to the organic light emitting display device 2. The organic light emitting display device 2 receives the video signal and audio signal from the video playback device 3, displays video based on the received video signal, and outputs audio based on the received audio signal. Note that the audio signal is not the main focus of the present invention, and an explanation thereof is omitted in the following description.

Figure 2:
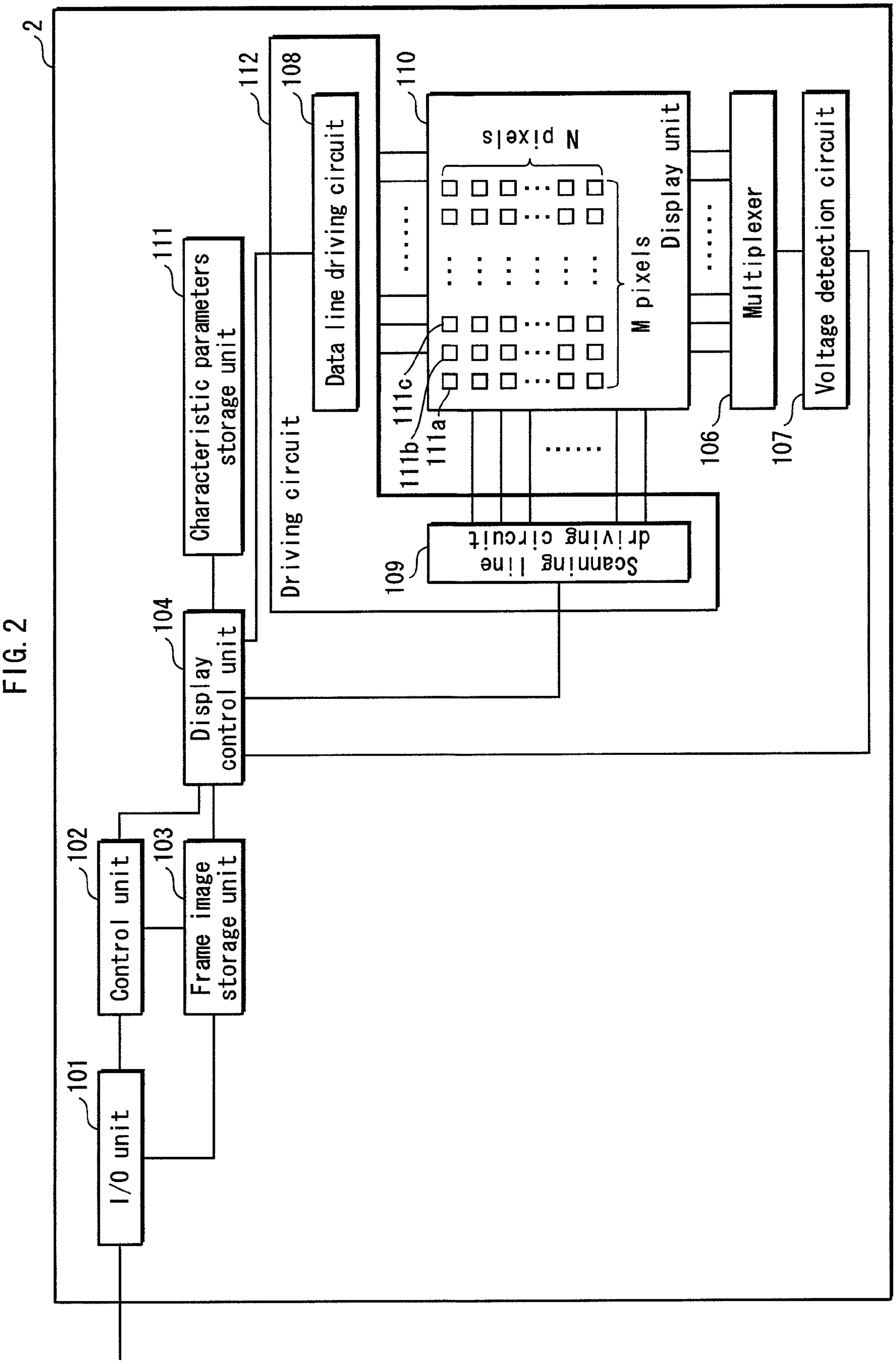
FIG. 2 is a block diagram showing the configuration of the organic light emitting display device 2.

As shown in FIG. 2, the organic light emitting display device 2 is composed of an I/O unit 101, control unit 102, frame image storage unit 103, display control unit 104, multiplexer 106, voltage detection circuit 107, driving circuit 112, display unit 110, and characteristic parameters storage unit 111. The driving circuit 112 includes a data line driving circuit 108 and scanning line driving circuit 109.

The I/O unit 101 is connected to the video playback device 3 and via control by the control unit 102 receives a video signal from the video playback device 3, writing the received video signal as a frame image in the frame image storage unit 103.

The frame image storage unit 103 is memory for storing the received video signal as a frame image.

The control unit 102 controls the operations of the I/O unit 101, display control unit 104, and frame image storage unit 103.

The display unit 110 is composed of a total of M×N pixels 111*a*, 111*b*, 111*c*, . . . arranged in a matrix with rows of M pixels and columns of N pixels. Also, the display unit 110 is connected to the data line driving circuit 108 via M data lines disposed along the columns and is connected to the scanning line driving circuit 109 via N scanning lines disposed along the rows.

The characteristic parameters storage unit 111 stores characteristic parameters for each pixel. The main characteristic parameters are a pair composed of gain and offset, which are sought from the luminance/voltage characteristics for each pixel and from a representative transformation curve, i.e. luminance/voltage characteristics common to the pixels in the entire display device.

The display control unit 104 has the function of controlling the scanning line driving circuit 109, data line driving circuit 108, and characteristic parameters storage unit 111. The display control unit 104 reads the characteristic parameters written in the characteristic parameters storage unit 111, adjusts the video signal data input from an external device in accordance with the characteristic parameters, and outputs the adjusted video signal data to the data line driving circuit 108. Specifically, via control by the control unit 102, the display control unit 104 reads a frame image from the frame image storage unit 103, and with the video signal for the read frame image controls the data line driving circuit 108 and the scanning line driving circuit 109, thereby making the OLED in each pixel in the display unit 110 emit light. Also, from among the OLED pixels in the display unit 110, the display control unit 104 acquires the adjustment luminance (in other words, the adjustment luminance signal) for the pixel corresponding to the OLED targeted for deterioration detection. The display control unit 104 then calculates, for the pixel corresponding to the OLED targeted for deterioration detection, a spatial periphery (i.e. spatial neighborhood) and a temporal periphery (i.e. temporal neighborhood) as well as the peripheral luminance (i.e. neighboring luminance) for peripheral pixels (i.e. neighboring pixels) existing in the spatial periphery or temporal periphery. In accordance with the adjustment luminance and the peripheral luminance, the display control unit 104 controls the data line driving circuit 108 and the scanning line driving circuit 109 to make the OLEDs in the target pixel and peripheral pixels emit light. Furthermore, via the multiplexer 106 and the voltage detection circuit 107, the display control unit 104 receives voltage information on anode voltage for the OLED in each pixel in the display unit 110 and stores the received voltage information.

In this embodiment, the display control unit 104 is composed of a digital signal processor (DSP) and memory storing programs and achieves its functions via the DSP operating in accordance with the programs stored in the memory.

Via control by the display control unit 104, the data line driving circuit 108 and scanning line driving circuit 109 control emission of light by the OLED in each pixel in the display unit 110.

The multiplexer 106 switches the voltage detection circuit 107 and the data line connected to the voltage detection circuit 107 on and off. Specifically, for each of the M data lines connected to the voltage detection circuit 107, the multiplexer 106 conductively connects the data line and the voltage detection circuit 107 and makes the connection between the other M−1 data lines and the voltage detection circuit 107 non-conductive.

Via the multiplexer 106, the voltage detection circuit 107 detects the anode voltage for the OLED in each pixel in the display unit 110 and outputs voltage information on the detected anode voltage to the display control unit 104.

(2) Circuit Configuration of the Pixel 111*a*

The circuit configuration of the pixel 111*a* in the display unit 110, as well as the connection between the pixel 111*a*, scanning line driving circuit 109, data line driving circuit 108, multiplexer 106, and voltage detection circuit 107 are described with reference to FIG. 3.

Figure 3:
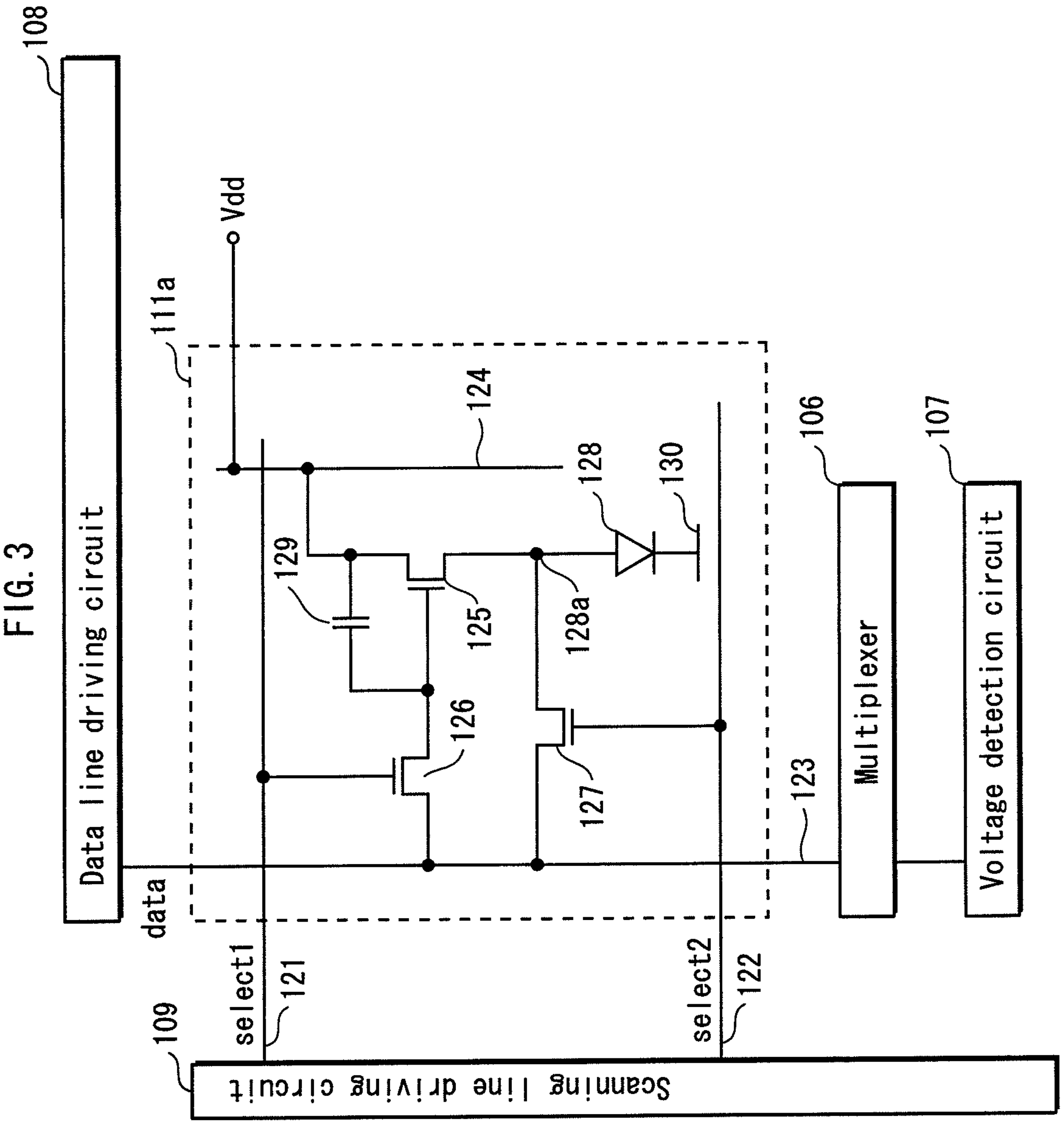
FIG. 3 is a block diagram showing the circuit configuration of a pixel 111*a* in a display unit 110 and a method to connect the pixel 111*a*, a scanning line driving circuit 109, data line driving circuit 108, multiplexer 106, and voltage detection circuit 107.

As shown in FIG. 3, the pixel 111*a* includes a driving transistor 125, switching transistor 126, test transistor 127, OLED 128, capacitive element 129, and common electrode 130. Also, via a data line 123, the pixel 111*a* is connected to the data line driving circuit 108 and multiplexer 106 and, via a scanning line 121 and a test line 122, is connected to the scanning line driving circuit 109. The pixel 111*a* is also connected to a power line 124. The common electrode 130 is normally grounded, and the power line 124 is connected to a power source of a constant voltage Vdd.

Note that the other pixels in the display unit 110 have the same circuit configuration as the pixel 111*a* and are connected to the scanning line driving circuit 109, data line driving circuit 108, multiplexer 106, and voltage detection circuit 107 in the same way; thus, a description thereof is omitted.

The OLED 128 functions as a light emitting element and emits light in accordance with the current between source and drain provided by the driving transistor 125. An anode 128*a*, one terminal of the OLED 128, is connected to the driving transistor 125, and a cathode, i.e. the other terminal, is connected to the common electrode 130.

Via the switching transistor 126, the gate of the driving transistor 125 is connected to a data line 123, one of either the source and the drain of the driving transistor 125 is connected to a power line 124, and the other of either the source and the drain of the driving transistor 125 is connected to the anode 128*a* of the OLED 128. At the gate of the driving transistor 125, the signal voltage output from the data line driving circuit 108 is impressed via a data line 123 and the switching transistor 126. The current between source and drain, corresponding to the signal voltage impressed on the gate, flows to the OLED 128 via the anode 128*a* in the OLED 128.

The gate of the switching transistor 126 is connected to a scanning line 121, one of either the source and the drain of the switching transistor 126 is connected to a data line 123, and the other of either the source and the drain of the switching transistor 126 is connected to the gate of the driving transistor 125. When the voltage level of the scanning line 121 turns ON, the switching transistor 126 enters a conducting state, and the signal voltage from the data line driving circuit 108 is impressed on the gate of the driving transistor 125.

The gate of the test transistor 127 is connected to a test line 122, one of either the source and the drain of the test transistor 127 is connected to the anode 128*a* of the OLED 128, and the other of either the source and the drain of the test transistor 127 is connected to a data line 123. When the voltage level of the test line 122 turns ON, the test transistor 127 enters a conducting state, and the anode voltage of the OLED 128 is detected by the voltage detection circuit 107 via the data line 123 and the multiplexer 106.

One terminal of the capacitive element 129 is connected to the gate of the driving transistor 125, and the other terminal is connected to the power line 124. Since the capacitive element 129 maintains the signal voltage provided to the gate of the driving transistor 125, the anode voltage of the OLED 128 is detected by the data line 123, test transistor 127, and voltage detection circuit 107 while the current between source and drain, corresponding to the signal voltage, flows.

From among the M×N pixels composing the display unit 110, the scanning line driving circuit 109 selects M pixels a row at a time, selecting pixels in columns by a predetermined time sequence. In other words, the scanning line driving circuit 109 selects row 1 of M pixels, then selects row 2 of M pixels, then selects row 3 of M pixels. Selection of each row of M pixels is repeated until reaching row N. In this embodiment, the scanning line driving circuit 109 selects or does not select the pixel 111*a*, for example, by controlling conduction or non-conduction of the switching transistor 126 in the pixel 111*a*.

The data line driving circuit 108 has the function of outputting, via the data line 123 disposed along a column, a signal voltage to the pixel 111*a* in the display device 110 and determining the signal current that flows to the driving transistor 125 in the pixel 111*a*.

(3) Operations in Deterioration Measurement of an OLED

The operations for deterioration measurement of a single OLED are described with reference to FIGS. 4-8.

Figure 6:
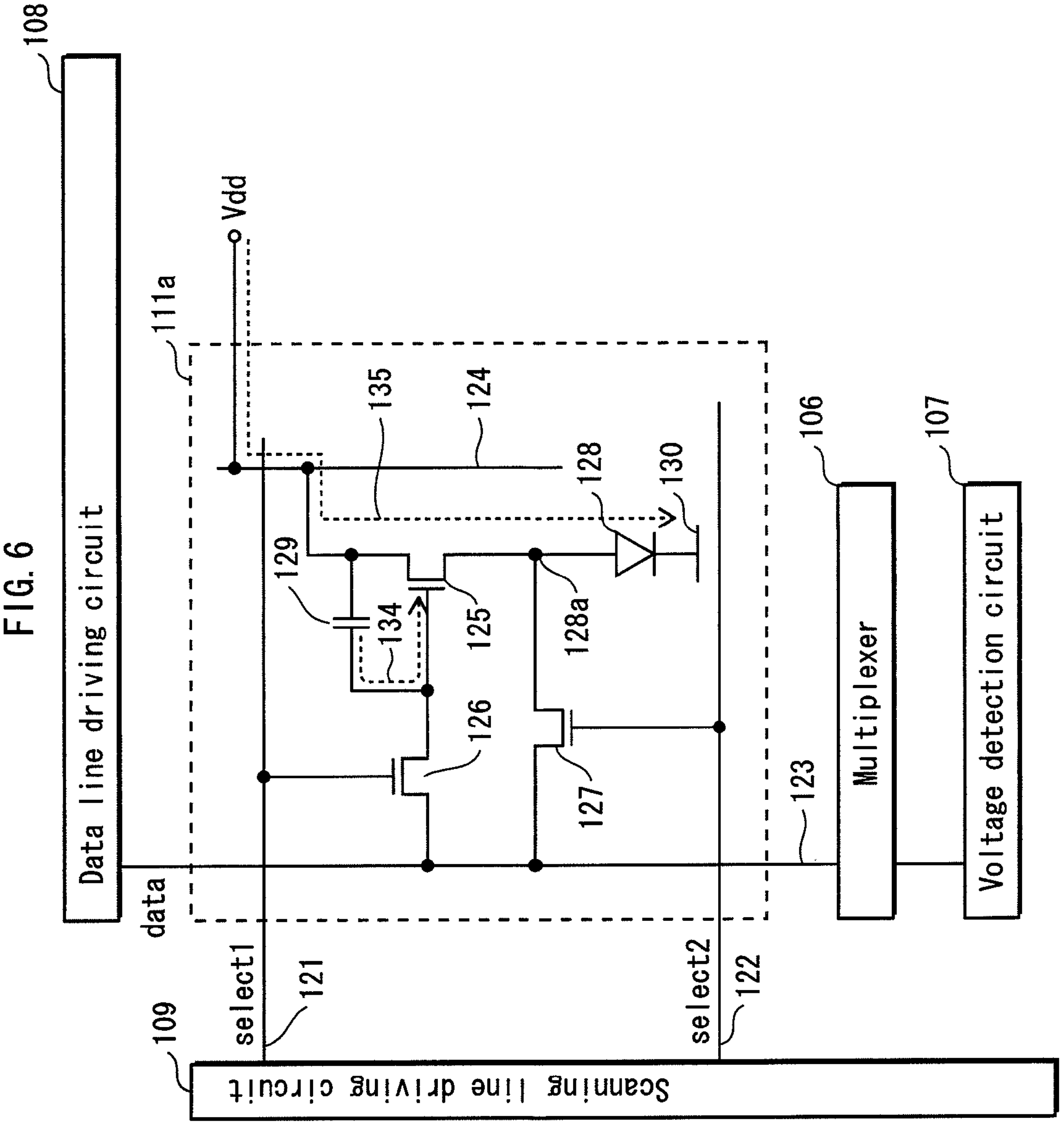
FIG. 6 is a circuit diagram showing the operation of the pixel 111*a* when the driving transistor 125 continually runs a current corresponding to the voltage stored in the capacitive element 129 to the OLED 128 after (i) the scanning line driving circuit 109 turns the voltage level of the scanning line 121 OFF and (ii) the switching transistor 126 enters a non-conducting state.
Figure 7:
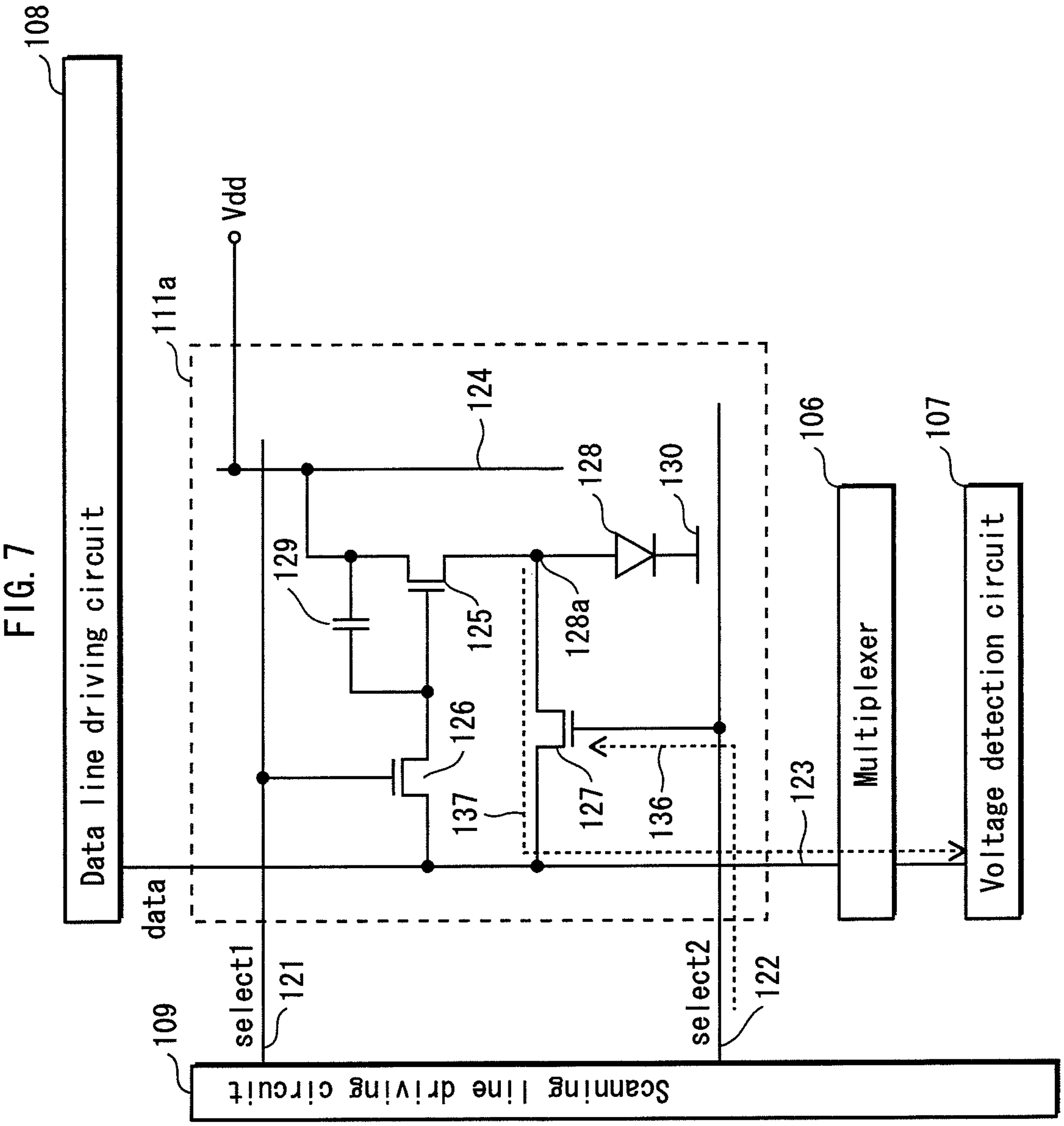
FIG. 7 is a circuit diagram showing the operation of the pixel 111*a* when the voltage detection circuit 107 detects the anode voltage of the OLED 128 after (i) the scanning line driving circuit 109 turns the voltage level of the test line 122 ON and (ii) the test transistor 127 enters a conducting state.
Figure 8:
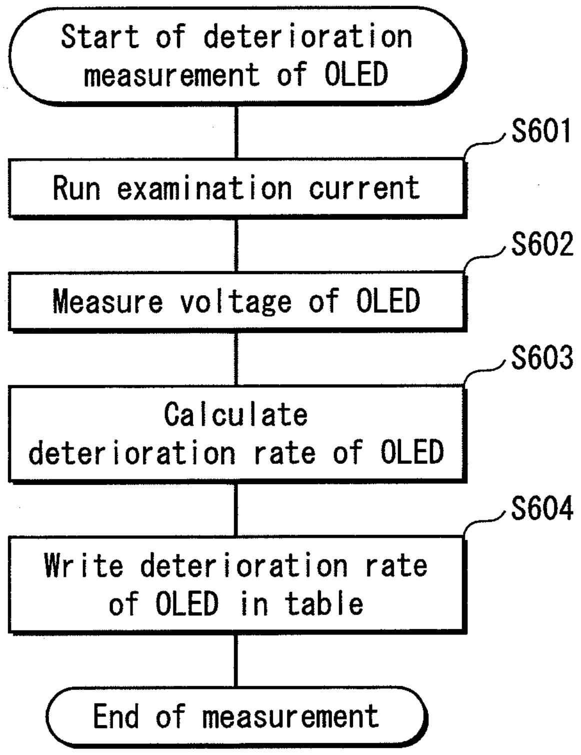
FIG. 8 is a flowchart showing the operations in deterioration measurement of an OLED.

FIGS. 4-7 are circuit diagrams showing the operation of the pixel 111*a*. FIG. 8 is a flowchart showing the operations in deterioration measurement of an OLED. As shown in FIG. 8, deterioration measurement of an OLED is performed by running an examination current to an OLED targeted for deterioration measurement (step S601) and measuring the anode voltage of the OLED targeted for examination (step S602). The deterioration rate of the OLED targeted for examination is then calculated (step S603), and the calculated deterioration rate is written in a deterioration characteristics table 711 (step S604), described below.

Next, each step in FIG. 8 is described in detail.

(i) Running an Examination Current (Step S601 in FIG. 8)

Figure 4:
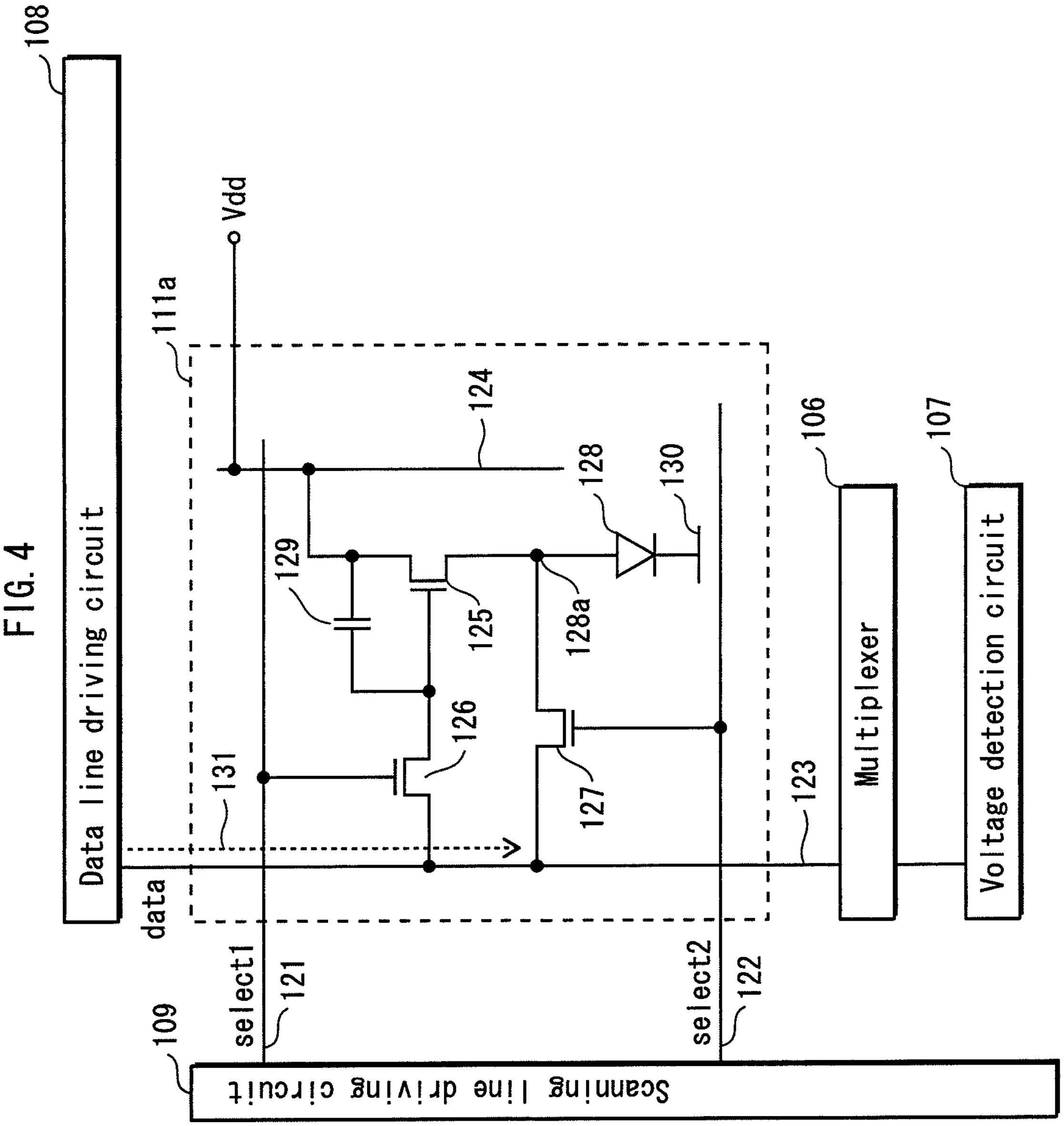
FIG. 4 is a circuit diagram showing the operation of the pixel 111*a* when the data line driving circuit 108 outputs a signal voltage to the data line 123.
Figure 5:
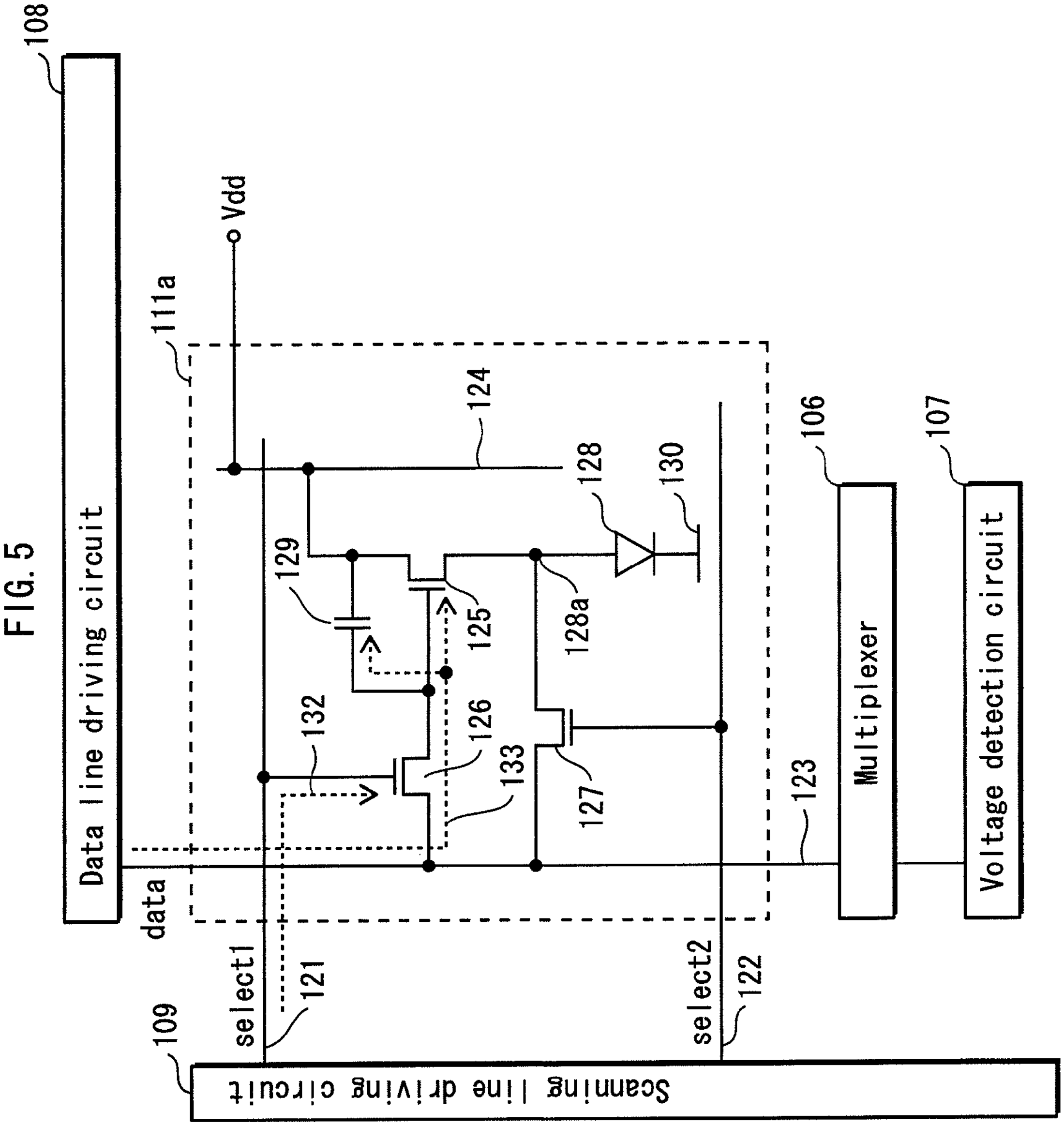
FIG. 5 is a circuit diagram showing the operation of the pixel 111*a* when signal voltage is provided to the driving transistor 125 and the capacitive element 129 after (i) the scanning line driving circuit 109 turns the voltage level of the scanning line 121 ON and (ii) the switching transistor 126 enters a conducting state.

First, the data line driving circuit 108 outputs a signal voltage to a data line 123 via the path 131 in FIG. 4. This signal voltage is a voltage corresponding to an examination current for deterioration measurement of an OLED. Next, the scanning line driving circuit 109 turns the voltage level of a scanning line 121 ON via the path 132 in FIG. 5, and the switching transistor 126 enters a conducting state. In this way, the signal voltage is impressed on the gate of the driving transistor 125 via the path 133 in FIG. 5, and the signal voltage is provided to the capacitive element 129.

Next, the scanning line driving circuit 109 turns the voltage level of the scanning line 121 OFF, and the switching transistor 126 enters a non-conducting state. In this way, impression of signal voltage on the gate of the driving transistor 125 ends, and provision of an electric charge to the capacitive element 129 ends. Next, the voltage maintained by the capacitive element 129 is impressed on the gate of the driving transistor 125 via the path 134 in FIG. 6, and the driving transistor 125 continually sends a current corresponding to the voltage maintained by the capacitive element 129 to the OLED 128 via the path 135 in FIG. 6. This current is the examination current for deterioration measurement of the OLED 128, and when this examination current flows to the OLED 128, the OLED 128 emits light at a luminance in accordance with the examination current.

As shown by the path 135 in FIG. 6, the examination current flows from the power line 124 to the OLED 128 via the driving transistor 125.

Note that while the above description pertains to running an examination current to an OLED, operations are the same when not performing deterioration measurement of an OLED, but rather causing the OLED to emit light at a luminance based on a video signal. For deterioration measurement, an examination current is run, whereas for normal light emission, a current corresponding to luminance based on a video signal is run.

(ii) Measuring the Voltage of the OLED (Step S602 in FIG. 8)

Next, the data line driving circuit 108 stops output of signal voltage to the data line 123. In this way, the connection between the data line driving circuit 108 and the data line 123 becomes open. The scanning line driving circuit 109 then turns the voltage level of the test line 122 ON. In this way, the test transistor 127 enters a conducting state, and the anode 128*a* in the OLED 128 and the data line 123 are connected.

Next, the voltage detection circuit 107 detects the voltage of the data line 123. The path 137 in FIG. 7 indicates the detection path for the anode voltage. As shown in FIG. 7, the voltage detection circuit 107 detects the anode voltage of the OLED 128 via the test transistor 127 and the multiplexer 106. In this way, the voltage detection circuit 107 detects the anode voltage of the OLED 128.

Next, the voltage detection circuit 107 outputs voltage information corresponding to the detected anode voltage to the display control unit 104.

Finally, the scanning line driving circuit 109 turns the voltage level of the test line 122 OFF. The test transistor 127 thus enters a non-conducting state.

(iii) Calculating the Deterioration Rate of the OLED (Step S603 in FIG. 8)

The relationship between deterioration of an OLED and the current-voltage characteristics of an OLED is described with reference to FIG. 9.

Figures 9, 10:
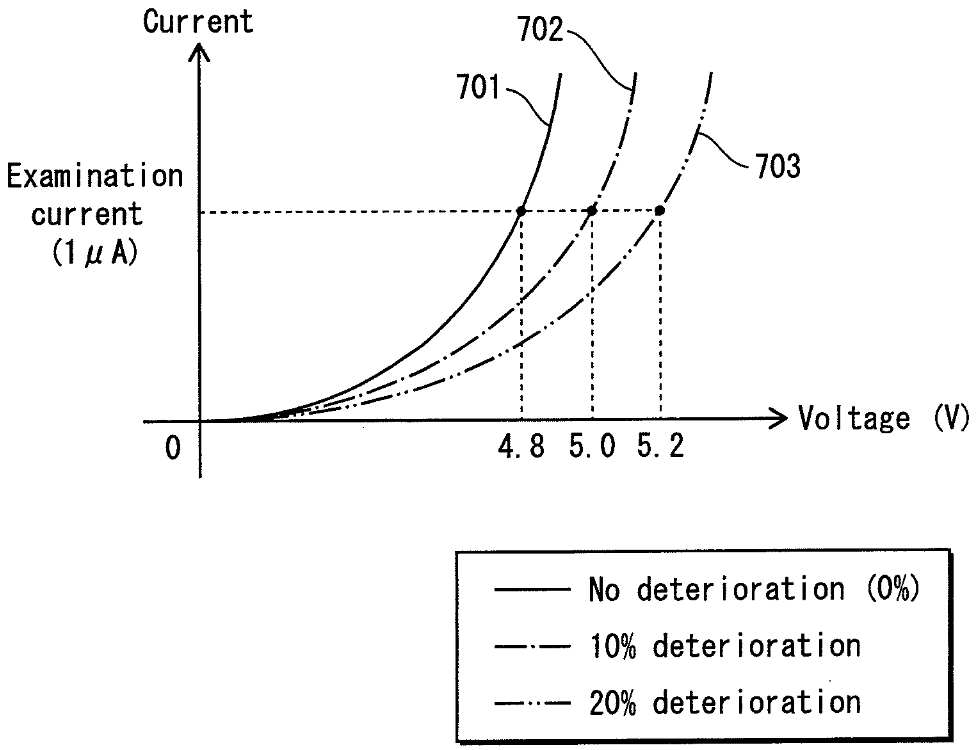
FIG. 9 shows current-voltage characteristics of an OLED.
FIG. 10 shows a sample table configuration for a deterioration characteristics table 711.

FIG. 9 shows an example of current-voltage characteristics of an OLED. It is known that when sending a fixed current (examination current) to an OLED, the anode voltage detected from the OLED depends on the degree of deterioration of the OLED. In FIG. 9, the vertical axis indicates current flowing to an OLED, and the horizontal axis indicates the anode voltage detected from the OLED. The examination current in this case is, as an example, 1 μA. The curve 701 indicates the current-voltage characteristics of an OLED with a 0% deterioration rate, the curve 702 indicates the current-voltage characteristics of an OLED with a 10% deterioration rate, and the curve 703 indicates the current-voltage characteristics of an OLED with a 20% deterioration rate. As can be seen from FIG. 9, as deterioration of an OLED progresses, the anode voltage detected from the OLED decreases. In other words, it is clear that the anode voltage detected from an OLED when a fixed voltage (examination voltage) is run to the OLED depends on the degree of deterioration of the OLED.

As shown in FIG. 10, the characteristic parameters storage unit 111 pre-stores a deterioration characteristics table 711. The deterioration characteristics table 711 is based on actual measurement values. When a fixed examination current (as an example, 1 μA) was sent to a plurality of OLEDs with known deterioration rates (0%, 10%, and 20%), the anode voltage detected from each OLED was measured (as examples, 4.8 V, 5.0 V, and 5.2 V). The deterioration characteristics table 711 stores measurements of voltages and their respective deterioration rates.

The display control unit 104 receives voltage information corresponding to the anode voltage from the voltage detection circuit 107 and reads the deterioration rate corresponding to the received voltage information from the deterioration characteristics table 711. When the exact voltage shown by the received voltage information does not exist as a measured voltage in the deterioration characteristics table 711, then for example, the display control unit 104 reads from the deterioration characteristics table 711 the two examination voltages closest to the voltage indicated by the voltage information and, using the two read examination voltages, calculates the deterioration rate via linear interpolation.

(iv) Writing the Deterioration Rate of the OLED in a Table (Step S604 in FIG. 8)

The characteristic parameters storage unit 111 pre-stores the above-described deterioration rate table 711. The display control unit 104 writes the calculated deterioration rate in the deterioration rate table 711 within the characteristic parameters storage unit 111 along with position identification information that indicates the position within the display unit 110 of the OLED targeted for measurement.

(4) Operations of the Pixel 111*a* and the Surrounding Circuitry

Figure 11:
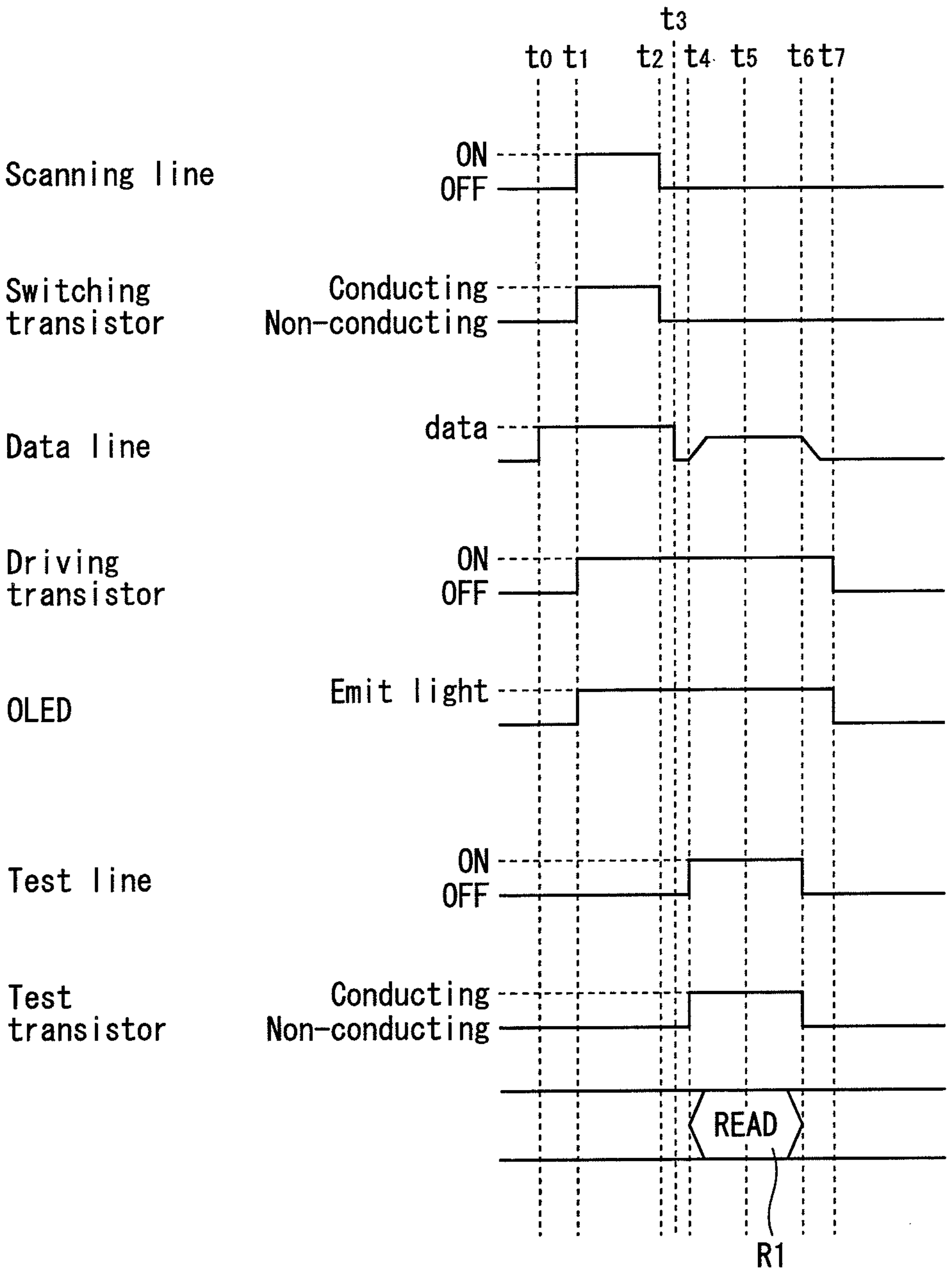
FIG. 11 is a time chart showing changes in operational state over time for a scanning line 121, switching transistor 126, data line 123, driving transistor 125, OLED 128, test line 122, and test transistor 127.

FIG. 11 shows changes in operational state over time for a scanning line 121, switching transistor 126, data line 123, driving transistor 125, OLED 128, test line 122, and test transistor 127.

At time t0, the data line driving circuit 108 outputs a signal voltage to a data line 123.

Next, at time t1, the scanning line driving circuit 109 turns the voltage level of a scanning line 121 ON, the switching transistor 126 enters a conducting state, the signal voltage is impressed on the gate of the driving transistor 125, and the signal voltage is provided to the capacitive element 129.

Next, at time t2, the scanning line driving circuit 109 turns the voltage level of the scanning line 121 OFF, the switching transistor 126 enters a non-conducting state, impression of the signal voltage on the gate of the driving transistor 125 ends, and provision of an electric charge to the capacitive element 129 ends. At this time, the driving transistor 125 continues to send, to the OLED 128, a current corresponding to the voltage maintained by the capacitive element 129. When this current flows to the OLED 128, the OLED 128 emits light at a luminance in accordance with the current.

Next, at time t3, the data line driving circuit 108 stops outputting signal voltage to the data line 123, and the connection between the data line driving circuit 108 and the data line 123 becomes open.

Next, at time t4, the scanning line driving circuit 109 turns the voltage level of the test line 122 ON, and the test transistor 127 enters a conducting state, thereby connecting the anode 128*a* of the OLED 128 with the data line 123.

Next, at time t5, the voltage detection circuit 107 detects the voltage of the data line 123. In this way, the anode voltage of the OLED 128 is detected.

Finally, at time t6, the scanning line driving circuit 109 turns the voltage level of the test line 122 OFF, and the test transistor 127 enters a non-conducting state, thereby ending a sequence of operations.

While this concludes a description of the principle by which the OLED 128 emits light, display of an image by the display unit 110 depends on operation of the data line driving circuit 108 and the scanning line driving circuit 109.

That is, the data line driving circuit 108 outputs a signal voltage to each of the data lines and maintains this voltage for a fixed period. During this period, the scanning line driving circuit 109 provides a scanning signal to one row. When the scanning signal is supplied, the switching transistors 126 in the pixels in the row enter a conducting state, and the signal voltage provided to each data line is impressed on the gate of the driving transistor 125 in the corresponding pixel. In accordance with the size of the signal voltage, the current flowing to the driving transistor 125 is controlled, and thus the OLED 128 emits light in accordance with the amount of the current. The emission of light continues for the duration of one frame until the row is once again designated by the scanning line driving circuit 109.

During the period of light emission by the OLED 128 (t1-t7), the scanning line driving circuit 109 controls the test transistor 127 in the pixel 111*a* so that it is in a conducting state. That is, in order to detect the anode voltage of the OLED 128 via the test line 122, the scanning line driving circuit 109 provides a signal voltage to the gate of the test transistor 127. During that period (t4-t6), the test transistor 127 enters a conducting state (t4-t6), and while the test transistor 127 is in a conducting state (t4-t6), the current flowing to the driving transistor, i.e. the anode voltage of the OLED 128 generated by the current flowing to the OLED 128, is impressed on the data line 123 via the test transistor 127. During this period (t4-t6), via the multiplexer 106, the voltage detection circuit 107 detects the anode voltage of the OLED 128 (t5) on the data line 123. It is possible to learn the degree of deterioration of the OLED by using the anode voltage of the OLED 128 thus detected.

From when the scanning line driving circuit 109 provides a scanning signal to one row until it provides a scanning signal to the next row, the data line driving circuit 108 provides a new signal voltage to all of the data lines. The same operations are performed as for pixels in the previous row, and at the moment the scanning signal was provided, a new signal voltage is impressed on the gate of the driving transistors 125 in the pixels of the next row, and a signal current in accordance with the signal voltage flows to the OLEDs, causing the OLEDs to emit light for the duration of one frame.

Each time the data line driving circuit 108 provides a new signal voltage and the scanning line driving circuit 109 provides a scanning signal to a new row, the OLEDs in the pixels in the row to which a scanning signal is provided emit light for the duration of one frame, as above.

In this way, the OLEDs in the entire display unit 110 all emit light, albeit with a time difference, at a brightness corresponding to the size of the signal voltage provided to each OLED, and thus the entire display unit 110 displays an image.

(5) Display Control Unit 104

The display control unit 104 includes an acquisition unit, calculation unit (also called distribution unit), and output unit, which are not shown in the figures.

The display control unit 104 pre-stores, for a target light emitting element (i.e. OLED) that is the target of deterioration detection, an adjustment luminance V (i.e. an adjustment luminance signal, or a detection luminance signal, corresponding to the examination current that flows to the target light emitting element). The display control unit 104 also pre-stores an adjustment pixel position C that indicates the position of the pixel targeted for adjustment. The acquisition unit reads the stored adjustment luminance V and adjustment pixel position C. The calculation unit distributes the luminance difference, which is the change, due to adjustment based on the adjustment luminance V, in the original luminance of the target pixel corresponding to the target light emitting element, among peripheral pixels arranged in the spatial periphery (neighborhood) of the target pixel, thereby reducing the original luminance of the peripheral pixels. In this way, the calculation unit calculates the periphery luminance (driving signal) for the peripheral pixels. Thus, the change is offset between the target pixel and the peripheral pixels. In this way, the calculation unit performs calculations so as to distribute, among pixels peripheral to the target pixel corresponding to the target light emitting element, luminances that offset the difference between the original luminance and the adjusted luminance for the target light emitting element.

Figure 12:
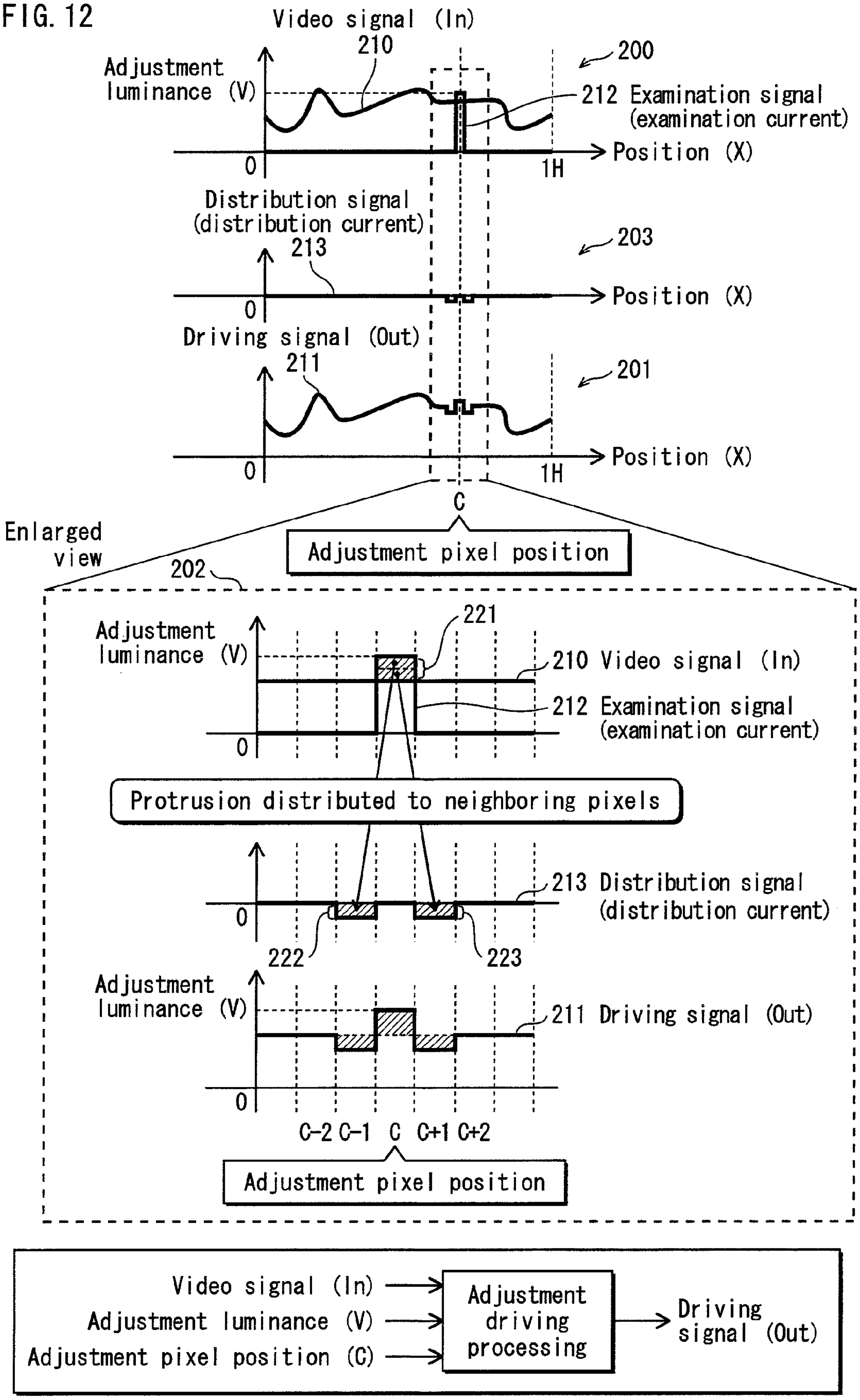
FIG. 12 shows a video signal IN, a distribution signal, and a driving signal OUT.

The graph 200 in FIG. 12 shows a horizontal line in a frame image, i.e. a video signal 210 output to M pixels in a row in the display device 110. The horizontal axis of the graph 200 represents the position of pixels (pixel position), and the vertical axis represents the pixel values. The graph 200 also shows an examination signal 212. The examination signal 212 has a value of adjustment luminance V at adjustment pixel position C, and a value of "0" at other pixel positions. The examination signal 212 corresponds to the examination current sent to an OLED to measure the deterioration of the OLED.

As shown in FIG. 12, at adjustment pixel position C, the display control unit 104 outputs the adjustment luminance V determined by the examination signal 212 instead of the luminance determined by the video signal 210. Therefore, as shown in FIG. 12, at adjustment pixel position C, the display control unit 104 generates and outputs a driving signal 211 having an adjustment luminance V.

Since a driving signal 211 is thus generated and output, the driving signal 211 then causing the OLED to emit light, as shown in FIG. 12, at adjustment pixel position C, a difference 221 exists between the luminance indicated by the video signal 210 and the adjustment luminance V indicated by the examination signal 212. Therefore, the adjustment pixel position C stands out unnaturally.

Accordingly, the display control unit 104 generates a distribution signal 213 to distribute, between the pixel position C−1 immediately before the adjustment pixel position C and the pixel position C+1 immediately after the adjustment pixel position C, the difference 221 between the luminance indicated by the video signal 210 and the adjustment luminance V indicated by the examination signal 212. At pixel positions other than pixel position C−1 and pixel position C+1, the distribution signal 213 has a value of "0", and at pixel position C−1 and pixel position C+1, the distribution signal 213 has values 222 and 223, which are a negative value of half the difference 221.

The graph 203 in FIG. 12 shows a distribution signal 213. In the graph 203, as in the graph 200, the horizontal axis represents the position of pixels (pixel position), and the vertical axis represents the pixel values.

Next, the display control unit 104 adds the video signal 210, examination signal 212, and distribution signal 213 to generate a driving signal 211.

The graph 201 in FIG. 12 shows the driving signal 211. In the graph 201, as in the graph 200, the horizontal axis represents the position of pixels (pixel position), and the vertical axis represents the pixel values.

Figure 13:
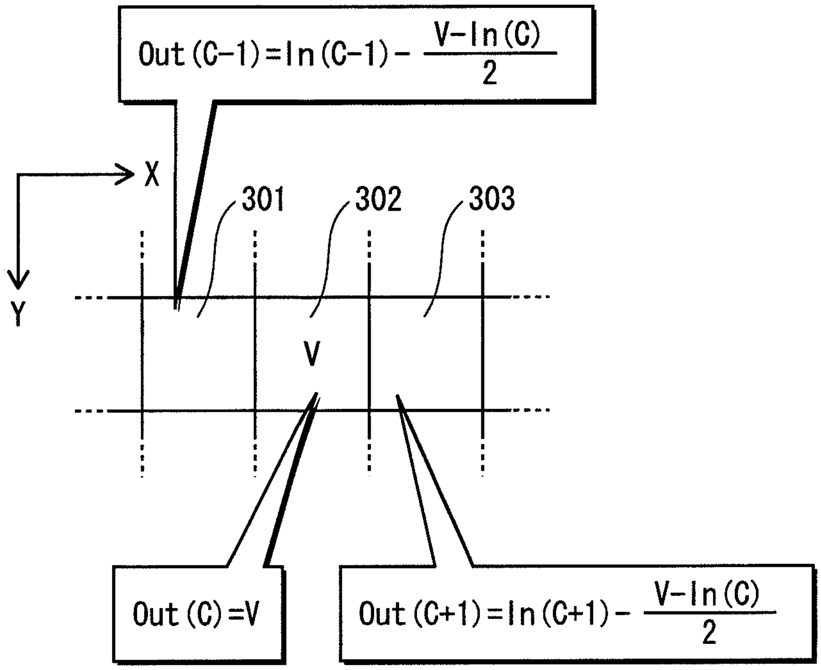
FIG. 13 shows the driving signals for a peripheral pixel 301, target pixel 302, and peripheral pixel 303, which lie on a horizontal line in a frame image.

As shown in FIG. 13, along a horizontal line of a frame image to be displayed on the display unit 110, peripheral pixel 301, target pixel 302, and peripheral pixel 303 are arranged in this order. Target pixel 302 is a pixel corresponding to an OLED targeted for deterioration detection, peripheral pixel 301 is a pixel immediately before the target pixel 302 in the horizontal direction, and peripheral pixel 303 is a pixel immediately after the target pixel 302 in the horizontal direction.

As shown in FIG. 13, the calculation unit calculates the driving signal for the target pixel 302 as Out(C)=V. In this equation, C is a pixel position indicating the position of the target pixel 302. For the peripheral pixel 301 located immediately before the target pixel 302 in the horizontal direction, the calculation unit calculates the driving signal as Out(C−1)=In(C−1)−(V−In(C))/2.

That is, the calculation unit calculates the difference (V−In(C)) between the adjustment luminance V and the video signal luminance In(C) for the target pixel, divides the calculated difference by the number of peripheral pixels, "2", and subtracts the result from the value In(C−1) of the video signal corresponding to the peripheral pixel position, thus calculating the driving signal Out(C−1) and outputting the calculated driving signal.

Modifying this calculation equation yields Out(C−1)=In(C−1)+(In(C)−V)/2.

That is, the calculation unit may calculate the difference (In(C)−V) between the video signal luminance In(C) for the target pixel and the adjustment luminance V, divide the calculated difference by the number of peripheral pixels, "2", and add the result to the value In(C−1) of the video signal corresponding to the peripheral pixel position, thus calculating the driving signal Out(C−1) and outputting the calculated driving signal.

The denominator "2" of the second term in the right-hand side of the above equations indicates the number of peripheral pixels. In the example shown in FIG. 13, the peripheral pixels are peripheral pixel 301 and peripheral pixel 303, and the number thereof is two.

For the peripheral pixel 303 located immediately after the target pixel 302 in the horizontal direction, the calculation unit calculates the driving signal as Out(C+1)=In(C+1)−(V−In(C))/2.

As shown in FIG. 12, the output unit outputs the calculated driving signals Out(C−1), Out(C), and Out(C+1) in this order as the driving signal (Out) 211.

In FIG. 12, the video signal 210 in the graph 200, in which the horizontal axis is the pixel position and the vertical axis is the output value of the video signal, is output after changing into the driving signal 211 in the graph 201, in which the horizontal axis is the pixel position and the vertical axis is the output value of the driving signal. As shown in the enlarged view 202 of FIG. 12, at adjustment pixel position C, the driving signal becomes the adjustment luminance V. At positions C−1 and C+1 next to adjustment pixel position C, the value of the driving signal is calculated as above.

$$\text{Here, } Out(C-1)+Out(C)+Out(C+1)=In(C-1)-(V-In(C))/2+V+In(C+1)-(V-In(C))/2=In(C-1)+In(C)+In(C+1).$$

The total of the luminances of the peripheral pixel 301, the target pixel 302, and the peripheral pixel 303 before adjustment is equivalent to the total of the luminances of the peripheral pixel 301, the target pixel 302, and the peripheral pixel 303 after adjustment.

(6) Operations of the Organic Light Emitting Display Device 2

Next, the operations of the organic light emitting display device 2 are described.

(a) Overall Operations of the Organic Light Emitting Display Device 2

Figure 14:
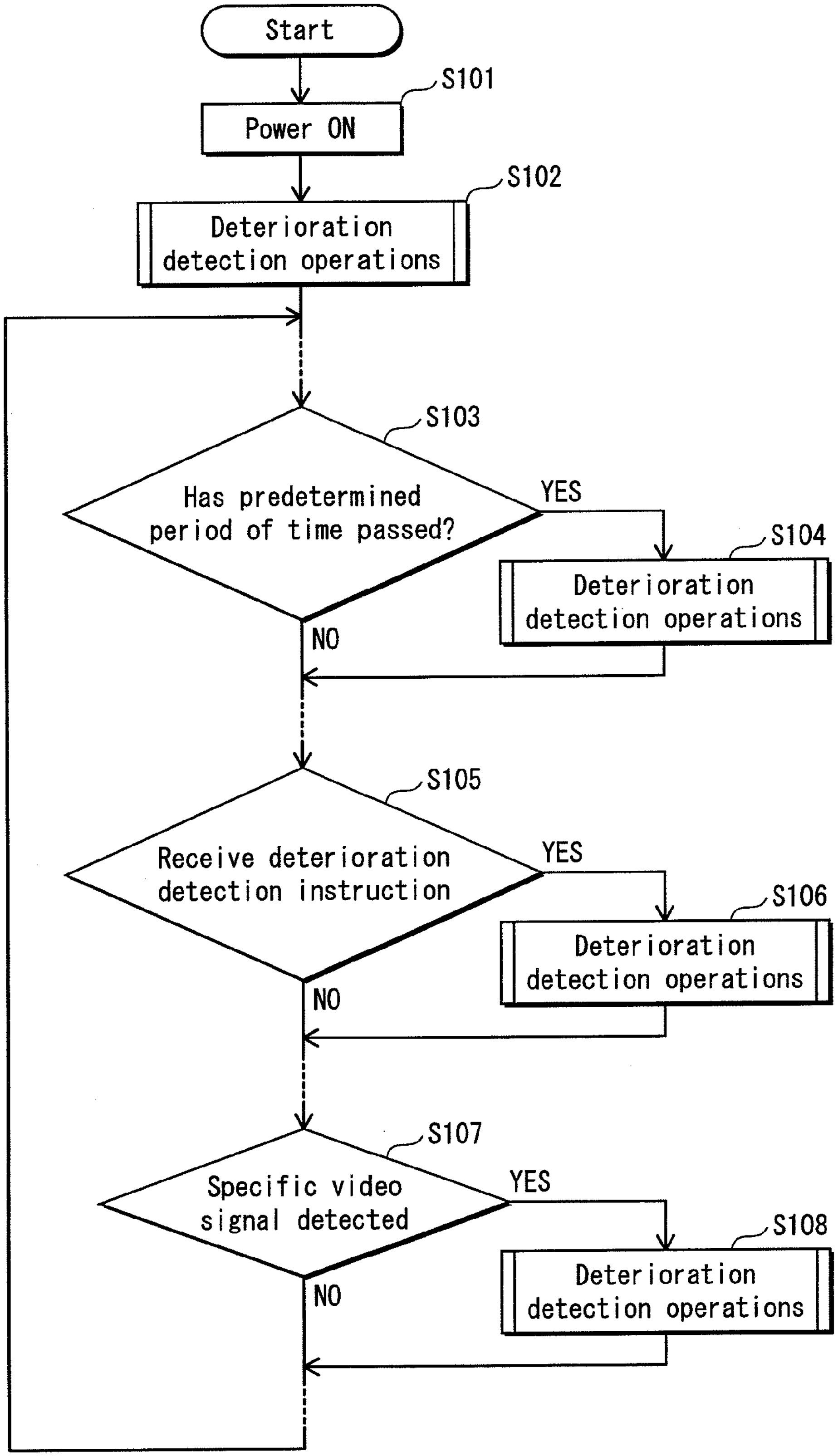
FIG. 14 is a flowchart showing the overall operations of the organic light emitting display device 2.

Overall operations of the organic light emitting display device 2 are described with reference to the flowchart in FIG. 14.

The control unit 102 detects when a user turns on the power (step S101) and controls the display control unit 104, causing it to perform deterioration detection operations (step S102). Next, each time a predetermined period of time passes, for example each time the cumulative operational time of the organic light emitting display device 2 is measured to be 100 hours (step S103), the control unit 102 controls the display control unit 104, causing it to perform deterioration detection operations (step S104). Also, when the control unit 102 receives an indication to initiate deterioration detection operations from a user, or an instruction to initiate deterioration detection operations from another device (step S105), the control unit 102 controls the display control unit 104, causing it to perform deterioration detection operations (step S106). Also, when the control unit 102 detects, from the video playback device 3 via the I/O unit 101, a specific video signal in the video signal to be played back (step S107), the control unit 102 controls the display control unit 104, causing it to perform deterioration detection operations (step S108).

Next, processing returns to step S103, and the above operations are repeated.

(b) Adjustment Driving Processing by the Display Control Unit 104

Figure 15:
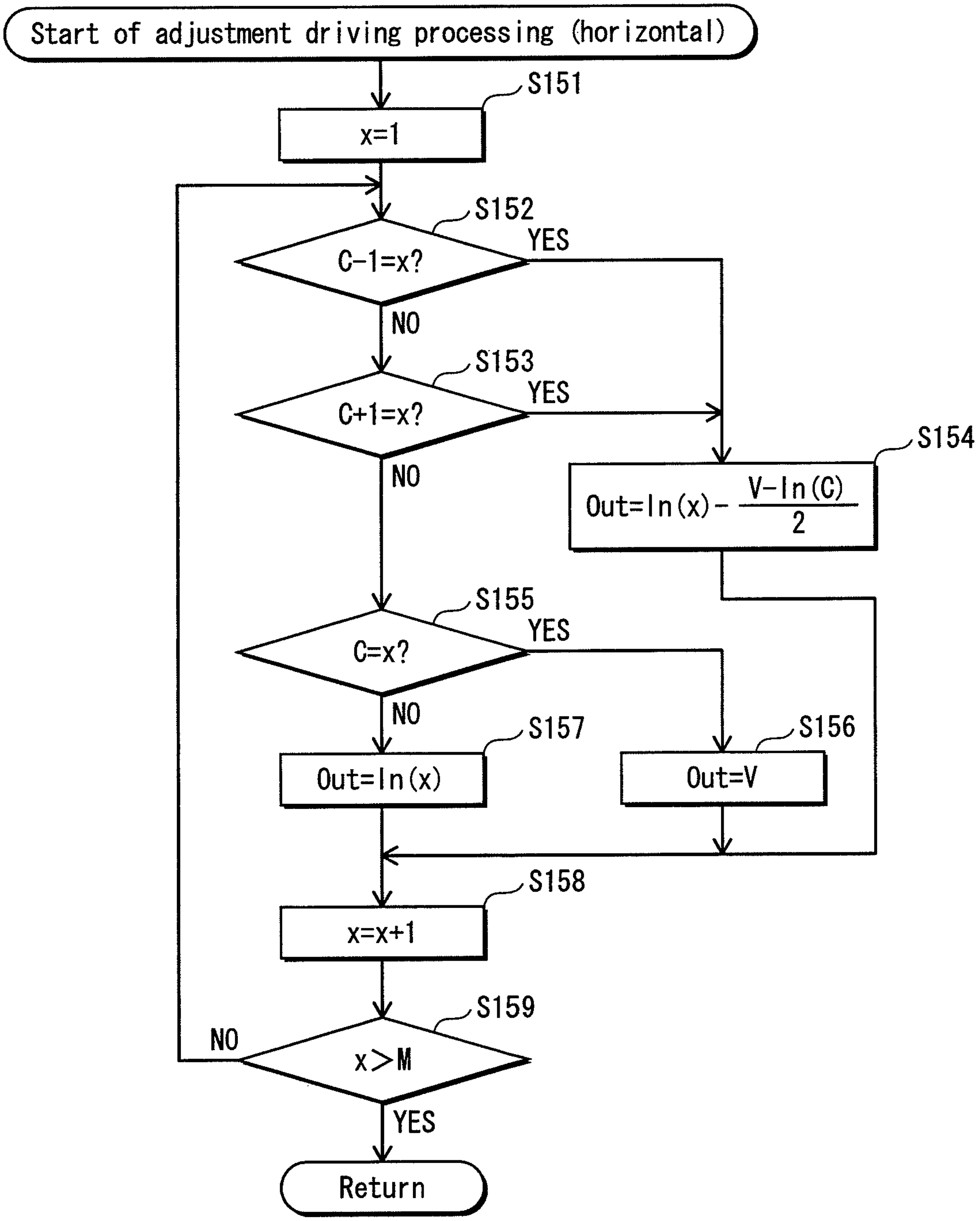
FIG. 15 is a flowchart showing adjustment driving processing by a display control unit 104.

Adjustment driving processing by the display control unit 104 is described with reference to FIG. 15. In this description, the actual pixel driving value determination algorithm is indicated for scanning of one horizontal period.

The display control unit 104 sets the horizontal pixel position X to an initial value of "1" (step S151).

Next, the display control unit 104 determines whether the current horizontal pixel position is a position within an area of peripheral pixels to which luminance should be distributed (steps S152, S153). If so, i.e. when C−1=X (step S152: YES) or when C+1=X (step S153: YES), then the display control unit 104 calculates Out=In(X)−(V−In(C))/2 (step S154).

That is, the display control unit 104 calculates the difference between the video signal luminance for the target pixel and the adjustment luminance, divides the calculated difference by the number of peripheral pixels, and subtracts the value thus obtained from the video signal corresponding to the horizontal pixel position to calculate a driving signal, outputting the calculated driving signal.

In other words, the display control unit 104 distributes the change, due to adjustment based on the adjustment luminance, in the original luminance of the target pixel corresponding to the OLED targeted for deterioration detection, among peripheral pixels arranged in the spatial periphery of the target pixel, thereby offsetting the change. In this way, the display control unit 104 calculates the peripheral luminances for the peripheral pixels.

In the above equation, In(X) is the video signal at horizontal pixel position X, V is the adjustment luminance of the pixel targeted for adjustment at adjustment pixel position C, and In(C) is the video signal at adjustment pixel position C. Out is the luminance that is to be output.

Next, the display control unit 104 shifts control to step S158.

Also, the display control unit 104 determines whether the current horizontal pixel position X is the target pixel, and when C=X (step S155: YES), the display control unit 104 sets Out=V, i.e. outputs the adjustment luminance V as the driving signal (step S156). Next, the display control unit 104 shifts control to step S158.

Furthermore, when the horizontal pixel position X is neither a peripheral pixel nor the target pixel (step S155: NO), then the display control unit 104 sets Out=In(X) and outputs a driving signal with the value of the video signal corresponding to the horizontal pixel position X (step S157). Next, the display control unit 104 shifts control to step S158.

Next, the display control unit 104 increments the horizontal pixel position X by "1" (step S158) and determines whether one horizontal period has been completed. That is, if X is not greater than M, then one horizontal period has not been completed (step S159: NO) and control is shifted to step S152. If one horizontal period has been completed (step S159: YES), then the display control unit 104 completes adjustment driving processing for one horizontal period.

1.2 Modification (1)

A modification of the image display system 1 in Embodiment 1 is described.

Figure 16:
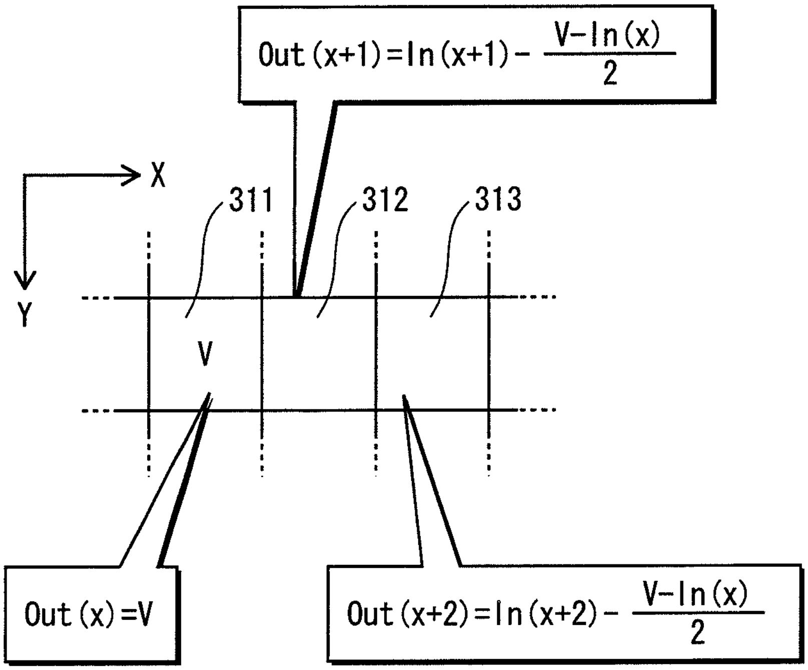
FIG. 16 shows the driving signals for pixels 311, 312, and 313 arranged contiguously in a horizontal direction, with the OLED corresponding to pixel 311 targeted for deterioration detection.

(1) As shown in FIG. 16, on one horizontal line, pixels 311, 312, and 313 are arranged contiguously in a horizontal direction, and the OLED corresponding to pixel 311 is the target of deterioration detection. In this case, luminance can be distributed to pixels 312 and 313, pixel 312 horizontally located one pixel after pixel 311, which corresponds to the OLED targeted for deterioration detection, and pixel 313 located two pixels after pixel 311.

Figure 17:
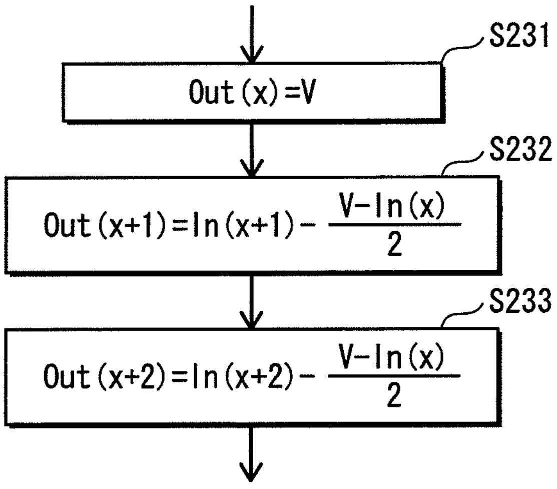
FIG. 17 is a flowchart showing steps for generating a driving signal for each pixel shown in FIG. 16.

As shown in FIG. 17, the display control unit 104 outputs a driving signal Out(X)=V (step S231). In this equation, X indicates the position of pixel 311 on the horizontal line. Next, the display control unit 104 calculates, for pixel 312 one pixel after the targeted pixel on the horizontal line, a driving signal Out(X+1)=In(X+1)−(V−In(X))/2 and outputs the driving signal Out(X+1) (step S232).

Next, the display control unit 104 calculates, for pixel 313 two pixels after the targeted pixel in the horizontal direction, a driving signal Out(X+2)=In(X+2)−(V−In(X))/2 and outputs the driving signal Out(X+2) (step S233).

This case is effective when pixel 311 corresponds to a pixel located along the left edge of the display unit 110.

Figure 18:
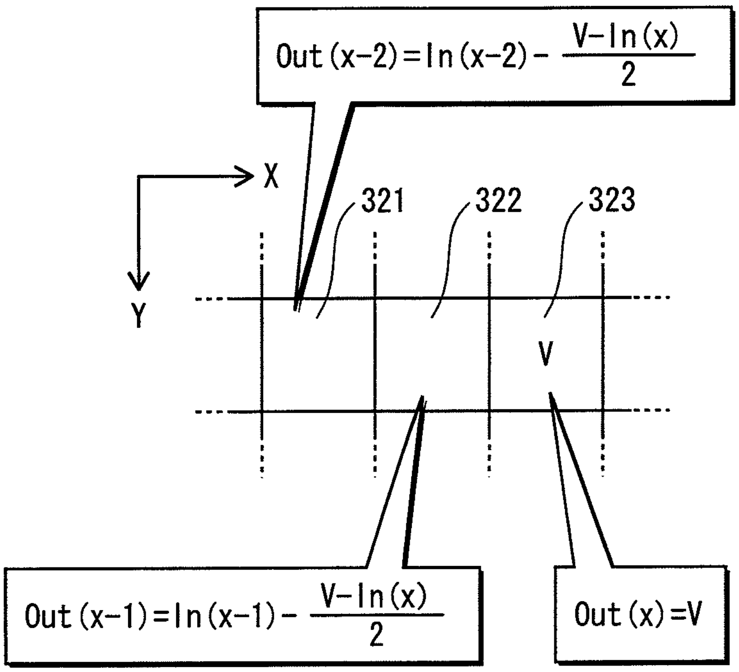
FIG. 18 shows the driving signals for pixels 321, 322, and 323 arranged contiguously in a horizontal direction, with the OLED corresponding to pixel 323 targeted for deterioration detection.

(2) As shown in FIG. 18, on one horizontal line, pixels 321, 322, and 323 are arranged contiguously in a horizontal direction, and the OLED corresponding to pixel 323 is the target of deterioration detection. In this case, luminance can be distributed to pixels 322 and 321, pixel 322 horizontally located one pixel before pixel 323, which corresponds to the OLED targeted for deterioration detection, and pixel 321 located two pixels before pixel 323.

Figure 19:
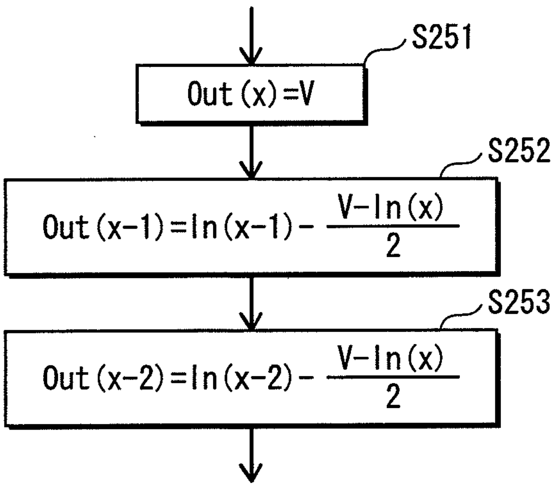
FIG. 19 is a flowchart showing steps for generating a driving signal for each pixel shown in FIG. 18.

As shown in FIG. 19, the display control unit 104 outputs a driving signal Out(X)=V (step S251). In this equation, X indicates the position of pixel 323 on the horizontal line. Next, the display control unit 104 calculates, for pixel 322 one pixel before the targeted pixel on the horizontal line, a driving signal Out(X−1)=In(X−1)−(V−In(X))/2 and outputs the driving signal Out(X−1) (step S252).

Next, the display control unit 104 calculates, for pixel 321 two pixels before the targeted pixel in the horizontal direction, a driving signal Out(X−2)=In(X−2)−(V−In(X))/2 and outputs the driving signal Out(X−2) (step S253).

This case is effective when pixel 323 corresponds to a pixel located along the right edge of the display unit 110.

Modification (1) above demonstrates luminance distribution that includes two pixels horizontally neighboring a pixel targeted for deterioration detection. In the present invention, however, only one neighboring pixel may be used.

1.3 Modification (2)

Another modification of the image display system 1 in Embodiment 1 is described.

Figure 20:
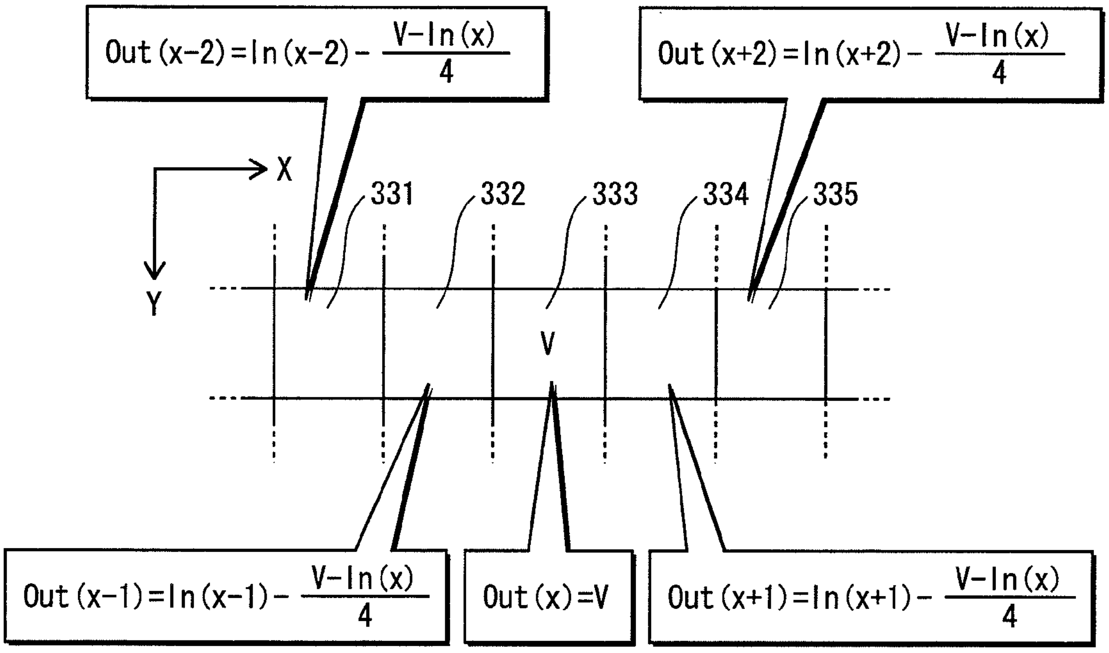
FIG. 20 shows the driving signals for pixels 331, 332, 333, 334, and 335 arranged contiguously in a horizontal direction, with the OLED corresponding to pixel 333 targeted for deterioration detection.

(1) As shown in FIG. 20, on one horizontal line, pixels 331, 332, 333, 334, and 335 are arranged contiguously in a horizontal direction, and the OLED corresponding to pixel 333 is the target of deterioration detection. In this case, luminance can be distributed to the OLEDs corresponding to the two pixels on one side of pixel 333 and the two pixels on the other side.

As shown in FIG. 20, the display control unit 104 outputs a driving signal Out(X)=V for pixel 333. In this equation, X indicates the position of pixel 333 on the horizontal line.

Next, the display control unit 104 calculates, for pixel 331 two pixels before pixel 333 in the horizontal direction, a driving signal Out(X−2)=In(X−2)−(V−In(X))/4 and outputs the driving signal Out(X−2).

Also, the display control unit 104 calculates, for pixel 332 one pixel before pixel 333 in the horizontal direction, a driving signal Out(X−1)=In(X−1)−(V−In(X))/4 and outputs the driving signal Out(X−1).

Next, the display control unit 104 calculates, for pixel 334 one pixel after pixel 333 in the horizontal direction, a driving signal Out(X+1)=In(X+1)−(V−In(X))/4 and outputs the driving signal Out(X+1).

Also, the display control unit 104 calculates, for pixel 335 two pixels after pixel 333 in the horizontal direction, a driving signal Out(X+2)=In(X+2)−(V−In(X))/4 and outputs the driving signal Out(X+2).

2. Embodiment 2

The following is a description of another embodiment of the present invention.

2.1 Image Display System 1*b*

The following is a description of another embodiment of the present invention, an image display system 1*b* (not shown in the figures).

The image display system 1*b* has a similar configuration to image display system 1 in Embodiment 1 and is composed of an organic light emitting display device 2 and a video playback device 3. In this embodiment, luminance for an OLED targeted for deterioration detection is distributed to the pixels corresponding to the OLEDs located vertically above and below the target OLED.

Figure 21:
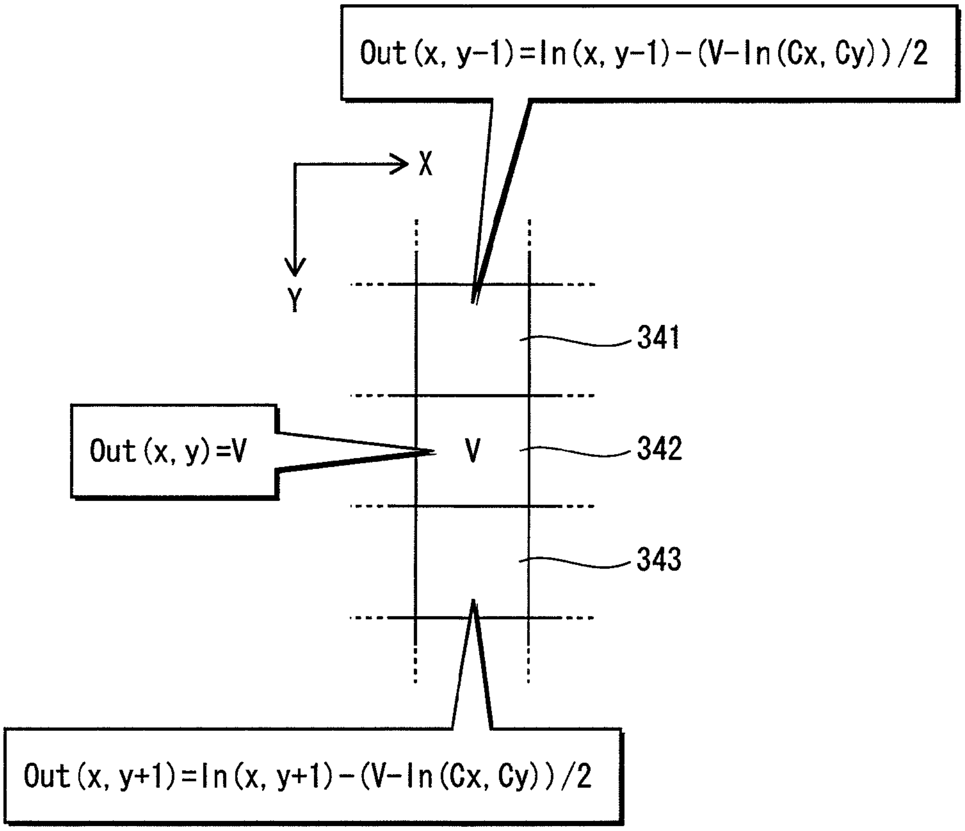
FIG. 21 shows, along a vertical line, the driving signals for pixels 341, 342, and 343 arranged contiguously in a vertical direction, with the OLED corresponding to pixel 342 targeted for deterioration detection.

As shown in FIG. 21, along one vertical line in a frame image to be displayed on the display unit 110, pixels 341, 342, and 343 are arranged contiguously in a vertical direction, with the OLED corresponding to pixel 342 targeted for deterioration detection. In this case, luminance is distributed to pixel 341, vertically above pixel 342, which corresponds to the OLED targeted for deterioration detection, and to pixel 343, below pixel 342.

As shown in FIG. 21, the display control unit 104 outputs a driving signal Out(X,Y)=V for pixel 342. In this equation, X and Y respectively indicate the horizontal and vertical position of pixel 342 in the frame image to be displayed on the display unit 110. Next, the display control unit 104 calculates, for pixel 341 vertically one pixel above pixel 342, a driving signal Out(X,Y−1)=In(X,Y−1)−(V−In(CX,CY))/2 and outputs the driving signal Out(X,Y−1). In this equation, CX and CY indicate the horizontal and vertical position of pixel 342 in the frame image. Furthermore, the display control unit 104 calculates, for pixel 343 vertically one pixel below pixel 342, a driving signal Out(X,Y+1)=In(X,Y+1)−(V−In(CX,CY))/2 and outputs the driving signal Out(X,Y+1).

Next, an explanation is provided for the operations of the display control unit 104 with reference to the flowcharts shown in FIGS. 22-25.

The display control unit 104 emits light at the timing of a VSYNC event, HSYNC event, and DotClock event. A VSYNC event is an event indicating the start of vertical synchronization operations, an HSYNC event is an event indicating the start of horizontal synchronization operations, and a DotClock event is an event indicating the start of display operations for each pixel.

Figure 22:
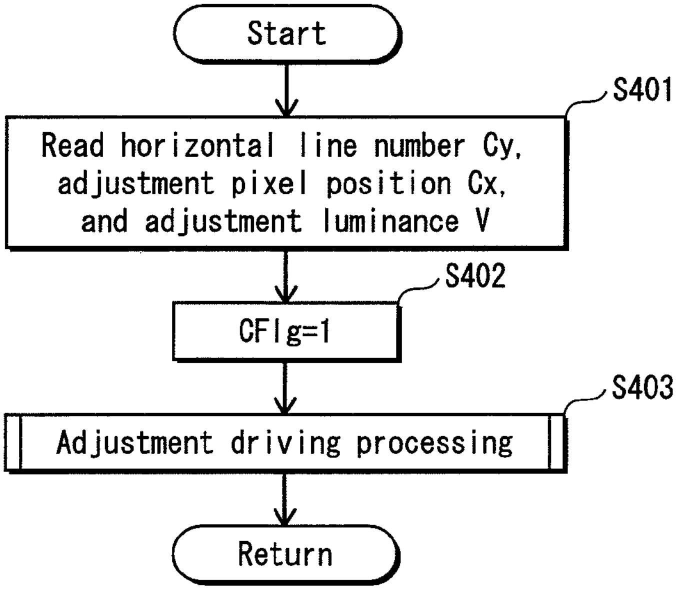
FIG. 22 is a flowchart mainly showing the operations at the stage before adjustment driving processing by the display control unit 104.

As shown in FIG. 22, the display control unit 104 reads a horizontal line number CY, an adjustment pixel position CX, and an adjustment luminance V (step S401), sets a flag Cflg to "1" (step S402), and next performs adjustment driving processing (step S403).

Figure 23:
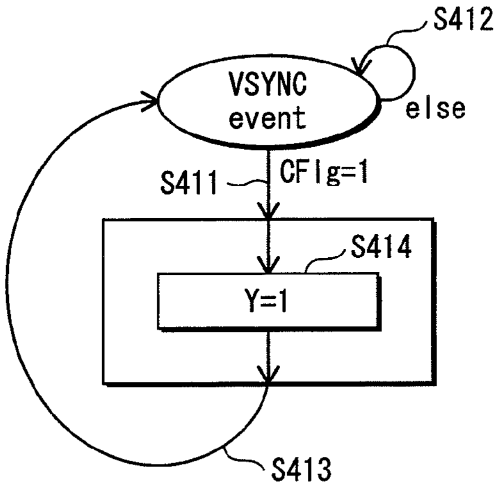
FIG. 23 is a state transition diagram of the display control unit 104 when waiting for a VSYNC event to be issued.
Figure 24:
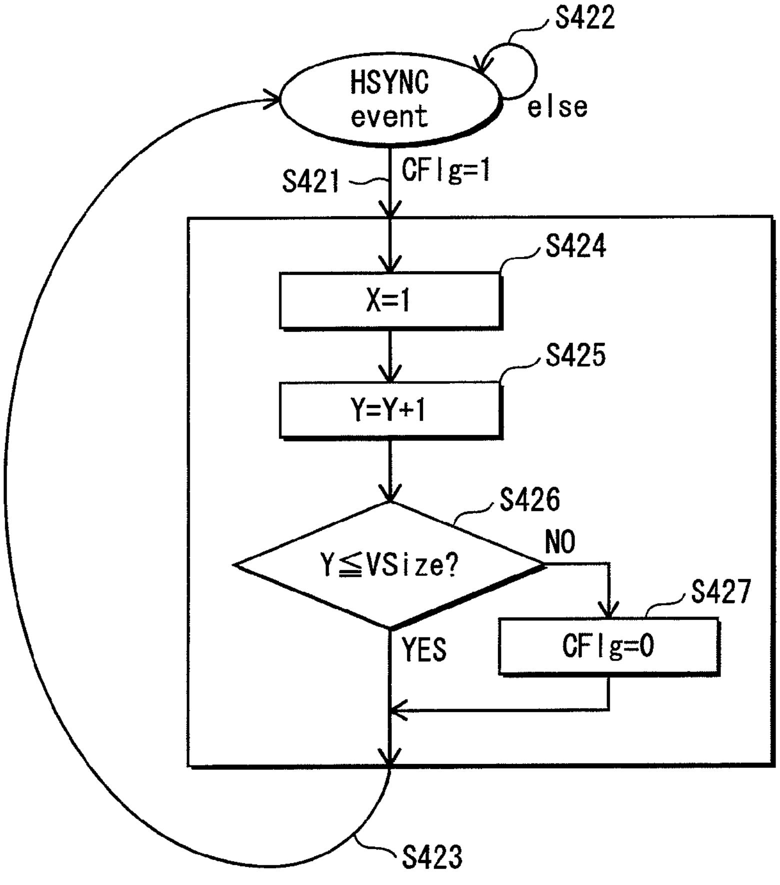
FIG. 24 is a state transition diagram of the display control unit 104 when waiting for an HSYNC event to be issued.
Figure 25:
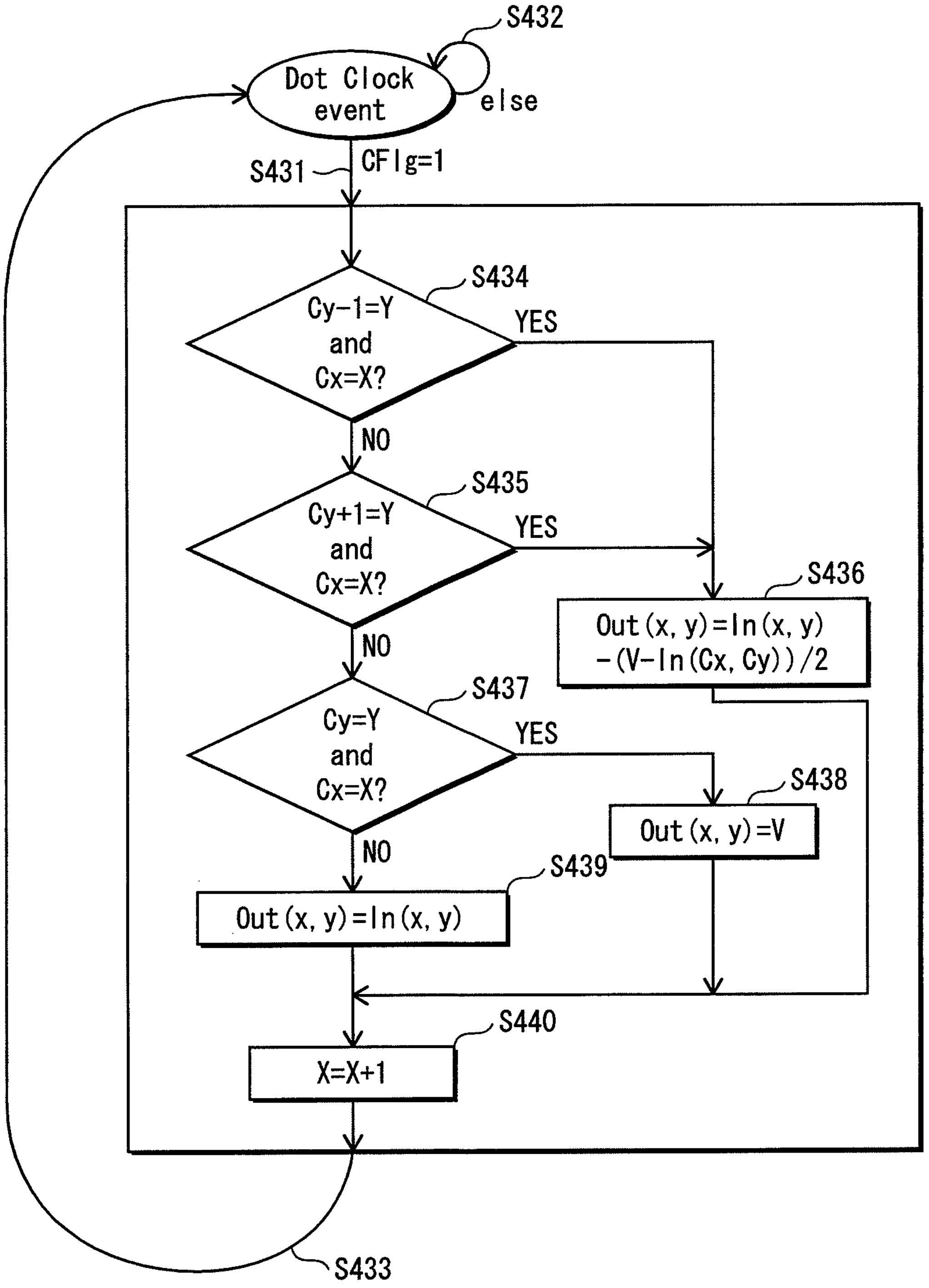
FIG. 25 is a state transition diagram of the display control unit 104 when waiting for a DotClock event to be issued.

Next, the adjustment driving processing in step S403 is described in detail with reference to the state transition diagrams in FIGS. 23-25.

The display control unit 104 waits for a VSYNC event to be issued. As described above, a VSYNC event is an event indicating the start of vertical synchronization operations. If the flag Cflg equals a value other than "1" when a VSYNC event is issued (step S412), the display control unit 104 continues to wait for a VSYNC event to be issued. If the flag Cflg equals "1" when a VSYNC event is issued (step S411), a variable Y is set to "1" (step S414), and processing returns to waiting for a VSYNC event to be issued (step S413).

The display control unit 104 also waits for an HSYNC event to be issued. As described above, an HSYNC event is an event indicating the start of horizontal synchronization operations. If the flag Cflg equals a value other than "1" when an HSYNC event is issued (step S422), the display control unit 104 continues to wait for an HSYNC event to be issued. If the flag Cflg equals "1" when an HSYNC event is issued (step S421), a variable X is set to "1" (step S424) and "1" is added to the variable Y (step S425). When Y is equal to or less than Vsize (step S426: YES), the display control unit 104 does nothing. When Y is greater than Vsize (step S426: NO), the flag Cflg is set to "0" (step S427). In this embodiment, Vsize is the number of pixels in the vertical direction in a frame image to be shown on the display unit 110 and is equal to N. Next, processing returns to waiting for an HSYNC event to be issued (step S423).

The display control unit 104 also waits for a DotClock event to be issued. As described above, a DotClock event is an event indicating the start of display operations for each pixel. If the flag Cflg equals a value other than "1" when a DotClock event is issued (step S432), the display control unit 104 continues to wait for a DotClock event to be issued. If the flag Cflg equals "1" when a DotClock event is issued (step S431), then if "CY−1=Y and CX=X" is true (step S434: YES), the display control unit 104 calculates a driving signal Out(X,Y) =In(X,Y)−(V−In(CX,CY))/2 and outputs the driving signal Out(X,Y) (step S436).

When "CY−1=Y and CX=X" is not true (step S434: NO), then when "CY+1=Y and CX=X" is true (step S435: YES), the display control unit 104 calculates a driving signal Out (X,Y)=In(X,Y)−(V−In(CX,CY))/2 and outputs the driving signal Out(X,Y) (step S436).

When "CY−1=Y and CX=X" is not true (step S434: NO) and "CY+1=Y and CX=X" is not true (step S435: NO), then when "CY=Y and CX=X" is true (step S437: YES), the display control unit 104 calculates a driving signal Out(X,Y)=V and outputs the driving signal Out(X,Y) (step S438).

When "CY−1=Y and CX=X" is not true (step S434: NO) and "CY+1=Y and CX=X" is not true (step S435: NO), then when "CY=Y and CX=X" is not true (step S437: NO), the display control unit 104 calculates a driving signal Out(X,Y) =In(X,Y) and outputs the driving signal Out(X,Y) (step S439).

Next, the display control unit 104 adds "1" to X (step S440) and returns to waiting for a DotClock event to be issued (step S433).

As described above, the organic light emitting display device 2 in the image display system 1*b* distributes luminance for an OLED targeted for deterioration detection to the pixels corresponding to the OLEDs located vertically above and below the target OLED.

2.2 Modification (3)

A modification of the image display system 1*b* in Embodiment 2 is described.

Figure 26:
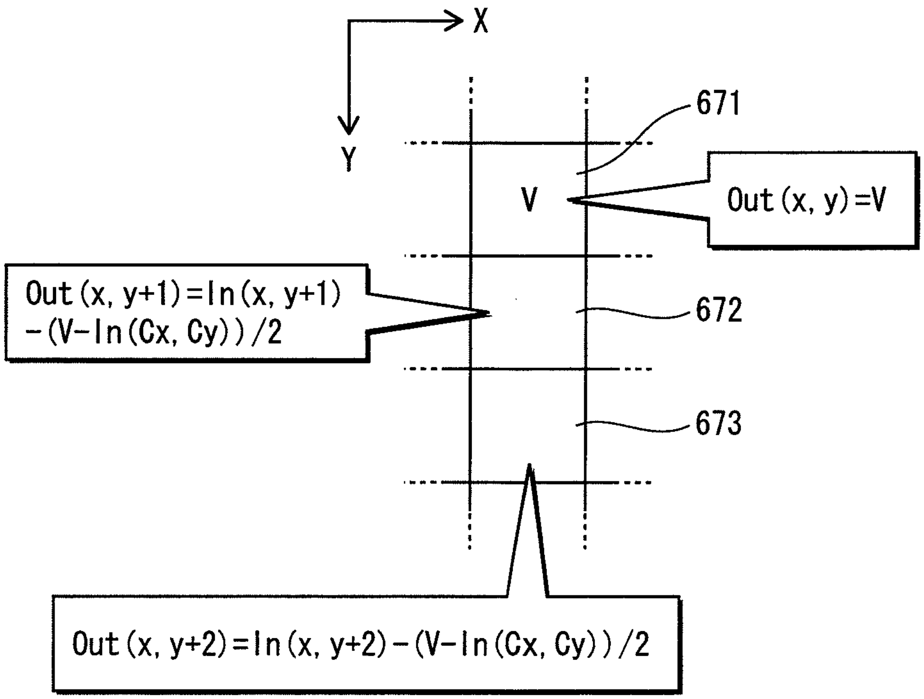
FIG. 26 shows, along a vertical line, the driving signals for pixels 671, 672, and 673 arranged contiguously in a vertical direction, with the OLED corresponding to pixel 671 targeted for deterioration detection.

(1) As shown in FIG. 26, along one vertical line in a frame image to be displayed on the display unit 110, pixels 671, 672, and 673 are arranged contiguously in a vertical direction, with the OLED corresponding to pixel 671 targeted for deterioration detection. In this case, luminance can be distributed to pixel 672, vertically below pixel 671, which corresponds to the OLED targeted for deterioration detection, and to pixel 673, further below pixel 671.

As shown in FIG. 26, the display control unit 104 outputs a driving signal Out(X,Y)=V for pixel 671. In this equation, X and Y respectively indicate the horizontal and vertical position of pixel 671 in the frame image. Next, the display control unit 104 calculates, for pixel 672 vertically one pixel below pixel 671, a driving signal Out(X,Y+1)=In(X,Y+1)−(V−In (CX,CY))/2 and outputs the driving signal Out(X,Y+1). Furthermore, the display control unit 104 calculates, for pixel 673 vertically one more pixel below pixel 671, a driving signal Out(X,Y+2)=In(X,Y+2)−(V−In(CX,CY))/2 and outputs the driving signal Out(X,Y+2).

In these equations, CX and CY indicate the horizontal and vertical position of pixel 671 in the frame image.

This case is effective when pixel 671 corresponds to a pixel located along the top edge of the display unit 110.

Figure 27:
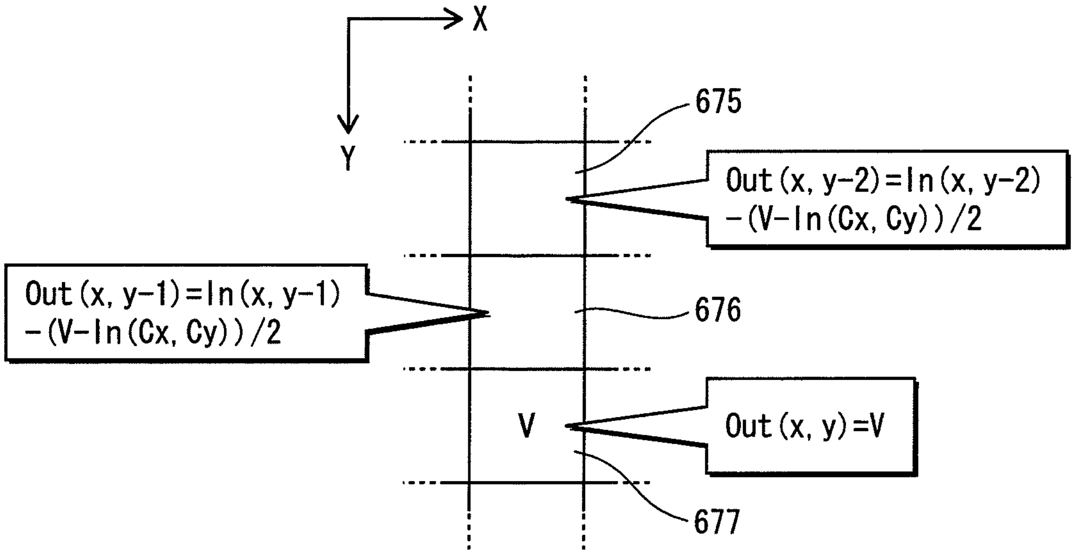
FIG. 27 shows, along a vertical line, the driving signals for pixels 675, 676, and 677 arranged contiguously in a vertical direction, with the OLED corresponding to pixel 677 targeted for deterioration detection.

(2) As shown in FIG. 27, along one vertical line in a frame image to be displayed on the display unit 110, pixels 675, 676, and 677 are arranged contiguously in a vertical direction, with the OLED corresponding to pixel 677 targeted for deterioration detection. In this case, luminance can be distributed to pixel 676, vertically above pixel 677, which corresponds to the OLED targeted for deterioration detection, and to pixel 675, further above pixel 677.

As shown in FIG. 27, the display control unit 104 outputs a driving signal Out(X,Y)=V for pixel 677. In this equation, X and Y respectively indicate the horizontal and vertical position of pixel 677 in the frame image. Next, the display control unit 104 calculates, for pixel 676 vertically one pixel above pixel 677, a driving signal Out(X,Y−1)=In(X,Y−1)−(V−In(CX,CY))/2 and outputs the driving signal Out(X,Y−1). Furthermore, the display control unit 104 calculates, for pixel 675 vertically one more pixel above pixel 677, a driving signal Out(X,Y−2)=In(X,Y−2)−(V−In(CX,CY))/2 and outputs the driving signal Out(X,Y−2).

In these equations, CX and CY indicate the horizontal and vertical position of pixel 677 in the frame image.

This case is effective when pixel 677 corresponds to a pixel located along the lower edge of the display unit 110.

Modification (3) above demonstrates luminance distribution that includes two pixels vertically neighboring a pixel targeted for deterioration detection. In the present invention, however, only one neighboring pixel may be used.

2.3 Modification (4)

Another modification of the image display system 1*b* in Embodiment 2 is described.

Figure 28:
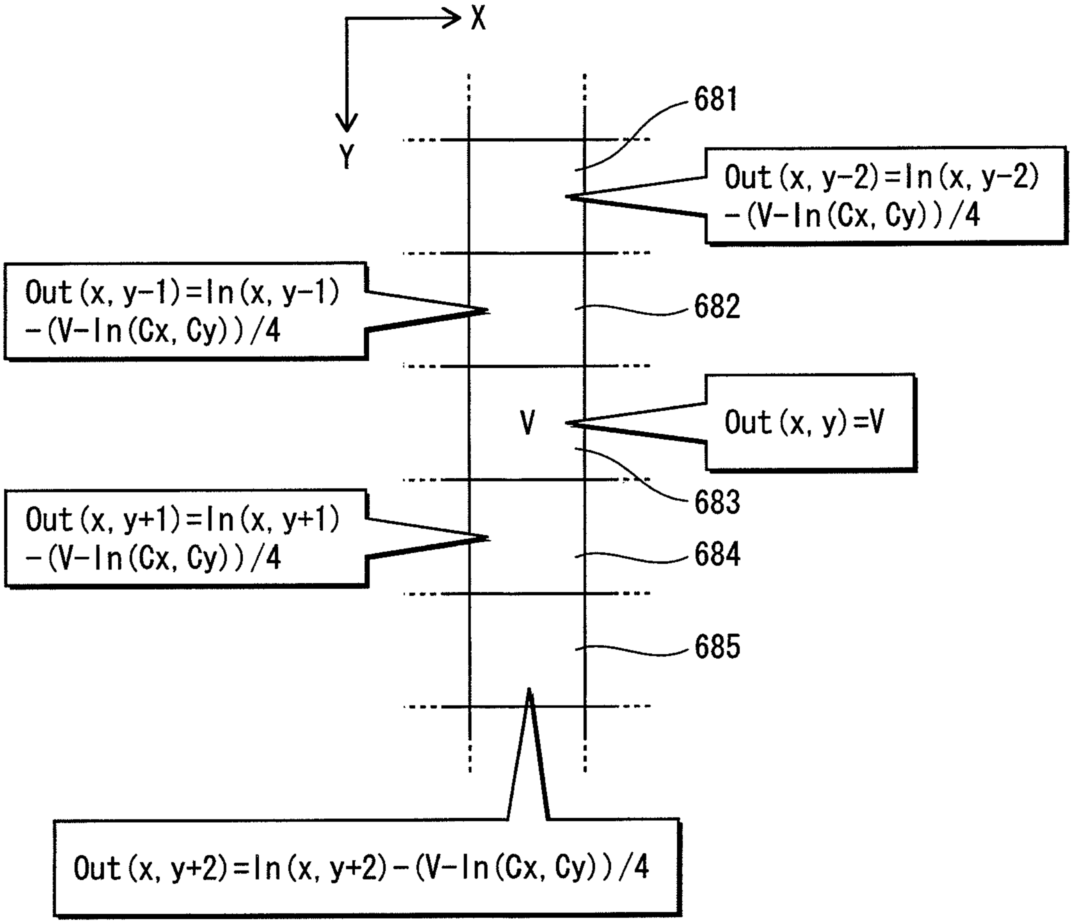
FIG. 28 shows, along a vertical line, the driving signals for pixels 681, 682, 683, 684, and 685 arranged contiguously in a vertical direction, with the OLED corresponding to pixel 683 targeted for deterioration detection.

As shown in FIG. 28, along one vertical line in a frame image to be displayed on the display unit 110, pixels 681, 682, 683, 684, and 685 are arranged contiguously in a vertical direction, with the OLED corresponding to pixel 683 targeted for deterioration detection. In this case, luminance can be distributed to the OLEDs corresponding to a total of four pixels, i.e. the two pixels above and the two pixels below pixel 683.

As shown in FIG. 28, the display control unit 104 outputs a driving signal Out(X,Y)=V for pixel 683.

The display control unit 104 calculates, for pixel 681 vertically two pixels above pixel 683, a driving signal Out(X,Y−2)=In(X,Y−2)−(V−In(CX,CY))/4 and outputs the driving signal Out(X,Y−2).

The display control unit 104 also calculates, for pixel 682 vertically one pixel above pixel 683, a driving signal Out(X,Y−1)=In(X,Y−1)−(V−In(CX,CY))/4 and outputs the driving signal Out(X,Y−1).

The display control unit 104 also calculates, for pixel 684 vertically one pixel below pixel 683, a driving signal Out(X,Y+1)=In(X,Y+1)−(V−In(CX,CY))/4 and outputs the driving signal Out(X,Y+1).

The display control unit 104 also calculates, for pixel 685 vertically two pixels below pixel 683, a driving signal Out(X,Y+2)=In(X,Y+2)−(V−In(CX,CY))/4 and outputs the driving signal Out(X,Y+2).

As described above, for a target pixel corresponding to an OLED targeted for deterioration detection, when adjusting luminance, luminance is distributed to the OLEDs corresponding to a total of four peripheral pixels, i.e. the two pixels located above and two pixels below the target pixel.

3. Embodiment 3

The following is a description of another embodiment of the present invention.

3.1 Image Display System 1*c*

The following is a description of another embodiment of the present invention, an image display system 1*c* (not shown in the figures).

The image display system 1*c* has a similar configuration to image display systems in Embodiments 1 and 2 and is composed of an organic light emitting display device 2 and a video playback device 3.

In this embodiment, luminance for an OLED targeted for deterioration detection is distributed to the pixels corresponding to the OLEDs located horizontally before and after and vertically above and below the target OLED.

Figure 29:
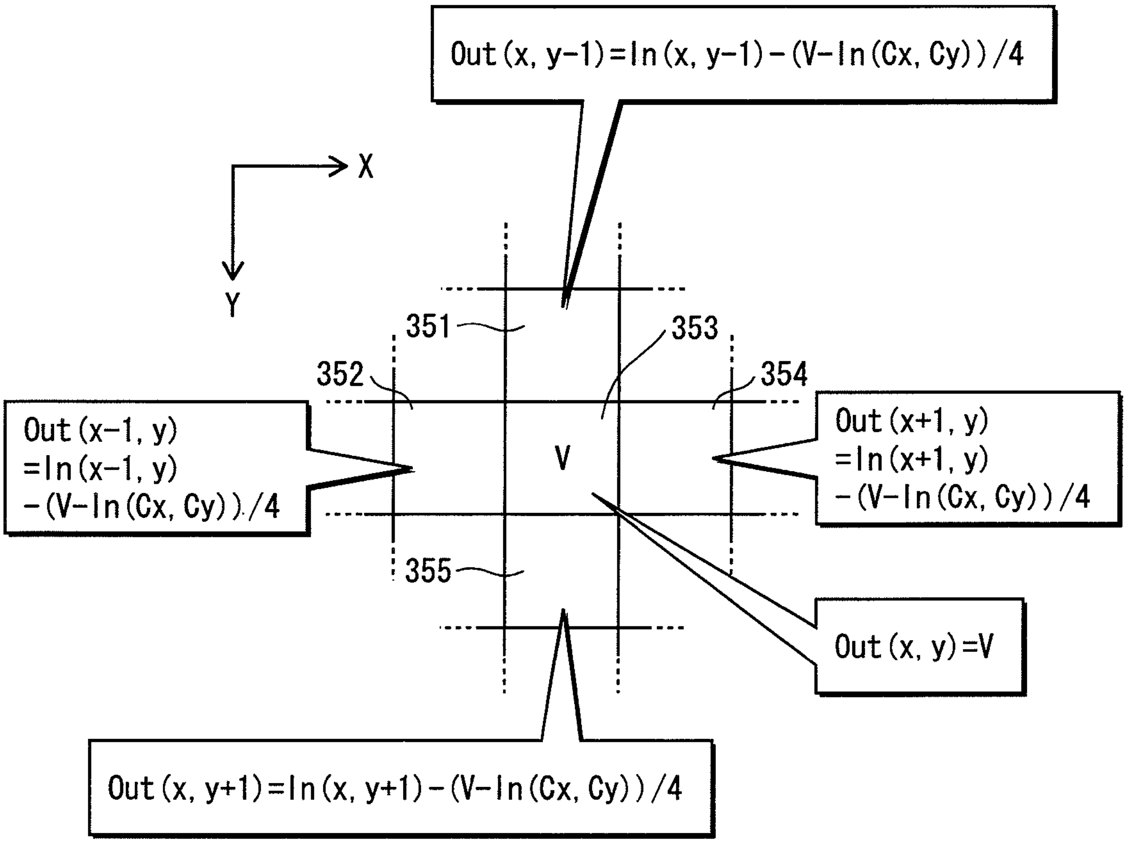
FIG. 29 shows the driving signals for pixels 351-355 arranged in the shape of a cross, with the OLED corresponding to pixel 353 targeted for deterioration detection.

As shown in FIG. 29, along one vertical line in a frame image to be displayed on the display unit 110, pixels 351, 352, and 353 are arranged contiguously in a vertical direction, and along one horizontal line including pixel 353 in the frame image, pixels 352, 353, and 354 are arranged contiguously in a horizontal direction, with the OLED corresponding to pixel 353 targeted for deterioration detection. In this case, luminance is distributed to pixels 351 and 355, respectively located vertically above and below pixel 353, which corresponds to the OLED targeted for deterioration detection, and to pixels 352 and 354, respectively located horizontally before and after pixel 353.

As shown in FIG. 29, the display control unit 104 outputs a driving signal Out(X,Y)=V for pixel 353. In this equation, X and Y respectively indicate the horizontal and vertical position of pixel 353 in the frame image.

Next, the display control unit 104 calculates, for pixel 351 vertically one pixel above pixel 353, a driving signal Out(X,Y−1)=In(X,Y−1)−(V−In(CX,CY))/4 and outputs the driving signal Out(X,Y−1). In this equation, CX and CY indicate the horizontal and vertical position of pixel 353 in the frame image. Furthermore, the display control unit 104 calculates, for pixel 355 vertically one pixel below pixel 353, a driving signal Out(X,Y+1)=In(X,Y+1)−(V−In(CX,CY))/4 and outputs the driving signal Out(X,Y+1).

Next, the display control unit 104 calculates, for pixel 352 horizontally one pixel before pixel 353, a driving signal Out(X−1,Y)=In(X−1,Y)−(V−In(CX,CY))/4 and outputs the driving signal Out(X−1,Y). Furthermore, the display control unit 104 calculates, for pixel 354 horizontally one pixel after pixel 353, a driving signal Out(X+1,Y)=In(X+1,Y)−(V−In(CX,CY))/4 and outputs the driving signal Out(X+1,Y).

Figure 30:
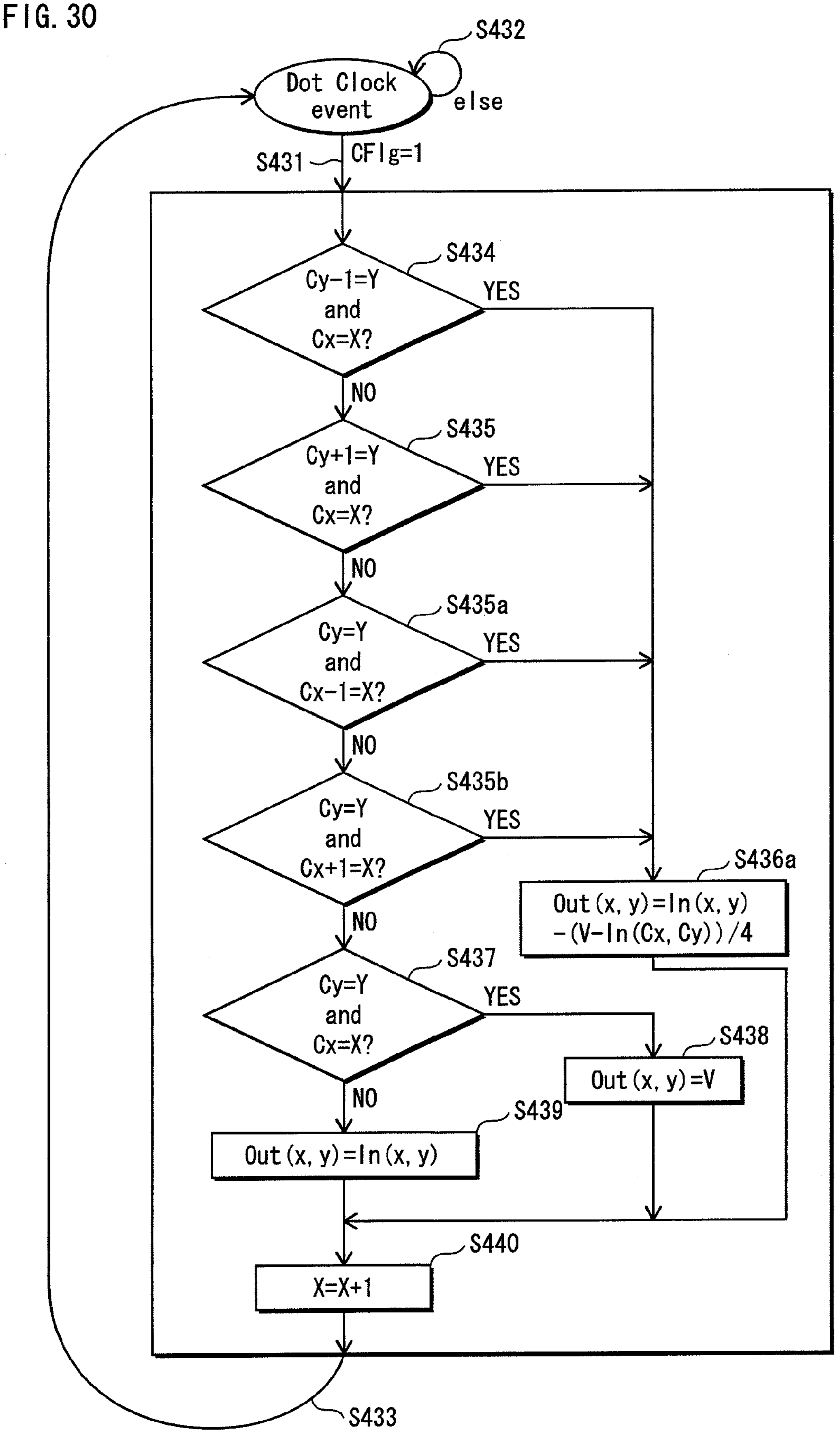
FIG. 30 is a state transition diagram of the display control unit 104 when waiting for a DotClock event to be issued.

Next, an explanation is provided for the operations of the display control unit 104 with reference to a flowchart. Note that similar operations were already described with reference to the flowchart shown in FIG. 22 and the state transition diagrams shown in FIGS. 23-25. In Embodiment 3, instead of FIG. 25, the state transition diagram shown in FIG. 30 is used.

The display control unit 104 waits for a DotClock event to be issued. As described above, this DotClock event is an event indicating the start of display operations for each pixel. If the flag Cflg equals a value other than "1" when a DotClock event is issued (step S432), the display control unit 104 continues to wait for a DotClock event to be issued.

If the flag Cflg equals "1" when a DotClock event is issued (step S431), then the display control unit 104 determines whether "CY−1=Y and CX=X" is true (step S434), and if "CY−1=Y and CX=X" is true (step S434: YES), the display control unit 104 calculates a driving signal Out(X,Y)=In(X,Y)−(V−In(CX,CY))/4 and outputs the driving signal Out(X,Y) (step S436*a*).

When "CY−1=Y and CX=X" is not true (step S434: NO), the display control unit 104 determines whether "CY+1=Y and CX=X" is true (step S435). When "CY+1=Y and CX=X" is true (step S435: YES), processing shifts to step S436*a*.

When "CY+1=Y and CX=X" is not true (step S435: NO), the display control unit 104 determines whether "CY=Y and CX−1=X" is true (step S435*a*). When "CY=Y and CX−1=X" is true (step S435*a*: YES), processing shifts to step S436*a*.

When "CY=Y and CX−1=X" is not true (step S435*a*: NO), the display control unit 104 determines whether "CY=Y and CX+1=X" is true (step S435*b*). When "CY=Y and CX+1=X" is true (step S435*b*: YES), processing shifts to step S436*a*.

When "CY=Y and CX+1=X" is not true (step S435*b*: NO), the display control unit 104 determines whether "CY=Y and CX=X" is true (step S437). If "CY=Y and CX=X" is true (step S437: YES), the display control unit 104 calculates a driving signal Out(X,Y)=V and outputs the driving signal Out(X,Y) (step S438).

When "CY=Y and CX=X" is not true (step S437: NO), the display control unit 104 calculates a driving signal Out (X,Y)=In(X,Y) and outputs the driving signal Out(X,Y) (step S439).

Next, the display control unit 104 adds "1" to X (step S440) and returns to waiting for a DotClock event to be issued (step S433).

As described above, the organic light emitting display device 2 in the image display system 1*c* distributes luminance for an OLED targeted for deterioration detection to the pixels corresponding to the OLEDs located vertically above and below and horizontally before and after the target OLED.

3.2 Modification (5)

A modification of the image display system 1*c* in Embodiment 3 is described.

Figure 31:
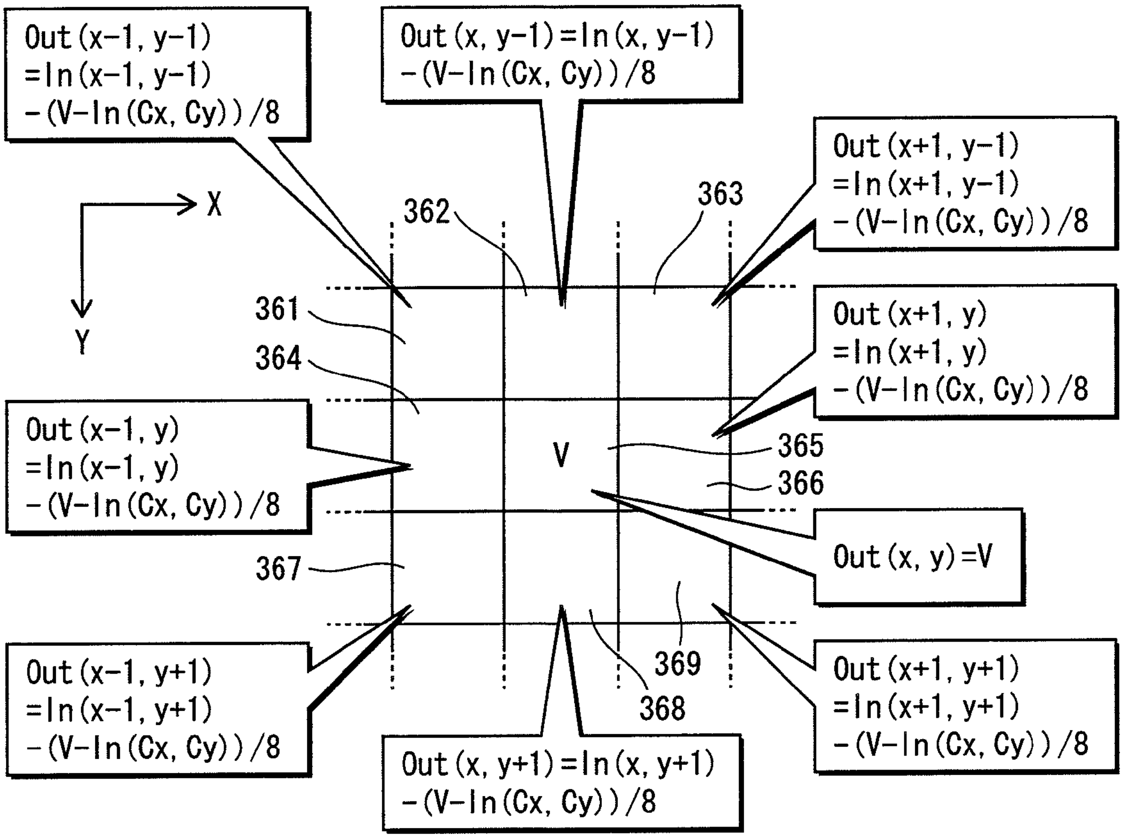
FIG. 31 shows the driving signals for pixels 361-369 arranged in rows, with the OLED corresponding to pixel 365 targeted for deterioration detection.

As shown in FIG. 31, in a frame image to be displayed on the display unit 110, a total of 9 pixels 361-369 are arranged in a matrix measuring 3 pixels vertically and 3 pixels horizontally. That is, along the horizontal line including pixel 365, which corresponds to the OLED targeted for deterioration detection, pixels 364 and 366 are respectively located horizontally before and after pixel 365. Also, along the vertical line intersecting the horizontal line with pixel 365, pixels 362 and 368 are respectively located vertically above and below pixel 365. Furthermore, pixels 361 and 363 horizontally neighbor pixel 362 on both sides, and pixels 367 and 369 horizontally neighbor pixel 368 on both sides. In this figure, the OLED corresponding to pixel 365 in the center of the 9-pixel matrix is targeted for deterioration detection. In this case, luminance is distributed to pixels 364 and 366, respectively located horizontally before and after pixel 365, which corresponds to the OLED targeted for deterioration detection, to pixels 362 and 368, respectively located vertically above and below pixel 365, and to pixels 361, 363, 367, and 369, located diagonally above and below either side of pixel 365.

As shown in FIG. 31, the display control unit 104 outputs a driving signal Out(X,Y)=V for pixel 365. In this equation, X and Y respectively indicate the horizontal and vertical position of pixel 365 in the image frame.

The display control unit 104 also calculates: for pixel 361, a driving signal Out(X−1,Y−1)=In(X−1,Y−1)−(V−In(CX,CY))/8, outputting the driving signal Out(X−1,Y−1); for pixel 362, a driving signal Out(X,Y−1)=In(X,Y−1)−(V−In(CX,CY))/8, outputting the driving signal Out(X,Y−1); and for pixel 363, a driving signal Out(X+1,Y−1)=In(X+1,Y−1)−(V−In(CX,CY))/8, outputting the driving signal Out(X+1,Y−1).

The display control unit 104 also calculates: for pixel 364, a driving signal Out(X−1,Y)=In(X−1,Y)−(V−In(CX,CY))/8, outputting the driving signal Out(X−1,Y); and for pixel 366, a driving signal Out(X+1,Y)=In(X+1,Y)−(V−In(CX,CY))/8, outputting the driving signal Out(X+1,Y).

Furthermore, the display control unit 104 calculates: for pixel 367, a driving signal Out(X−1,Y+1)=In(X−1,Y+1)−(V−In(CX,CY))/8, outputting the driving signal Out(X−1,Y+1); for pixel 368, a driving signal Out(X,Y+1)=In(X,Y+1)−(V−In(CX,CY))/8, outputting the driving signal Out(X,Y+1); and for pixel 369, a driving signal Out(X+1,Y+1)=In(X+1,Y+1)−(V−In(CX,CY))/8, outputting the driving signal Out (X+1,Y+1).

3.3 Modification (6)

Another modification of the image display system 1*c* in Embodiment 3 is described.

Figure 32:
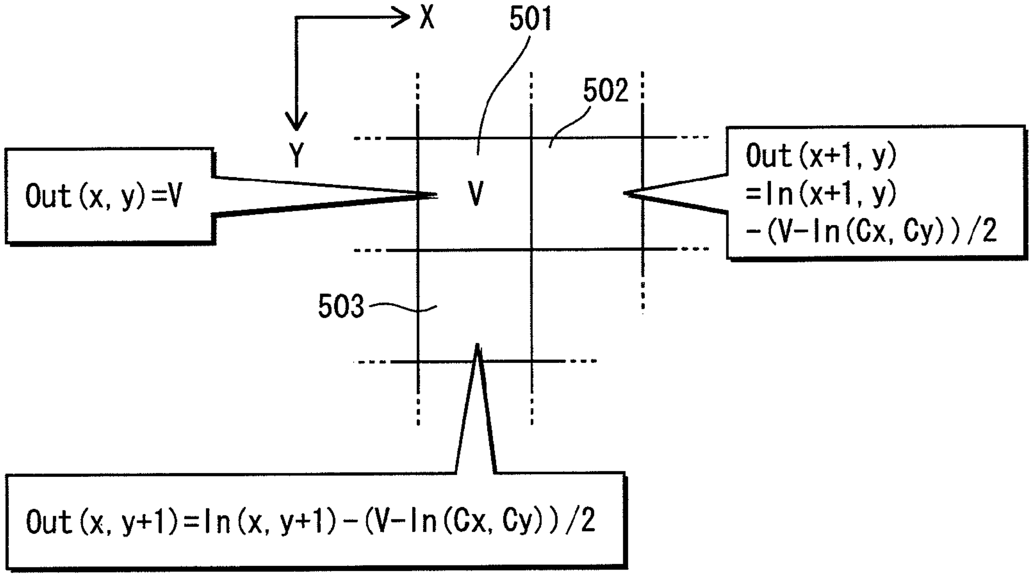
FIG. 32 shows the driving signals for pixels 501-503, with the OLED corresponding to pixel 501 targeted for deterioration detection.

(1) As shown in FIG. 32, along one horizontal line in a frame image to be displayed on the display unit 110, pixels 501 and 502 are arranged contiguously, and along a vertical line intersecting the horizontal line with pixel 501, pixel 503 is adjacent to and below pixel 501 in a vertical direction. In this figure, the OLED corresponding to pixel 501 is targeted for deterioration detection. In this case, luminance is distributed to pixels 502 and 503.

As shown in FIG. 32, the display control unit 104 outputs a driving signal Out(X,Y)=V for pixel 501. In this equation, X and Y respectively indicate the horizontal and vertical position of pixel 501 in the image frame.

The display control unit 104 also calculates: for pixel 502, a driving signal Out(X+1,Y)=In(X+1,Y)−(V−In(CX,CY))/2, outputting the driving signal Out(X+1,Y); and for pixel 503, a driving signal Out(X,Y+1)=In(X,Y+1)−(V−In(CX,CY))/2, outputting the driving signal Out(X,Y+1).

This case is effective when pixel 501 corresponds to a pixel located at the upper left edge of the display unit 110.

Figure 33:
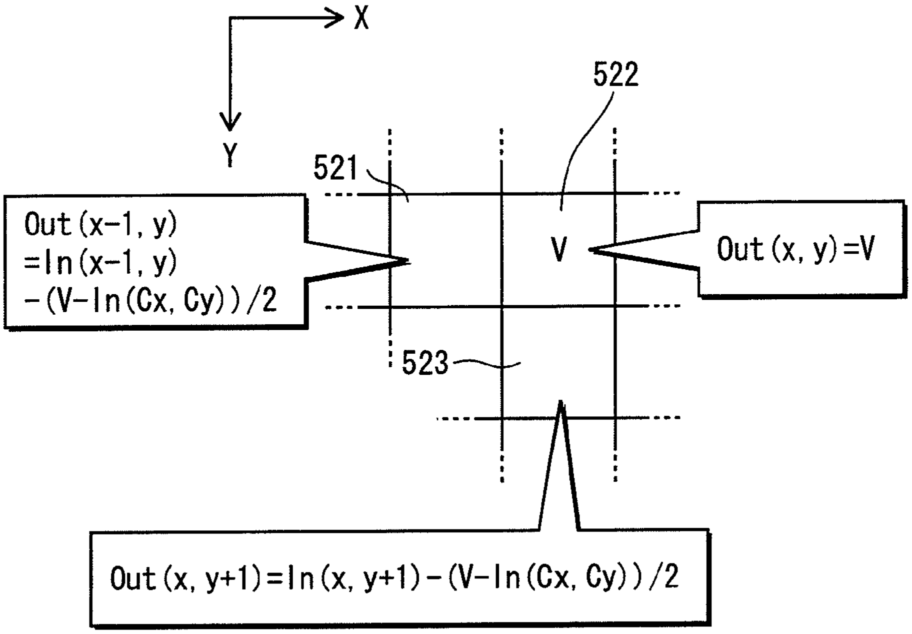
FIG. 33 shows the driving signals for pixels 521-523, with the OLED corresponding to pixel 522 targeted for deterioration detection.

(2) As shown in FIG. 33, along one horizontal line in a frame image to be displayed on the display unit 110, pixels 521 and 522 are arranged contiguously, and along a vertical line intersecting the horizontal line with pixel 522, pixel 523 is adjacent to and below pixel 522 in a vertical direction. In this figure, the OLED corresponding to pixel 522 is targeted for deterioration detection. In this case, luminance is distributed to pixels 521 and 523.

As shown in FIG. 33, the display control unit 104 outputs a driving signal Out(X,Y)=V for pixel 522. In this equation, X and Y respectively indicate the horizontal and vertical position of pixel 522 in the image frame.

The display control unit 104 also calculates: for pixel 521, a driving signal Out(X−1,Y)=In(X−1,Y)−(V−In(CX,CY))/2, outputting the driving signal Out(X−1,Y); and for pixel 523, a driving signal Out(X,Y+1)=In(X,Y+1)−(V−In(CX,CY))/2, outputting the driving signal Out(X,Y+1).

This case is effective when pixel 522 corresponds to a pixel located at the upper right edge of the display unit 110.

Figure 34:
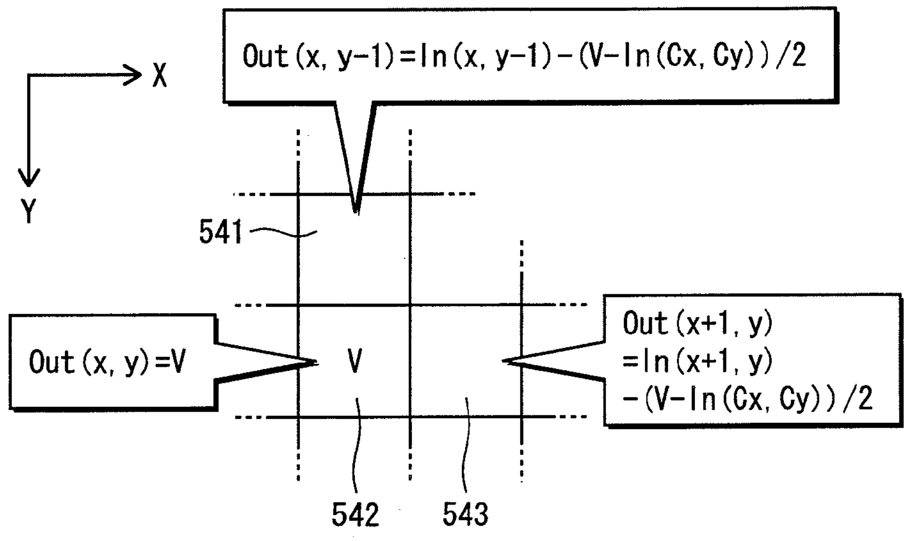
FIG. 34 shows the driving signals for pixels 541-543, with the OLED corresponding to pixel 542 targeted for deterioration detection.

(3) As shown in FIG. 34, along one horizontal line in a frame image to be displayed on the display unit 110, pixels 542 and 543 are arranged contiguously, and along a vertical line intersecting the horizontal line with pixel 542, pixel 541 is adjacent to and above pixel 542 in a vertical direction. In this figure, the OLED corresponding to pixel 542 is targeted for deterioration detection. In this case, luminance is distributed to pixels 541 and 543.

As shown in FIG. 34, the display control unit 104 outputs a driving signal Out(X,Y)=V for pixel 542. In this equation, X and Y respectively indicate the horizontal and vertical position of pixel 542 in the image frame.

The display control unit 104 also calculates: for pixel 541, a driving signal Out(X,Y−1)=In(X,Y−1)−(V−In(CX,CY))/2, outputting the driving signal Out(X,Y−1); and for pixel 543, a driving signal Out(X+1,Y)=In(X+1,Y)−(V−In(CX,CY))/2, outputting the driving signal Out(X+1,Y).

This case is effective when pixel 542 corresponds to a pixel located at the lower left edge of the display unit 110.

Figure 35:
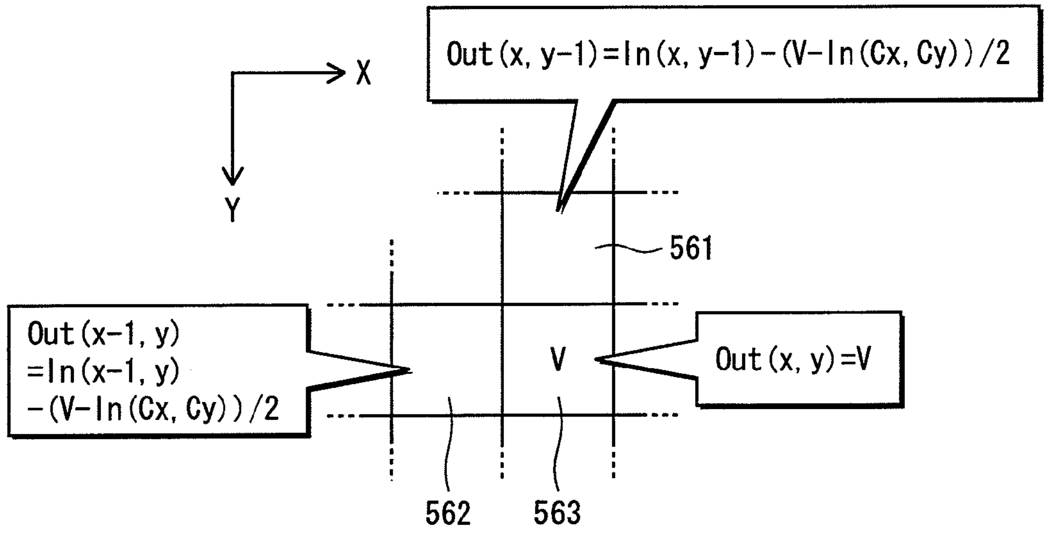
FIG. 35 shows the driving signals for pixels 561-563, with the OLED corresponding to pixel 563 targeted for deterioration detection.

(4) As shown in FIG. 35, along one horizontal line in a frame image to be displayed on the display unit 110, pixels 562 and 563 are arranged contiguously, and along a vertical line intersecting the horizontal line with pixel 563, pixel 561 is adjacent to and above pixel 563 in a vertical direction. In this figure, the OLED corresponding to pixel 563 is targeted for deterioration detection. In this case, luminance is distributed to pixels 561 and 562.

As shown in FIG. 35, the display control unit 104 outputs a driving signal Out(X,Y)=V for pixel 563. In this equation, X and Y respectively indicate the horizontal and vertical position of pixel 563 in the image frame.

The display control unit 104 also calculates: for pixel 561, a driving signal Out(X,Y−1)=In(X,Y−1)−(V−In(CX,CY))/2, outputting the driving signal Out(X,Y−1); and for pixel 562, a driving signal Out(X−1,Y)=In(X−1,Y)−(V−In(CX,CY))/2, outputting the driving signal Out(X−1,Y).

This case is effective when pixel 563 corresponds to a pixel located at the lower right edge of the display unit 110.

3.4 Modification (7)

Another modification of the image display system 1*c* in Embodiment 3 is described.

Figure 36:
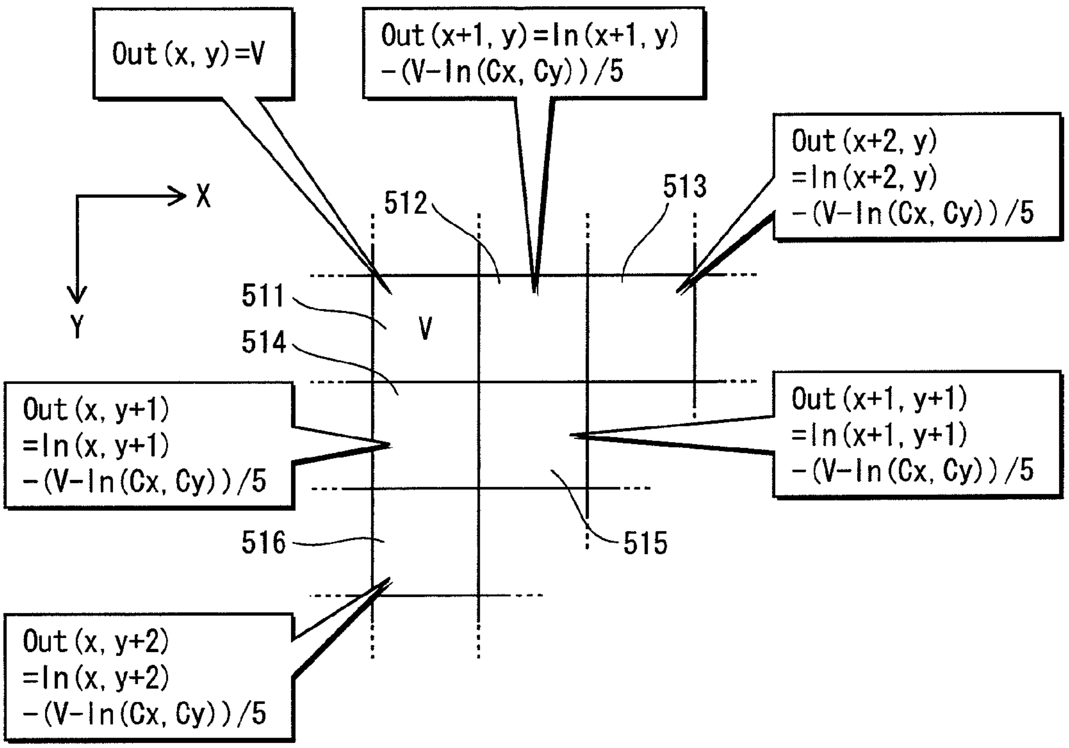
FIG. 36 shows the driving signals for pixels 511-516, with the OLED corresponding to pixel 511 targeted for deterioration detection.

(1) As shown in FIG. 36, along one horizontal line in a frame image to be displayed on the display unit 110, pixels 511, 512, and 513 are arranged contiguously, and along a vertical line intersecting the horizontal line with pixel 511, pixels 514 and 516 neighbor pixel 511, vertically below pixel 511. Also, pixel 515 neighbors pixel 512, vertically below pixel 512. In this figure, the OLED corresponding to pixel 511 is targeted for deterioration detection. In this case, luminance is distributed to pixels 512-516.

As shown in FIG. 36, the display control unit 104 outputs a driving signal Out(X,Y)=V for pixel 511. In this equation, X and Y respectively indicate the horizontal and vertical position of pixel 511 in the image frame. The display control unit 104 also calculates: for pixel 512, a driving signal Out(X+1, Y)=In(X+1,Y)−(V−In(CX,CY))/5, outputting the driving signal Out(X+1,Y); and for pixel 513, a driving signal Out (X+2,Y)=In(X+2,Y)−(V−In(CX,CY))/5, outputting the driving signal Out(X+2,Y).

The display control unit 104 also calculates: for pixel 514, a driving signal Out(X,Y+1)=In(X,Y+1)−(V−In(CX,CY))/5, outputting the driving signal Out(X,Y+1); and for pixel 515, a driving signal Out(X+1, Y+1)=In(X+1, Y+1)−(V−In(CX, CY))/5, outputting the driving signal Out(X+1,Y+1).

Furthermore, the display control unit 104 calculates, for pixel 516, a driving signal Out(X,Y+2)=In(X,Y+2)−(V−In (CX,CY))/5, outputting the driving signal Out(X,Y+2).

This case is effective when pixel 511 corresponds to a pixel located at the upper left edge of the display unit 110.

Figure 37:
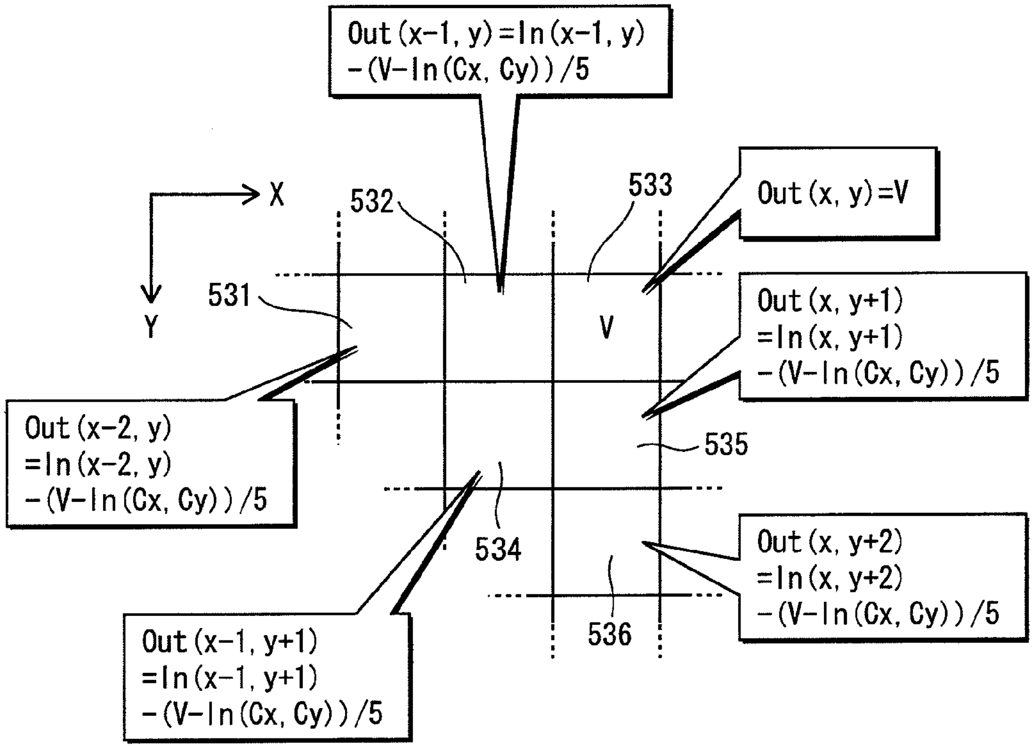
FIG. 37 shows the driving signals for pixels 531-536, with the OLED corresponding to pixel 533 targeted for deterioration detection.

(2) As shown in FIG. 37, along one horizontal line in a frame image to be displayed on the display unit 110, pixels 531, 532, and 533 are arranged contiguously, and along a vertical line intersecting the horizontal line with pixel 533, pixels 535 and 536 neighbor pixel 533, vertically below pixel 533. Also, pixel 534 neighbors pixel 532, vertically below pixel 532. In this figure, the OLED corresponding to pixel 533 is targeted for deterioration detection. In this case, luminance is distributed to pixels 531, 532, and 534-536.

As shown in FIG. 37, the display control unit 104 outputs a driving signal Out(X,Y)=V for pixel 533. In this equation, X and Y respectively indicate the horizontal and vertical position of pixel 533 in the image frame. The display control unit 104 also calculates: for pixel 531, a driving signal Out(X−2, Y)=In(X−2,Y)−(V−In(CX,CY))/5, outputting the driving signal Out(X−2,Y); and for pixel 532, a driving signal Out (X−1,Y)=In(X−1,Y)−(V−In(CX,CY))/5, outputting the driving signal Out(X−1,Y).

The display control unit 104 also calculates: for pixel 534, a driving signal Out(X−1,Y+1)=In(X−1,Y+1)−(V−In(CX, CY))/5, outputting the driving signal Out(X−1,Y+1); and for pixel 535, a driving signal Out(X,Y+1)=In(X,Y+1)−(V−In (CX,CY))/5, outputting the driving signal Out(X,Y+1).

Furthermore, the display control unit 104 calculates, for pixel 536, a driving signal Out(X,Y+2)=In(X,Y+2)−(V−In (CX,CY))/5, outputting the driving signal Out(X,Y+2).

This case is effective when pixel 533 corresponds to a pixel located at the upper right edge of the display unit 110.

Figure 38:
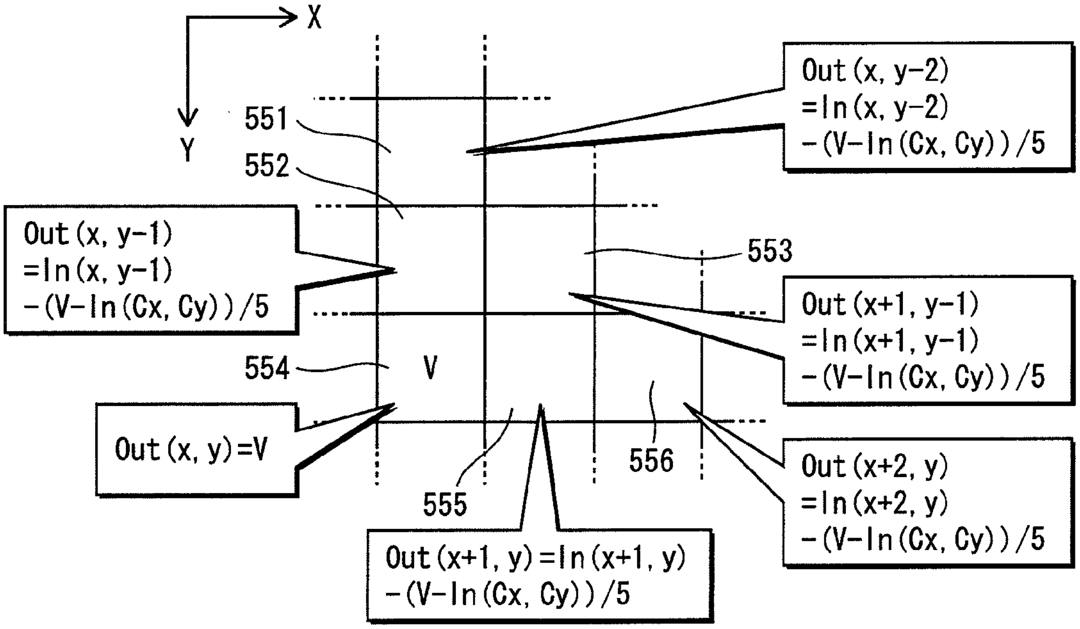
FIG. 38 shows the driving signals for pixels 551-556, with the OLED corresponding to pixel 554 targeted for deterioration detection.

(3) As shown in FIG. 38, along one horizontal line in a frame image to be displayed on the display unit 110, pixels 554, 555, and 556 are arranged contiguously, and along a vertical line intersecting the horizontal line with pixel 554, pixels 552 and 551 neighbor pixel 554, vertically above pixel 554. Also, pixel 553 neighbors pixel 555, vertically above pixel 555. In this figure, the OLED corresponding to pixel 554 is targeted for deterioration detection. In this case, luminance is distributed to pixels 551-553, 555, and 556.

As shown in FIG. 38, the display control unit 104 outputs a driving signal Out(X,Y)=V for pixel 554. In this equation, X and Y respectively indicate the horizontal and vertical position of pixel 554 in the image frame. The display control unit 104 also calculates: for pixel 555, a driving signal Out(X+1, Y)=In(X+1,Y)−(V−In(CX,CY))/5, outputting the driving signal Out(X+1,Y); and for pixel 556, a driving signal Out (X+2,Y)=In(X+2,Y)−(V−In(CX,CY))/5, outputting the driving signal Out(X+2,Y).

The display control unit 104 also calculates: for pixel 552, a driving signal Out(X,Y−1)=In(X,Y−1)−(V−In(CX,CY))/5, outputting the driving signal Out(X,Y−1); and for pixel 553, a driving signal Out(X+1,Y−1)=In(X+1,Y−1)−(V−In(CX, CY))/5, outputting the driving signal Out(X+1,Y−1).

Furthermore, the display control unit 104 calculates, for pixel 551, a driving signal Out(X,Y−2)=In(X,Y−2)−(V−In (CX,CY))/5, outputting the driving signal Out(X,Y−2).

This case is effective when pixel 554 corresponds to a pixel located at the lower left edge of the display unit 110.

Figure 39:
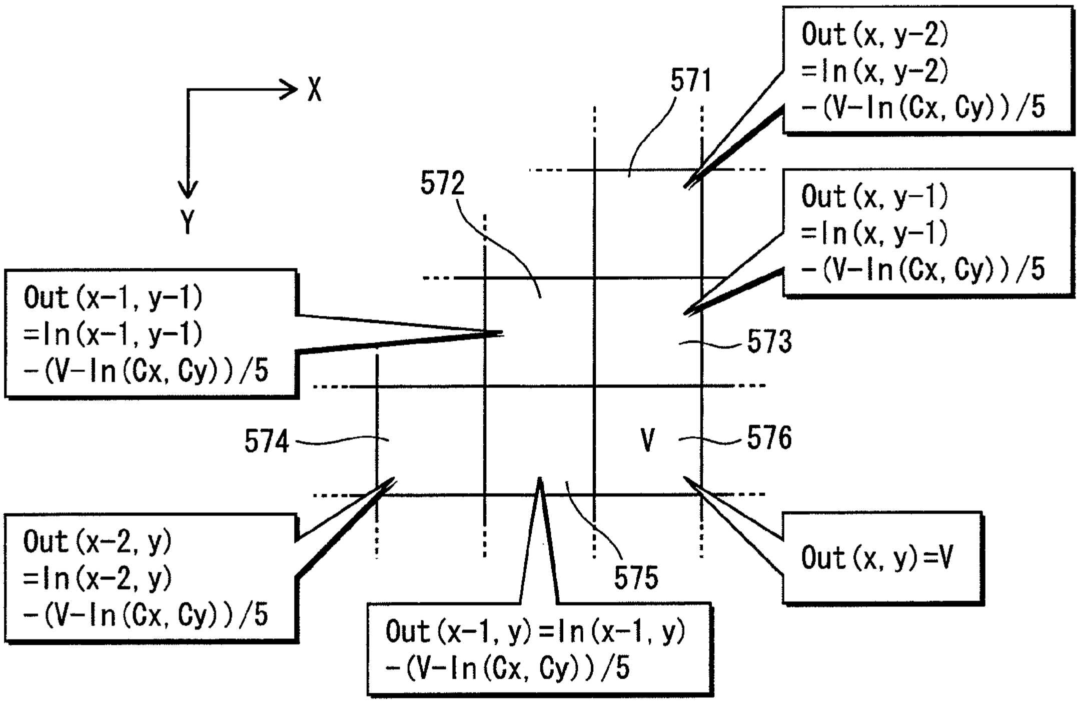
FIG. 39 shows the driving signals for pixels 571-576, with the OLED corresponding to pixel 576 targeted for deterioration detection.

(4) As shown in FIG. 39, along one horizontal line in a frame image to be displayed on the display unit 110, pixels 574, 575, and 576 are arranged contiguously, and along a vertical line intersecting the horizontal line with pixel 576, pixels 571 and 573 neighbor pixel 576, vertically above pixel 576. Also, pixel 572 neighbors pixel 575, vertically above pixel 575. In this figure, the OLED corresponding to pixel 576 is targeted for deterioration detection. In this case, luminance is distributed to pixels 571-575.

As shown in FIG. 39, the display control unit 104 outputs a driving signal Out(X,Y)=V for pixel 576. In this equation, X and Y respectively indicate the horizontal and vertical position of pixel 576 in the image frame. The display control unit 104 also calculates: for pixel 574, a driving signal Out(X−2, Y)=In(X−2,Y)−(V−In(CX,CY))/5, outputting the driving signal Out(X−2,Y); and for pixel 575, a driving signal Out (X−1,Y)=In(X−1,Y)−(V−In(CX,CY))/5, outputting the driving signal Out(X−1,Y).

The display control unit 104 also calculates: for pixel 572, a driving signal Out(X−1,Y−1)=In(X−1,Y−1)−(V−In(CX, CY))/5, outputting the driving signal Out(X−1,Y−1); and for pixel 573, a driving signal Out(X,Y−1)=In(X,Y−1)−(V−In (CX,CY))/5, outputting the driving signal Out(X,Y−1).

Furthermore, the display control unit 104 calculates, for pixel 571, a driving signal Out(X,Y−2)=In(X,Y−2)−(V−In(CX,CY))/5, outputting the driving signal Out(X,Y−2).

This case is effective when pixel 576 corresponds to a pixel located at the lower right edge of the display unit 110.

4. Embodiment 4

The following is a description of another embodiment of the present invention.

4.1 Image Display System 1*d*

The following is a description of another embodiment of the present invention, an image display system 1*d* (not shown in the figures).

The image display system 1*d* has a similar configuration to image display systems in the above embodiments and is composed of an organic light emitting display device 2 and a video playback device 3.

In this embodiment, for a target frame image and one or a plurality of peripheral frame images (i.e. neighboring frame images) that are to be played back successively in time, a target pixel corresponding to an OLED targeted for deterioration detection in the target frame image is caused to emit light at an adjustment luminance, and luminance is distributed to peripheral pixels at a position corresponding to the target pixel in one or a plurality of peripheral frame images that are to be played back after the target frame image.

In other words, the luminance that offsets the difference between the original luminance of the light emitting element targeted for deterioration detection and the adjustment luminance thereof is distributed to the target pixel and/or to peripheral pixels in the frame image to which the target pixel corresponding to the light emitting element belongs and in other frame images along a playback time axis.

Note that the target frame image includes the target pixel corresponding to the target OLED, and the luminance of the target pixel is adjusted at the adjustment luminance for the target OLED. Peripheral pixels may be included around the target pixel in the target frame image. Also, peripheral frame images refer to frame images that are to be played back later in time than the target frame image and which include peripheral pixels corresponding to the targeted pixel. Luminance is distributed to these peripheral pixels.

Figure 40:
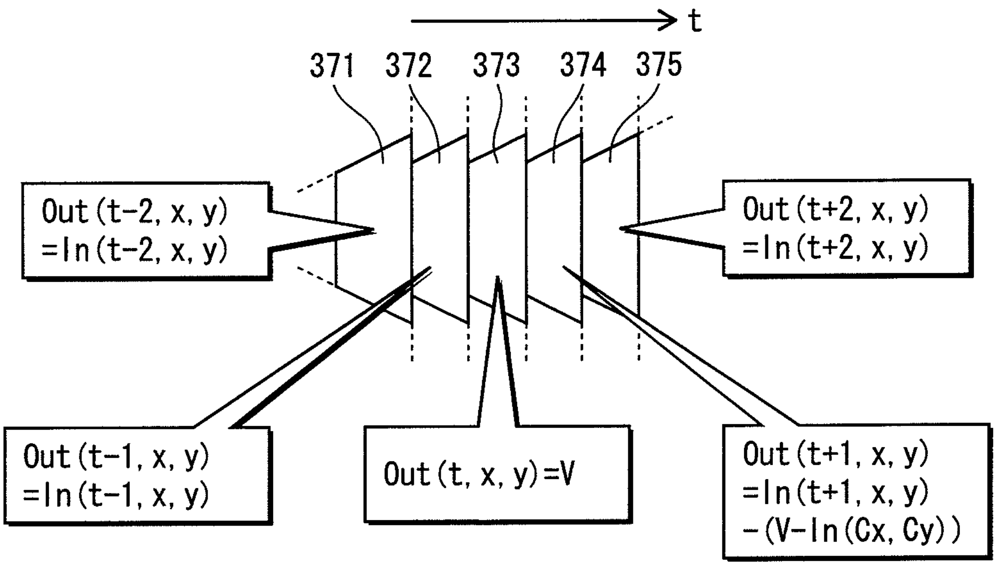
FIG. 40 shows the driving signals when pixels 371-375 are arranged along the playback time axis.

As shown in FIG. 40, in first through fifth frames to be played back successively in time, pixels 371, 372, 373, 374, and 375 exist at a position corresponding to an OLED targeted for deterioration detection.

The display control unit 104 causes pixel 373 in the third frame image to emit light at an adjustment luminance. That is, the display control unit 104 outputs a driving signal Out(t,X,Y)=V for pixel 373. In this equation, t represents the time at which the third frame image should be displayed, and X and Y respectively indicate the horizontal and vertical position of pixel 373 in the third frame image. Pixel 373 is the target pixel, and the third frame image is the target frame.

The display control unit 104 also distributes luminance to pixel 374 in the fourth frame image, which is to be played back successively in time after the third frame image. That is, the display control unit 104 calculates, for pixel 374, a driving signal Out(t+1,X,Y)=In(t+1,X,Y)−(V−In(CX,CY)) and outputs the driving signal Out(t+1,X,Y). In this equation, CX and CY indicate the horizontal and vertical position of pixel 373 in the third frame image.

Note that since luminance is not adjusted for the first, second, and fifth frame images, the display control unit 104 calculates: for pixel 371 in the first frame image, a driving signal Out(t−2,X,Y)=In(t−2,X,Y), outputting the driving signal Out(t−2,X,Y); for pixel 372 in the second frame image, a driving signal Out(t−1,X,Y)=In(t−1,X,Y), outputting the driving signal Out(t−1,X,Y); and pixel 375 in the fifth frame image, a driving signal Out(t+2,X,Y)=In(t+2,X,Y), outputting the driving signal Out(t+2,X,Y).

Figure 41:
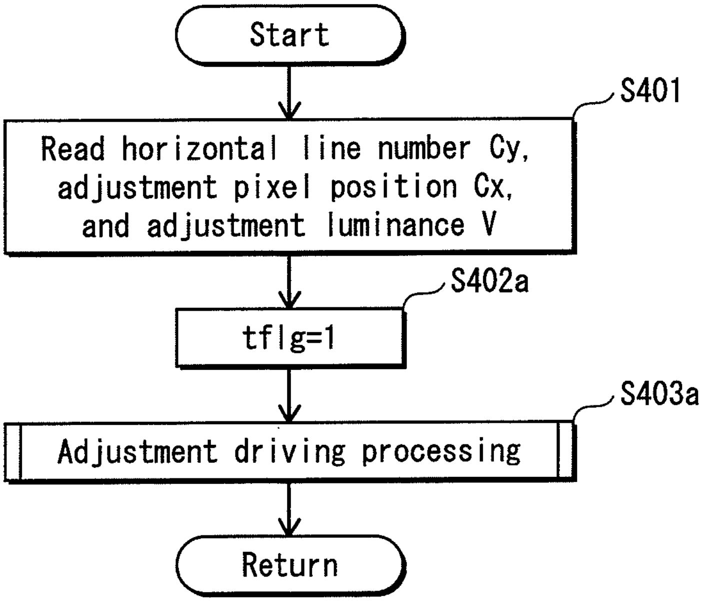
FIG. 41 is a flowchart mainly showing the operations at the stage before adjustment driving processing by the display control unit 104.

Next, an explanation is provided for the operations of the display control unit 104 with reference to the flowchart shown in FIG. 41.

The display control unit 104 reads a horizontal line number CY, an adjustment pixel position CX, and an adjustment luminance V (step S401), sets a flag tflg to "1" (step S402*a*), and next performs adjustment driving processing on the display unit 110 (step S403*a*).

Figure 42:
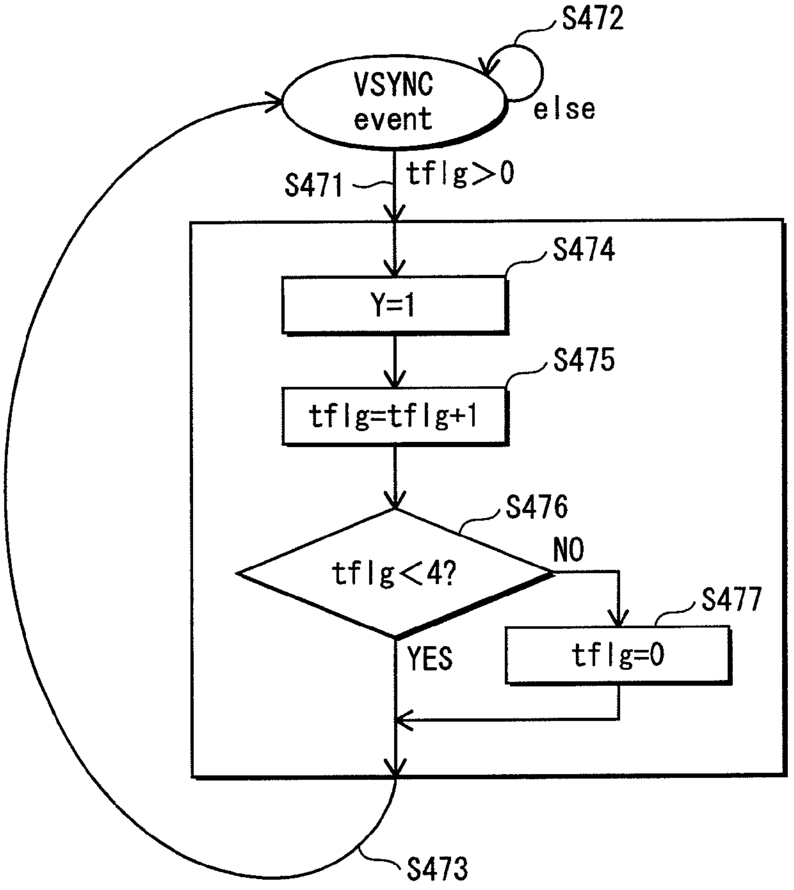
FIG. 42 is a state transition diagram of the display control unit 104 when waiting for a VSYNC event to be issued.
Figure 43:
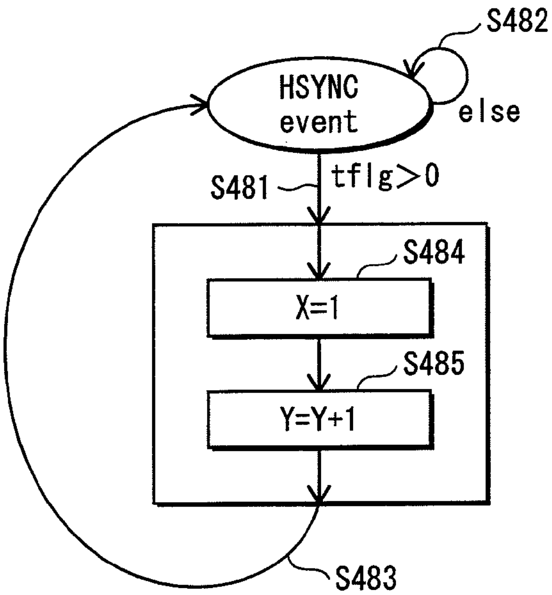
FIG. 43 is a state transition diagram of the display control unit 104 when waiting for an HSYNC event to be issued.
Figure 44:
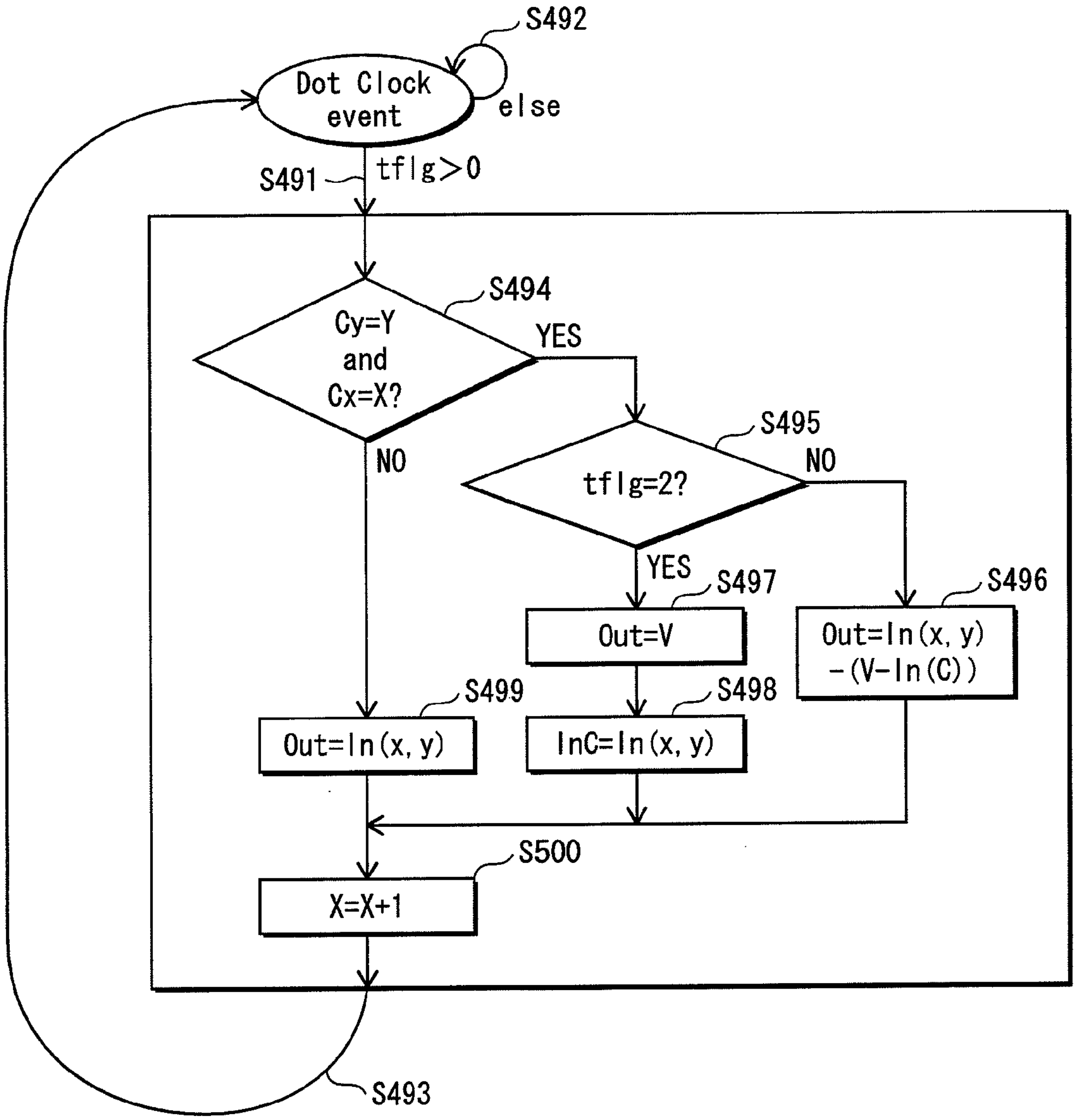
FIG. 44 is a state transition diagram of the display control unit 104 when waiting for a DotClock event to be issued.

Next, the adjustment driving processing in step S403*a* is described in detail with reference to the state transition diagrams in FIGS. 42-44.

The display control unit 104 waits for a VSYNC event to be issued. As described above, a VSYNC event is an event indicating the start of vertical synchronization operations. If the flag tflg is not greater than "0" when a VSYNC event is issued (step S472), the display control unit 104 continues to wait for a VSYNC event to be issued. If the flag tflg is greater than "0" when a VSYNC event is issued (step S471), a variable Y is set to "1" (step S474), and "1" is added to the flag tflag (step S475). The display control unit 104 then determines whether the flag tflag is less than "4" (step S476). If not (step S476: NO), the flag tflag is set to "0" (step S477). If the flag tflag is less than "4" (step S476: YES), the display control unit 104 does nothing. Next, the display control unit 104 returns to waiting for a VSYNC event to be issued (step S473).

The display control unit 104 also waits for an HSYNC event to be issued. As described above, an HSYNC event is an event indicating the start of horizontal synchronization operations. If the flag tflg is not greater than "0" when an HSYNC event is issued (step S482), the display control unit 104 continues to wait for an HSYNC event to be issued. If the flag tflg is greater than "0" when an HSYNC event is issued (step S481), a variable X is set to "1" (step S484) and "1" is added to the variable Y (step S485). Next, processing returns to waiting for an HSYNC event to be issued (step S483).

The display control unit 104 also waits for a DotClock event to be issued. As described above, a DotClock event is an event indicating the start of display operations for each pixel. If the flag tflg is not greater than "0" when a DotClock event is issued (step S492), the display control unit 104 continues to wait for a DotClock event to be issued. If the flag tflg is greater than "0" when a DotClock event is issued (step S491), then the display control unit 104 determines whether "CY=Y and CX=X" is true (step S494). If so (step S494: YES), the display control unit 104 determines whether tflag is "2" (step S495). If not (step S495: NO), the display control unit 104 calculates a driving signal Out(X,Y)=In(X,Y)−(V−InC) and outputs the driving signal Out(X,Y) (step S496).

If tflag is "2" (step S495: YES), the display control unit 104 outputs a driving signal Out=V (step S497) and acquires and stores InC=In(X,Y) (step S498).

If "CY=Y and CX=X" is not true (step S494: NO), the display control unit 104 outputs a driving signal Out=In(X,Y) (step S499).

Next, the display control unit 104 adds "1" to X (step S500) and returns to waiting for a DotClock event to be issued (step S493).

As described above, from among a plurality of frame images to be played back successively in time, the organic light emitting display device 2 in the image display system 1*d* distributes luminance for an OLED targeted for deterioration detection to a pixel corresponding to an OLED in a frame image played back later in time.

4.2 Modification (8)

A modification of the image display system 1*d* in Embodiment 4 is described, focusing on the differences with Embodiment 4.

Figure 45:
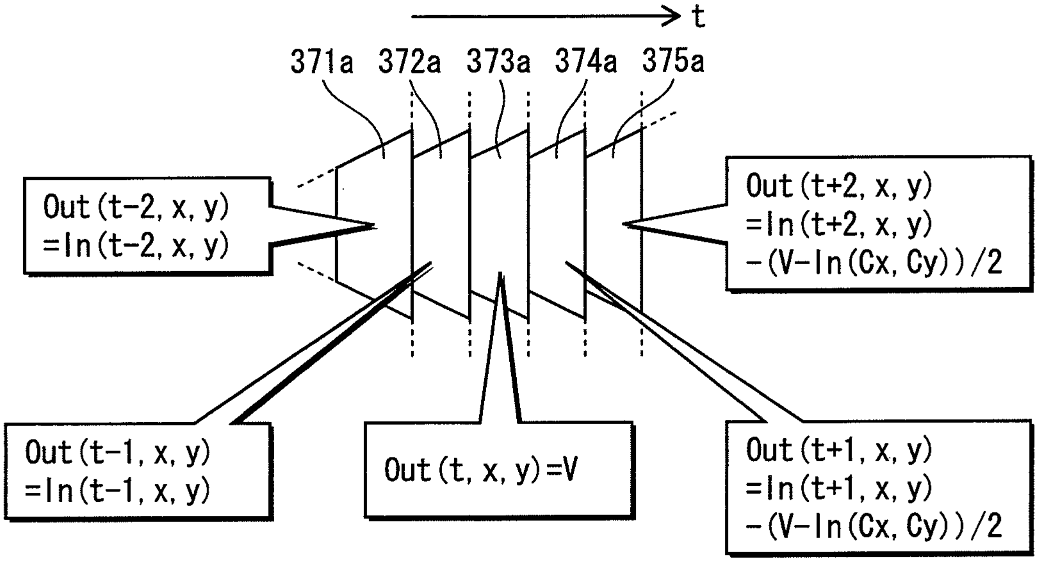
FIG. 45 shows the driving signals when pixels **371*a*-375*a*** are arranged along the playback time axis.

As shown in FIG. 45, in first through fifth frames to be played back successively in time, pixels 371*a*, 372*a*, 373*a*, 374*a*, and 375*a* exist at a position corresponding to an OLED targeted for deterioration detection.

The display control unit 104 causes pixel 373*a* in the third frame image to emit light at an adjustment luminance. That is, the display control unit 104 outputs a driving signal Out(t,X,Y)=V for pixel 373*a*.

The display control unit 104 also distributes luminance to pixels 374*a* and 375*a* in the fourth and fifth frame images, respectively, which are to be played back successively in time after the third frame image. That is, the display control unit 104 calculates: for pixel 374*a*, a driving signal Out(t+1,X,Y)=In(t+1,X,Y)−(V−In(CX,CY))/2, outputting the driving signal Out(t+1,X,Y); and for pixel 375*a*, a driving signal Out(t+2,X,Y)=In(t+2,X,Y)−(V−In(CX,CY))/2, outputting the driving signal Out(t+2,X,Y).

Note that since luminance is not adjusted for the first and second frame images, the display control unit 104 calculates: for pixel 371*a* in the first frame image, a driving signal Out(t−2,X,Y)=In(t−2,X,Y), outputting the driving signal Out(t−2,X,Y); and for pixel 372*a* in the second frame image, a driving signal Out(t−1,X,Y)=In(t−1,X,Y), outputting the driving signal Out(t−1,X,Y).

4.3 Modification (9)

A modification of the image display system 1*d* in Embodiment 4 is described.

In this modification, in addition to the distribution of luminance described above, luminance is further distributed to peripheral pixels for the target pixel within the target frame image, and to peripheral pixels for the pixel at a position corresponding to the target pixel in peripheral frame images.

Figure 46:
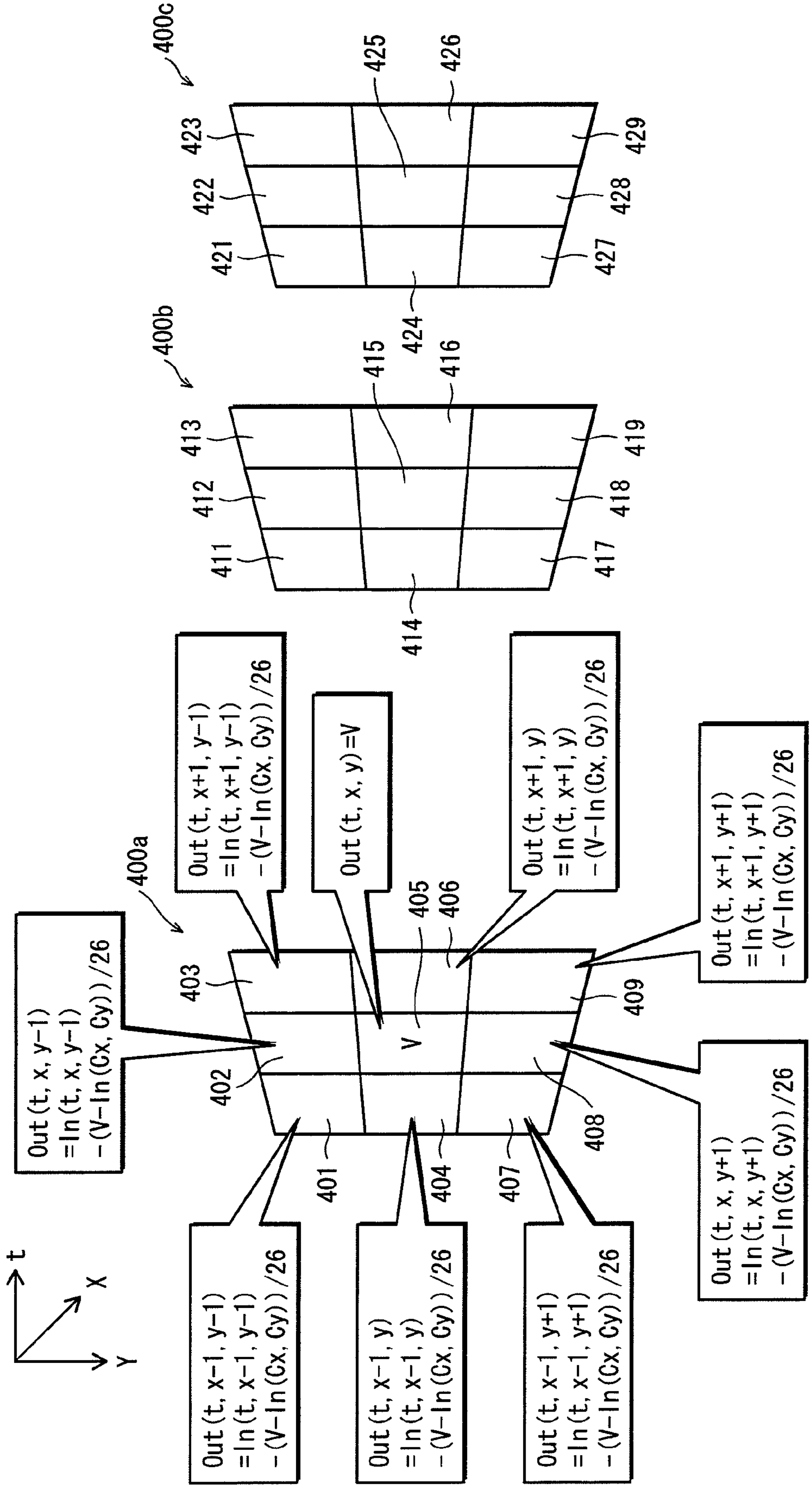
FIG. 46 shows the driving signal for each pixel in a first frame image that should be played back in accordance with the playback time axis.
Figure 47:
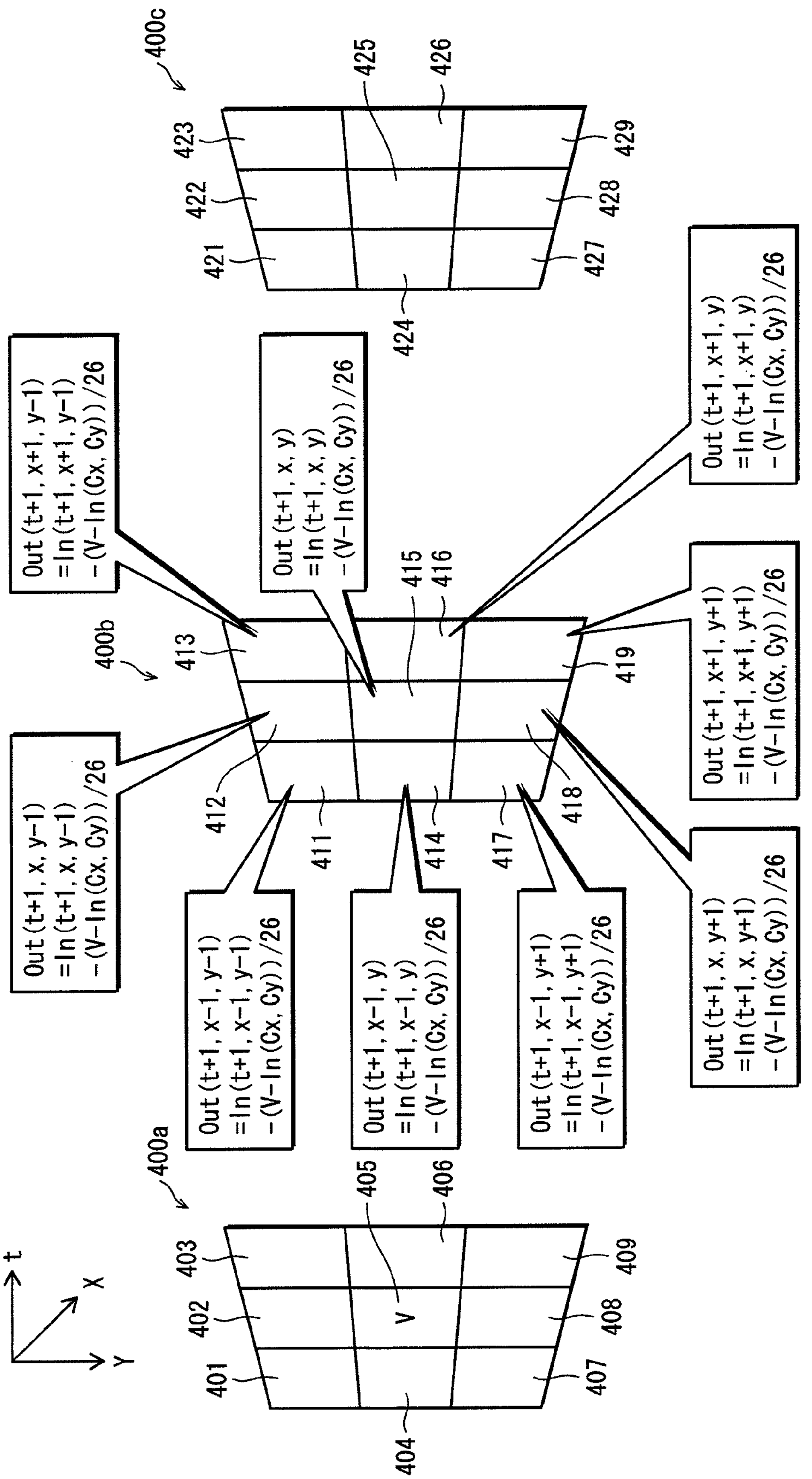
FIG. 47 shows the driving signal for each pixel in a second frame image that should be played back in accordance with the playback time axis.
Figure 48:
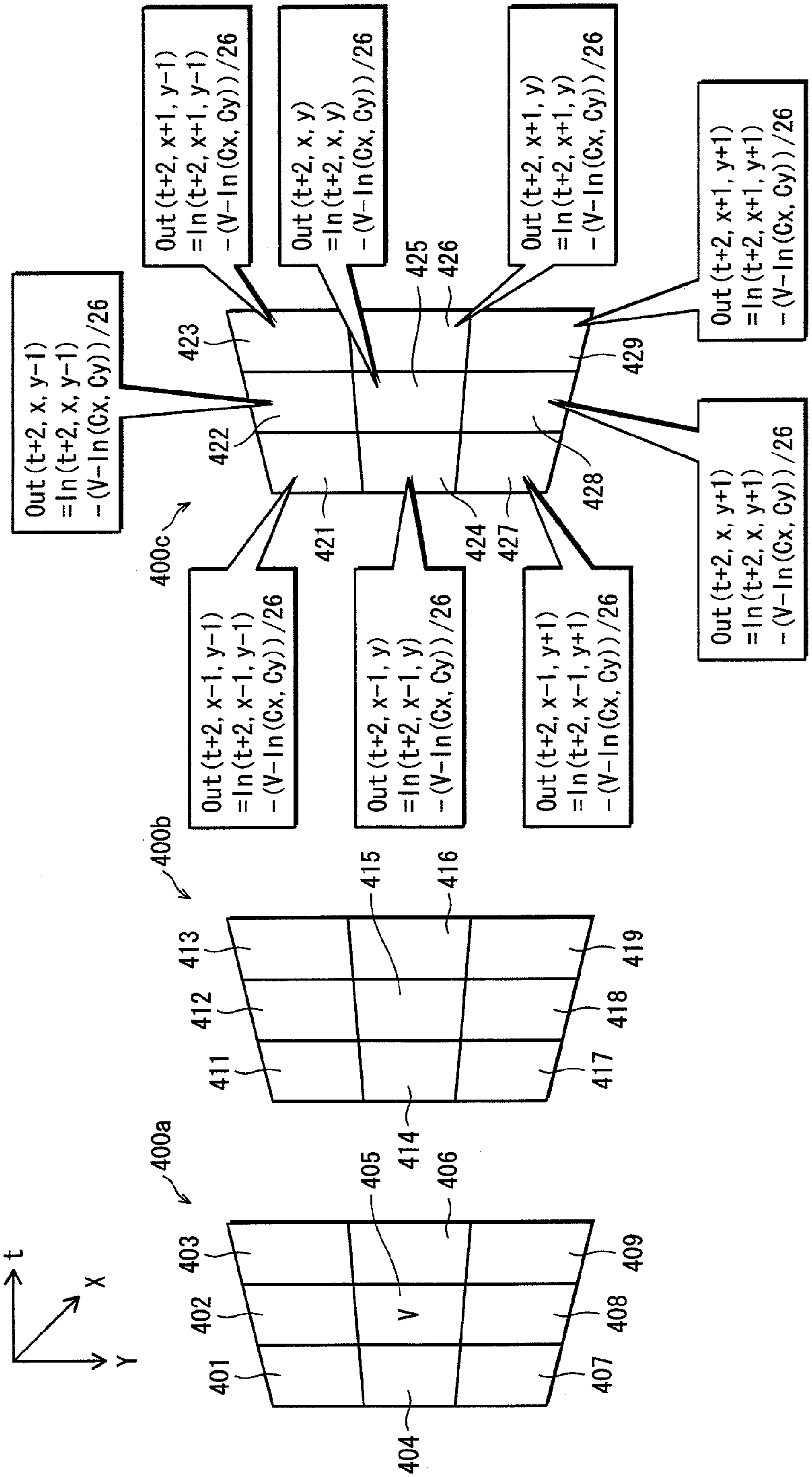
FIG. 48 shows the driving signal for each pixel in a third frame image that should be played back in accordance with the playback time axis.

As shown in FIGS. 46-48, first through third frame images 400*a*, *b*, and *c* are to be played back successively in time. The first frame image 400*a* includes 9 pixels 401-409 arranged in a matrix, the second frame image 400*b* includes 9 pixels 411-419 arranged in a matrix, and the third frame image 400*c* includes 9 pixels 421-429 arranged in a matrix.

As shown in FIG. 46, the display control unit 104 calculates and outputs driving signals Out for each pixel in the first frame image 400*a* according to the following equations.

For pixel 401, $Out(t,x-1,y-1)=In(t,x-1,y-1)-(V-In(Cx,Cy))/26$.

For pixel 404, $Out(t,x-1,y)=In(t,x-1,y)-(V-In(Cx,Cy))/26$.

For pixel 407, $Out(t,x-1,y+1)=In(t,x-1,y+1)-(V-In(Cx,Cy))/26$.

For pixel 402, $Out(t,x,y-1)=In(t,x,y-1)-(V-In(Cx,Cy))/26$.

For pixel 405, $Out(t,x,y)=V$.

For pixel 408, $Out(t,x,y+1)=In(t,x,y+1)-(V-In(Cx,Cy))/26$.

For pixel 403, $Out(t,x+1,y-1)=In(t,x+1,y-1)-(V-In(Cx,Cy))/26$.

For pixel 406, $Out(t,x+1,y)=In(t,x+1,y)-(V-In(Cx,Cy))/26$.

For pixel 409, $Out(t,x+1,y+1)=In(t,x+1,y+1)-(V-In(Cx,Cy))/26$.

As shown in FIG. 47, the display control unit 104 also calculates and outputs driving signals Out for each pixel in the second frame image 400*b* according to the following equations.

For pixel 411, $Out(t+1,x-1,y-1)=In(t+1,x-1,y-1)-(V-In(Cx,Cy))/26$.

For pixel 414, $Out(t+1,x-1,y)=In(t+1,x-1,y)-(V-In(Cx,Cy))/26$.

For pixel 417, $Out(t+1,x-1,y+1)=In(t+1,x-1,y+1)-(V-In(Cx,Cy))/26$.

For pixel 412, $Out(t+1,x,y-1)=In(t+1,x,y-1)-(V-In(Cx,Cy))/26$.

For pixel 415, $Out(t+1,x,y)=In(t+1,x,y)-(V-In(Cx,Cy))/26$.

For pixel 418, $Out(t+1,x,y+1)=In(t+1,x,y+1)-(V-In(Cx,Cy))/26$.

For pixel 413, $Out(t+1,x+1,y-1)=In(t+1,x+1,y-1)-(V-In(Cx,Cy))/26$.

For pixel 416, $Out(t+1,x+1,y)=In(t+1,x+1,y)-(V-In(Cx,Cy))/26$.

For pixel 419, $Out(t+1,x+1,y+1)=In(t+1,x+1,y+1)-(V-In(Cx,Cy))/26$.

Furthermore, as shown in FIG. 48, the display control unit 104 also calculates and outputs driving signals Out for each pixel in the third frame image 400*c* according to the following equations.

For pixel 421, $Out(t+2,x-1,y-1)=In(t+2,x-1,y-1)-(V-In(Cx,Cy))/26$.

For pixel 424, $Out(t+2,x-1,y)=In(t+2,x-1,y)-(V-In(Cx,Cy))/26$.

For pixel 427, $Out(t+2,x-1,y+1)=In(t+2,x-1,y+1)-(V-In(Cx,Cy))/26$.

For pixel 422, $Out(t+2,x,y-1)=In(t+2,x,y-1)-(V-In(Cx,Cy))/26$.

For pixel 425, $Out(t+2,x,y)=In(t+2,x,y)-(V-In(Cx,Cy))/26$.

For pixel 428, $Out(t+2,x,y+1)=In(t+2,x,y+1)-(V-In(Cx,Cy))/26$.

For pixel 423, $Out(t+2,x+1,y-1)=In(t+2,x+1,y-1)-(V-In(Cx,Cy))/26$.

For pixel 426, $Out(t+2,x+1,y)=In(t+2,x+1,y)-(V-In(Cx,Cy))/26$.

For pixel 429, $Out(t+2,x+1,y+1)=In(t+2,x+1,y+1)-(V-In(Cx,Cy))/26$.

4.4 Other Modifications

As described above, for a target frame image and one or a plurality of peripheral frame images to be played back after the target frame image, wherein the frame images are to be played back successively in time, a target pixel corresponding to an OLED targeted for deterioration detection in the target frame image is caused to emit light at an adjustment luminance, and luminance is distributed to peripheral pixels at a position corresponding to the target pixel in one or a plurality of peripheral frame images that are to be played back after the target frame image. However, the present invention is not limited in this way.

For example, when first through fifth frames to be played back successively in time exist, then by storing the first through fifth frame images in memory, the first and second frame images can be treated as peripheral frame images, the third frame image as the target image, and the fourth and fifth frame images as peripheral frame images.

Specifically, for the OLED targeted for deterioration detection, the luminance for the target pixel corresponding to the target OLED in the third frame image, which is the target frame image, is changed to the adjustment luminance and written in memory. For each of the first, second, fourth, and fifth peripheral frame images, luminance is distributed by changing the luminance for the peripheral pixels at a position corresponding to the targeted pixel and writing the changed luminance in memory.

Afterwards, the first through fifth frame images stored in memory are read in this order and controlled to display each pixel in each frame image.

In this way, luminance can be distributed to peripheral frame images to be played back before and after the target frame image.

5. Embodiment 5

The following is a description of another embodiment of the present invention.

5.1 Image Display System 1*e*

The following is a description of another embodiment of the present invention, an image display system 1*e* (not shown in the figures).

The image display system 1*e* has a similar configuration to image display systems in the above embodiments and is composed of an organic light emitting display device 2 and a video playback device 3.

In Embodiment 5, along a horizontal line of a frame image to be displayed on the display unit 110, two adjacent OLEDs are targeted for deterioration detection, and luminance for the two targeted OLEDs is distributed to peripheral pixels corresponding to OLEDs arranged before and after the adjacent target OLEDs in a horizontal direction.

Figure 49:
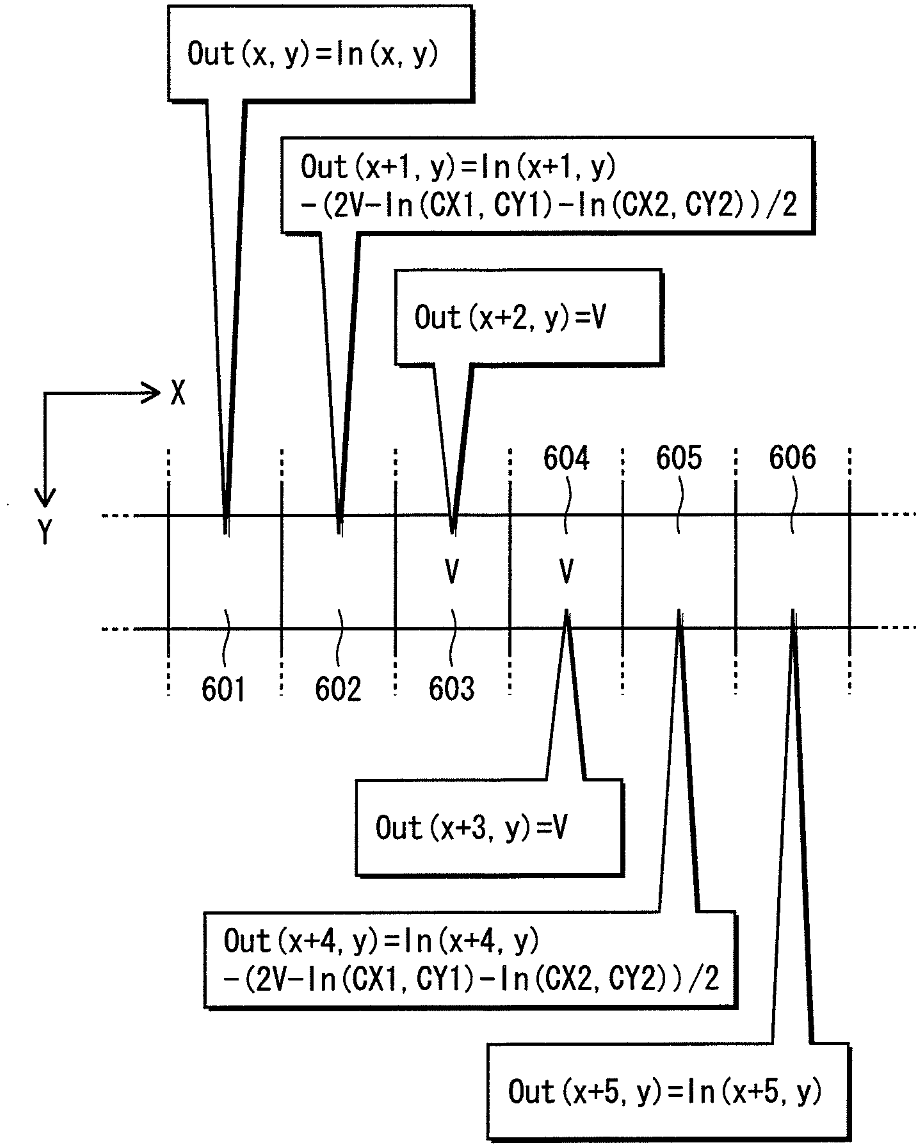
FIG. 49 shows, along a horizontal line, the driving signals for pixels 601-606, with the OLEDs for pixels 603 and 604 as the targets of deterioration detection.

As shown in FIG. 49, along one horizontal line in a frame image to be displayed on the display unit 110, 6 pixels 601, 602, 603, 604, 605, and 606 are arranged contiguously in this order.

Two OLEDs respectively corresponding to pixels 603 and 604 are the target of deterioration detection.

In this case, luminances are distributed to two peripheral pixels horizontally on either side of the target pixels that are targeted for adjustment via an adjustment luminance for the target OLEDs.

The display control unit 104 calculates: for pixel 603, a driving signal Out(X+2,Y)=V, outputting the driving signal Out(X+2,Y); and for pixel 604, a driving signal Out(X+3,Y)=V, outputting the driving signal Out(X+3,Y).

The display control unit 104 also calculates: for pixel 602, a driving signal Out(X+1,Y)=In(X+1,Y)−(2V−In(CX1,CY1)−In(CX2,CY2))/2, outputting the driving signal Out(X+1,Y); and for pixel 605, a driving signal Out(X+4,Y)=In(X+4,Y)−(2V−In(CX1,CY1)−In(CX2,CY2))/2, outputting the driving signal Out(X+4,Y).

Furthermore, the display control unit 104 calculates, for pixel 601, a driving signal Out(X,Y)=In(X,Y), and for pixel 606, a driving signal Out(X+5,Y)=In(X+5,Y). That is, the luminances of pixels 601 and 606 are not adjusted.

In these equations, X and Y respectively indicate the horizontal and vertical position of pixel 601. Also, CX1 and CY1 respectively indicate the horizontal and vertical position of pixel 603, and CX2 and CY2 respectively indicate the horizontal and vertical position of pixel 604.

5.2 Modification (10)

A modification of the image display system 1*e* in Embodiment 5 is described.

In this modification, in between two OLEDs in the display unit 110 which are targeted for deterioration detection, there is one OLED that is not targeted for detection and that is located on the same horizontal line as the targeted OLEDs.

Figure 50:
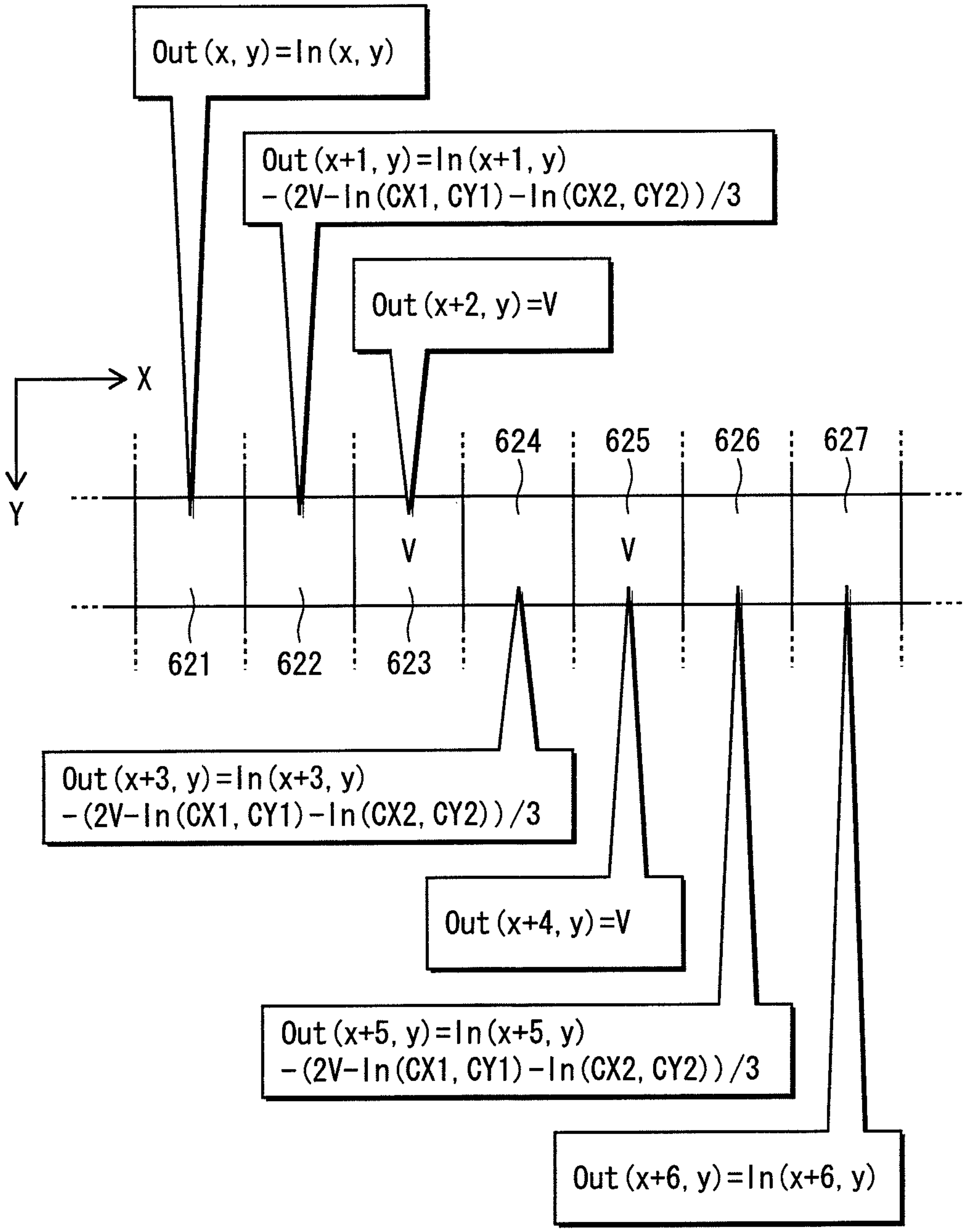
FIG. 50 shows, along a horizontal line, the driving signals for pixels 621-627, with the OLEDs for pixels 623 and 625 as the targets of deterioration detection.

As shown in FIG. 50, along one horizontal line in a frame image to be displayed on the display unit 110, 7 pixels 621, 622, 623, 624, 625, 626, and 627 are arranged contiguously in this order.

In this modification, the OLEDs respectively corresponding to pixels 623 and 625 are the target of deterioration detection.

In this case, luminances are distributed to two peripheral pixels horizontally on either side of the target pixels that are targeted for adjustment via an adjustment luminance for the target OLEDs, as well as to the peripheral pixel located between the two target pixels.

The display control unit 104 acquires an adjustment luminance V for the OLED corresponding to pixel 623 and acquires an adjustment luminance V for the OLED corresponding to pixel 625.

The display control unit 104 calculates: for pixel 623, a driving signal Out(X+2,Y)=V, outputting the driving signal Out(X+2,Y); and for pixel 625, a driving signal Out(X+4,Y)=V, outputting the driving signal Out(X+4,Y).

The display control unit 104 also calculates: for pixel 622, a driving signal Out(X+1,Y)=In(X+1,Y)−(2V−In(CX1,CY1)−In(CX2,CY2))/3, outputting the driving signal Out(X+1,Y); for pixel 624, a driving signal Out(X+3,Y)=In(X+3,Y)−(2V−In(CX1,CY1)−In(CX2,CY2))/3, outputting the driving signal Out(X+3,Y), and for pixel 626, a driving signal Out(X+5,Y)=In(X+5,Y)−(2V−In(CX1,CY1)−In(CX2,CY2))/3, outputting the driving signal Out(X+5,Y).

Furthermore, the display control unit 104 calculates, for pixel 621, a driving signal Out(X,Y)=In(X,Y), and for pixel 627, a driving signal Out(X+6,Y)=In(X+6,Y). That is, the luminances of pixels 621 and 627 are not adjusted.

In this modification, X and Y respectively indicate the horizontal and vertical position of pixel 621. Also, CX1 and CY1 respectively indicate the horizontal and vertical position of pixel 623, and CX2 and CY2 respectively indicate the horizontal and vertical position of pixel 625.

The method explained above can similarly be applied when, along one vertical line in a frame image to be displayed on the display unit 110, in between two OLEDs which are targeted for deterioration detection, there is one OLED that is not targeted for deterioration detection and that is located on the same vertical line as the targeted OLEDs.

6. Other Modifications

While the present invention has been described based on the above embodiments and modifications, the present invention is in no way limited to the above embodiments and modifications. The following cases are also included in the present invention.

(1) Each of the above embodiments and modifications can be applied to an organic light emitting display device with a color display. In this case, sets of a red (R) pixel that displays red, a green (G) pixel that displays green, and a blue (B) pixel that displays blue are repeatedly disposed in the display unit 110.

In this case, the pixels described in each embodiment and modification would correspond to a set of an R pixel, G pixel, and B pixel.

In the case of Embodiment 1, when the OLED corresponding to the R pixel in a set is the target of deterioration detection, the display control unit 104 calculates an adjustment luminance V for the OLED included in the corresponding set and outputs the driving signal Out(C)=V.

The display control unit 104 also calculates, for the R pixel in a peripheral set horizontally located before the target set, a driving signal Out(C−1)=In(C−1)−((V−In(C))/2 and outputs the driving signal Out(C−1).

Furthermore, the display control unit 104 calculates, for the R pixel in a peripheral set horizontally located after the target set, a driving signal Out(C+1)=In(C+1)−((V−In(C))/2 and outputs the driving signal Out(C+1).

In these equations, C indicates the horizontal position of the target set.

The other embodiments and modifications can similarly be adapted to an organic light emitting display device with a color display.

(2) In the above embodiments and modifications, luminance adjustment is performed for a pixel corresponding to an OLED targeted for deterioration detection, but the present invention is not limited to the objective of luminance adjustment.

The above embodiments and modifications may be adapted for the purpose of making a particular pixel in a frame image to be displayed on the display unit 110 emit light at a particular luminance while making the pixel not stand out.

For example, since the degree of deterioration of OLEDs differs for each diode, in order to make the degree of deterioration uniform, OLEDs with a low degree of deterioration are sometimes caused to emit light at a particular luminance. In this case, the pixels corresponding to the OLEDs with such a deterioration can be made not to stand out as compared to other pixels.

(3) The device can search for a pixel in the frame image to be displayed on the display unit 110 whose luminance is close to the adjustment luminance for that pixel, and luminance can be adjusted and distributed among pixels peripheral to such a pixel. Alternatively, the luminance may not be distributed among pixels peripheral to such a pixel. In this case, since the luminance of such a pixel is close to the adjustment luminance, the pixel does not stand out as much.

(4) As shown in FIG. 13, in Embodiment 1, the total of the luminances of the peripheral pixel 301, the target pixel 302, and the peripheral pixel 303 before adjustment is equivalent to the total of the luminances of the peripheral pixel 301, the target pixel 302, and the peripheral pixel 303 after adjustment. Adjustment is similarly performed in other embodiments and modifications.

However, the present invention is not limited to this example. The difference between the total before and after adjustment may be within a predetermined threshold value. The difference may, for example, be set to within 10% of the total before adjustment. The smaller this difference is, the less the pixel to be adjusted can be caused to stand out.

(5) The above-described display device can be applied to electronic equipment such as televisions, digital cameras, video cameras, notebook computers, cellular telephones, etc. These devices are provided with a display unit to display a video signal, either input into the device or generated within the device, as an image or as video.

(6) One embodiment of the present invention is a deterioration detection control device that controls deterioration detection of a light emitting element in an organic light emitting display device composed of a plurality of light emitting elements, the deterioration detection control device comprising: an acquisition unit operable to acquire a detection luminance signal for a light emitting element targeted for deterioration detection; a distribution unit operable to distribute a luminance that offsets a difference in luminance between an original video signal for a targeted light emitting element and the detection luminance signal into a plurality of off set luminances for corresponding pixels, or peripheral pixels surrounding the corresponding pixels, in frame images located close along a playback time axis to a frame image to which a target pixel that corresponds to the target light emitting element, and/or peripheral pixels surrounding the target pixel, belong; and an output unit operable to output luminance signals after the distribution unit distributes a detection luminance signal for a target pixel to peripheral pixels and corresponding pixels.

Another embodiment of the present invention is an organic light emitting display device comprising: a display unit provided with a plurality of light emitting elements; an acquisition unit operable to acquire a detection luminance signal for a light emitting element targeted for deterioration detection; a distribution unit operable to distribute a luminance that offsets a difference in luminance between an original video signal for a targeted light emitting element and the detection luminance signal to a plurality of offset luminances for corresponding pixels, or peripheral pixels surrounding the corresponding pixels, in frame images located close along a playback time axis to a frame image to which a target pixel that corresponds to the target light emitting element, and/or peripheral pixels surrounding the target pixel, belong; and an output unit operable to output luminance signals after the distribution unit distributes a detection luminance signal for a light emitting element in a target pixel to light emitting elements in peripheral pixels and corresponding pixels.

With these structures, the present invention has the advantage of causing a target pixel not to stand out compared to other pixels, since a luminance that offsets the difference in luminance between an original video signal for the target light emitting element and the detection luminance signal is distributed to peripheral unit pixels surrounding the target pixel and corresponding pixels. This is particularly effective when the display device is caused to emit light at a subdued color, such as gray, during deterioration detection that is performed, for example, on the OLED immediately after turning on power to the device.

The distribution unit may generate luminance signals for peripheral pixels and corresponding pixels so that a total of luminances indicated by the target pixel, surrounding pixels, and corresponding pixels is approximately equivalent to a total of luminances indicated by the detection luminance signal and by luminance signals after distribution.

With this structure, luminance signals are generated and output for each pixel so that a total of luminances indicated by the target pixel, surrounding pixels, and corresponding pixels is approximately equivalent to a total of luminances indicated by the detection luminance signal and by luminance signals after distribution. Therefore, for the section including the target pixel, surrounding pixels, and corresponding pixels, the sum of luminances before and after distribution does not change, and thus the target pixel does not stand out compared to other pixels.

The distribution unit may distribute the luminance that offsets the difference in luminance between the original video signal for the targeted light emitting element and the detection luminance signal into a plurality of offset luminances for peripheral pixels that are arranged in the frame image to which the target pixel belongs in one of a horizontal direction, a vertical direction, and both horizontal and vertical directions with respect to the target pixel.

With this structure, since luminances are distributed to the peripheral pixels arranged in one of a horizontal direction, a vertical direction, and both horizontal and vertical directions with respect to the target pixel, when a still image is displayed, the target pixel does not stand out as compared to other pixels.

The distribution unit may distribute the luminance that offsets the difference in luminance between the original video signal for the targeted light emitting element and the detection luminance signal into a plurality of offset luminances for corresponding pixels, and peripheral pixels surrounding the corresponding pixels, which correspond to the target pixel in frame images located along a playback time axis after a frame image to which the target pixel belongs.

With this structure, since luminances are distributed to corresponding pixels, and peripheral pixels surrounding the corresponding pixels, which correspond to the target pixel in frame images located along a playback time axis after a frame image that includes the target pixel, then when a moving image is displayed, the target pixel does not stand out as compared to other pixels.

The distribution unit may distribute the luminance that offsets the difference in luminance between the original video signal for the targeted light emitting element and the detection luminance signal into a plurality of offset luminances for the peripheral pixels that are arranged in the frame image to which the target pixel belongs in the horizontal and vertical directions with respect to the target pixel, and for corresponding pixels, and the peripheral pixels arranged in a horizontal and vertical direction, which correspond to the target pixel in frame images located along a playback time axis after a frame image to which the target pixel belongs.

The distribution unit may generate luminance signals for surrounding pixels and corresponding pixels by (i) dividing the difference in luminance between the detection luminance signal and an original luminance signal for the target pixel by a total number of the surrounding pixels and corresponding pixels that are targeted for offset luminances and (ii) subtracting a value obtained by division from luminances indicated by original luminance signals for the surrounding pixels and corresponding pixels.

When detecting that power to the device has been turned on, receiving an instruction for deterioration detection operations, or detecting a specific video signal in video signals for playback, or after a fixed period of time passes, the organic light emitting display device may control the acquisition unit, the distribution unit, and the output unit to acquire a detection luminance signal, distribute luminance, and output luminance signals to pixels.

Another embodiment of the present invention is a deterioration detection control method, used in a deterioration detection control device that controls deterioration detection of a light emitting element in an organic light emitting display device composed of a plurality of light emitting elements, comprising the steps of: acquiring a detection luminance signal for a light emitting element targeted for deterioration detection; distributing a luminance that offsets a difference in luminance between an original video signal for a targeted light emitting element and the detection luminance signal to corresponding pixels, or peripheral pixels surrounding the corresponding pixels, in frame images located close along a playback time axis to a frame image to which a target pixel that corresponds to the target light emitting element, and/or peripheral pixels surrounding the target pixel, belong; and outputting luminance signals after the distribution unit distributes a detection luminance signal for a target pixel to peripheral pixels and corresponding pixels.

Another embodiment of the present invention is a computer program for deterioration detection control, used in a computer that controls deterioration detection of a light emitting element in an organic light emitting display device composed of a plurality of light emitting elements, that causes the computer to perform the steps of: acquiring a detection luminance signal for a light emitting element targeted for deterioration detection; distributing a luminance that offsets a difference in luminance between an original video signal for a targeted light emitting element and the detection luminance signal into a plurality of offset luminances for corresponding pixels, or peripheral pixels surrounding the corresponding pixels, in frame images located close along a playback time axis to a frame image to which a target pixel that corresponds to the target light emitting element, and/or peripheral pixels surrounding the target pixel, belong; and outputting luminance signals after the distribution unit distributes a detection luminance signal for a target pixel to peripheral pixels and corresponding pixels.

(7) Concretely, the above devices include a computer system composed of a microprocessor, ROM, RAM, etc. Computer programs are stored in the RAM. The microprocessor operates in accordance with the computer programs, and each device thereby fulfills its functions. These computer programs are composed of a plurality of command codes that indicate instructions for the computer in order to fulfill specific functions.

(8) The present invention may also be the above-indicated methods. The present invention may also be computer programs that implement these methods via a computer, or a digital signal composed of such a program.

The present invention may also be achieved by a computer-readable recording medium, such as a flexible disk, hard disk, CD-ROM, MO, DVD, DVD-ROM, DVD-RAM, Blu-ray Disc (BD), or semiconductor memory, on which the above-mentioned computer programs or digital signal are recorded. The present invention may also be the computer programs or the digital signal recorded on such a recording medium.

The present invention may also be the computer programs or digital signal to be transmitted via networks, of which telecommunications networks, wire/wireless communications networks, and the Internet are representative, or via data broadcasting.

The present invention may also be a computer system provided with a microprocessor and memory, the memory storing the above-mentioned computer programs and the microprocessor operating in accordance with the computer programs.

Also, another, independent computer system may implement the computer programs or digital signal after the computer programs or digital signal are transferred via being recorded on the recording medium, via one of the above-mentioned networks, etc.

(9) The above embodiments and modifications may be combined with one another.

INDUSTRIAL APPLICABILITY

In the electronic equipment manufacturing industry, each device comprising the present invention can be continually and repeatedly manufactured and sold from a managerial perspective. Each device can also be continually and repeatedly used from a managerial perspective in all industrial fields that use a video signal by displaying the signal as an image or video.

REFERENCE SIGNS LIST

1 Image display system
2 Organic light emitting display device
3 Video playback device
101 I/O unit
102 Control unit
103 Frame image storage unit

104 Display control unit
106 Multiplexer
107 Voltage detection circuit
108 Data line driving circuit
109 Scanning line driving circuit
110 Display unit
111 Characteristic parameters storage unit
112 Driving circuit Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An organic light emitting display device, comprising:
- a display including a plurality of pixels, each of the plurality of pixels being provided with a light emitting element;
- a driver configured to provide each of the plurality of pixels with an original luminance signal, a target pixel with a predetermined detection luminance signal, and each of peripheral pixels of the plurality of pixels that surrounds the target pixel with an adjusted luminance signal; and
- a display controller that tests for deterioration of the light emitting element in the target pixel by being configured to:
  - provide the original luminance signal to each of the plurality of pixels by providing the driver with the original luminance signal; and
  - provide the predetermined detection luminance signal to the target pixel of the plurality of pixels by providing the driver with the predetermined detection luminance signal,
- wherein, when the display controller provides the predetermined detection luminance signal to the target pixel, the display controller is configured to:
  - divide a luminance difference between the original luminance signal corresponding to the target pixel and the predetermined detection luminance signal into a plurality of offset luminances;
  - perform one of an addition operation and a subtraction operation with the plurality of offset luminances and the original luminance signal corresponding to each of the peripheral pixels of the plurality of pixels that surrounds the target pixel; and
  - provide the peripheral pixels with the adjusted luminance signals corresponding to results of the one of the addition operation and the subtraction operation to offset a difference between the original luminance signal and the predetermined detection luminance signal corresponding to the target pixel.

2. The organic light emitting display device in claim 1, wherein the display controller is configured to divide the luminance difference into the plurality of offset luminances so that a first total of luminances indicated by the original luminance signal corresponding to the target pixel and the original luminance signal corresponding to each of the peripheral pixels is approximately equivalent to a second total of luminances indicated by the predetermined detection luminance signal and the adjusted luminance signals.

3. The organic light emitting display device in claim 1, wherein the peripheral pixels are arranged, with respect to the target pixel, in one of a horizontal direction, a vertical direction, and both horizontal and vertical directions.

4. The organic light emitting display device in claim 1, wherein the display controller is configured to divide the luminance difference by a total number of the peripheral pixels to which the plurality of offset luminances correspond, and perform the one of the addition operation and the subtraction operation with a value resulting from the division.

5. The organic light emitting display device in claim 1, wherein the display controller is configured to provide the predetermined detection luminance signal to the target pixel included in the display upon detecting that power has been turned on.

6. The organic light emitting display device in claim 1, wherein the display controller is configured to provide the predetermined detection luminance signal to the target pixel included in the display each time a predetermined period of time passes.

7. The organic light emitting display device in claim 1, wherein the display controller is configured to provide the predetermined detection luminance signal to the target pixel included in the display upon receiving a deterioration detection instruction.

8. The organic light emitting display device in claim 1, wherein the display controller is configured to provide the predetermined detection luminance signal to the target pixel included in the display upon detecting a predetermined video signal.

9. An organic light emitting display device, comprising:
- a display including a plurality of pixels, each of the plurality of pixels being provided with a light emitting element;
- a driver configured to provide each of the plurality of pixels with an original luminance signal, a target pixel with a predetermined detection luminance signal, and the target pixel with adjusted luminance signals; and
- a display controller that tests for deterioration of the light emitting element in the target pixel by being configured to:
  - provide the original luminance signal to each of the plurality of pixels by providing the driver with the original luminance signal; and
  - provide the predetermined detection luminance signal to the target pixel of the plurality of pixels by providing the driver with the predetermined detection luminance signal,
- wherein, when the display controller provides the predetermined detection luminance signal to the target pixel, the display controller is configured to:
  - divide a luminance difference between the original luminance signal corresponding to the target pixel and the predetermined detection luminance signal into a plurality of offset luminances;
  - perform one of an addition operation and a subtraction operation with the plurality of offset luminances and subsequent luminance signals that are subsequently provided on a playback time axis to the target pixel; and
  - subsequently provide the target pixel on the playback time axis with the adjusted luminance signals corresponding to results of the one of the addition operation and the subtraction operation to offset a difference between the original luminance signal and the predetermined detection luminance signal corresponding to the target pixel.

10. The organic light emitting display device in claim 9, wherein the display controller is further configured to:
- divide the luminance difference into a second plurality of offset luminances;

perform a second of the addition operation and the subtraction operation with the second plurality of offset luminances and peripheral luminance signals that are subsequently provided to peripheral pixels of the plurality of pixels that surround the target pixel on the playback time axis; and provide second adjusted luminance signals corresponding to second results of the second of the addition operation and the subtraction operation to the peripheral pixels.

11. The organic light emitting display device in claim 10, wherein the display controller is configured to divide the luminance difference into the plurality of offset luminances and the second plurality of offset luminances so that a first total of luminances indicated by the original luminance signal corresponding to the target pixel, the subsequent luminance signals corresponding to the target pixel, and the peripheral luminance signals corresponding to the peripheral pixels is approximately equivalent to a second total of luminances indicated by the predetermined detection luminance signal, the adjusted luminance signals, and the second adjusted luminance signals.

12. The organic light emitting display device in claim 10, wherein the peripheral pixels are arranged, with respect to the target pixel, in one of a horizontal direction, a vertical direction, and both horizontal and vertical directions.

13. The organic light emitting display device in claim 10, wherein the display controller is configured to divide the luminance difference by a total number of the target pixel and the peripheral pixels, and perform the one of the addition operation and the subtraction operation and the second of the addition operation and the subtraction operation with a value resulting from the division.

14. The organic light emitting display device in claim 9, wherein the display controller is configured to provide the predetermined detection luminance signal to the target pixel included in the display upon detecting that power has been turned on.

15. The organic light emitting display device in claim 9, wherein the display controller is configured to provide the predetermined detection luminance signal to the target pixel included in the display each time a predetermined period of time passes.

16. The organic light emitting display device in claim 9, wherein the display controller is configured to provide the predetermined detection luminance signal to the target pixel included in the display upon receiving a deterioration detection instruction.

17. The organic light emitting display device in claim 9, wherein the display controller is configured to provide the predetermined detection luminance signal to the target pixel included in the display upon detecting a predetermined video signal.

18. A method to control an organic light emitting display device provided with a plurality of pixels and a driver, each of the plurality of pixels being provided with a light emitting element, the method comprising:

providing, by a processor that tests for deterioration of the light emitting element in a target pixel, an original luminance signal to each of the plurality of pixels by providing the driver with the original luminance signal;

providing, by the processor, a predetermined detection luminance signal to the target pixel of the plurality of pixels by providing the driver with the predetermined detection luminance signal; and providing, by the processor, an adjusted luminance signal to each of peripheral pixels of the plurality of pixels that surrounds the target pixel by providing the driver with the adjusted luminance signal;

wherein, when the processor provides the predetermined detection luminance signal to the target pixel, the processor:

determines a luminance difference between the original luminance signal corresponding to the target pixel and the predetermined detection luminance signal;

divides the luminance difference into a plurality of offset luminances;

performs one of an addition operation and a subtraction operation with the plurality of offset luminances and the original luminance signal corresponding to each of the peripheral pixels of the plurality of pixels that surrounds the target pixel; and provides the peripheral pixels with the adjusted luminance signals corresponding to results of the one of the addition operation and the subtraction operation to offset a difference between the original luminance signal and the predetermined detection luminance signal corresponding to the target pixel.

19. A method to control an organic light emitting display device provided with a plurality of pixels and a driver, each of the plurality of pixels being provided with a light emitting element, the method comprising:

providing, by a processor that tests for deterioration of the light emitting element in a target pixel, an original luminance signal to each of the plurality of pixels by providing the driver with the original luminance signal;

providing, by the processor, a predetermined detection luminance signal to the target pixel of the plurality of pixels by providing the driver with the predetermined detection luminance signal;

providing, by the processor, adjusted luminance signals to the target pixel by providing the driver with the adjusted luminance signals;

wherein, when the processor provides the predetermined detection luminance signal to the target pixel, the processor:

determines a luminance difference between the original luminance signal corresponding to the target pixel and the predetermined detection luminance signal;

divides the luminance difference into a plurality of offset luminances;

performs one of an addition operation and a subtraction operation with the plurality of offset luminances and subsequent luminance signals that are subsequently provided on a playback time axis to the target pixel; and subsequently provides the target pixel on the playback time axis with the adjusted luminance signals corresponding to results of the one of the addition operation and the subtraction operation to offset a difference between the original luminance signal and the predetermined detection luminance signal corresponding to the target pixel.

* * * * *